(12) United States Patent
Li et al.

(10) Patent No.: US 12,117,327 B2
(45) Date of Patent: Oct. 15, 2024

(54) M-BUS RECEIVING CIRCUIT AND M-BUS-BASED 4G WATER METER COLLECTOR

(71) Applicant: SHENZHEN CHUANGREN TECHNOLOGY CO., LTD., Guangdong (CN)

(72) Inventors: Dong Li, Guangdong (CN); Jubao Nie, Guangdong (CN); Guanru Li, Guangdong (CN); Guanxi Li, Guangdong (CN); Junsheng Zhu, Guangdong (CN)

(73) Assignee: SHENZHEN CHUANGREN TECHNOLOGY CO., LTD., Shenzhen (CN)

( * ) Notice: Subject to any disclaimer, the term of this patent is extended or adjusted under 35 U.S.C. 154(b) by 442 days.

(21) Appl. No.: 17/588,215

(22) Filed: Jan. 29, 2022

(65) Prior Publication Data

US 2022/0155125 A1   May 19, 2022

Related U.S. Application Data

(63) Continuation of application No. PCT/CN2019/130561, filed on Dec. 31, 2019.

(30) Foreign Application Priority Data

Dec. 26, 2019   (CN) .......................... 201911362470.1

(51) Int. Cl.
  *G01F 15/18*   (2006.01)
  *G01F 15/063*   (2022.01)
  *G05B 19/418*   (2006.01)
(52) U.S. Cl.
  CPC .......... *G01F 15/185* (2013.01); *G01F 15/063* (2013.01); *G05B 19/4184* (2013.01)

(58) Field of Classification Search
  CPC .. G01F 15/185; G01F 15/063; G05B 19/4184
  See application file for complete search history.

(56) References Cited

U.S. PATENT DOCUMENTS

| 7,685,267 B2 * | 3/2010 | Isenmann | G06F 16/972 |
| | | | 700/83 |
| 8,331,870 B2 * | 12/2012 | Vedral | G05B 19/4184 |
| | | | 455/67.11 |

FOREIGN PATENT DOCUMENTS

| CN | 107508258 A | * 12/2017 | ............... H02H 3/05 |
| CN | 206790479 U | * 12/2017 | |

(Continued)

OTHER PUBLICATIONS

Translation of NL-9001489-A (Year: 1991).*

(Continued)

*Primary Examiner* — Henry Tsai
*Assistant Examiner* — John B Roche

(57) ABSTRACT

An M-BUS receiving circuit (8) and an M-BUS-based 4G water meter collector. The M-BUS receiving circuit (8) is disposed between a control unit (2) and an M-BUS overcurrent protection circuit, and is used for connecting the control unit (2) and the M-BUS overcurrent protection circuit. The M-BUS receiving circuit (8) consists of a voltage-stabilizing chip U1, Schmitt triggers U5B and U5C, voltage comparators U3A and U3B, triodes Q2 and Q4, diodes D1, D2, D8-D11, operational amplifiers U15A and U15B, voltage-stabilizing diodes ZW10 and ZW11, and several resistance-capacitance circuits. The M-BUS receiving circuit (8) can greatly increase the signal-to-noise ratio, and the reliability and stability thereof are significantly improved. Similarly, the M-BUS-based 4G water meter collector can effectively improve the stability of water meter data collection.

16 Claims, 27 Drawing Sheets

(56) References Cited

FOREIGN PATENT DOCUMENTS

| | | | | |
|---|---|---|---|---|
| EP | 0221574 A2 | * | 5/1987 | ............ H02M 5/293 |
| NL | 9001489 A | * | 2/1991 | ............ H04M 19/08 |

OTHER PUBLICATIONS

Translation of EP-0221574-A2 (Year: 1987).*
Translation of CN-107508258-A (Year: 2017).*
Translation of CN-206790479-U (Year: 2017).*

\* cited by examiner

M-BUS RECEIVING CIRCUIT AND M-BUS-BASED 4G WATER METER COLLECTOR

CROSS-REFERENCE TO RELATED APPLICATION

The present application is a continuation of international application of PCT application No. PCT/CN2019/130561 filed on Dec. 31, 2019, which claims the priority benefit of China application No. 201911362470.1 filed on Dec. 26, 2019. The entirety of the above-mentioned patent applications are incorporated herein by reference and made a part of this specification.

TECHNICAL FIELD

The present invention relates to the technical field of data collectors, in particular to an M-BUS receiving circuit and an M-BUS-based 4G water meter collector.

BACKGROUND ART

For most of remote water meters in the current market, remote meter reading work is completed by transmitting information of a plurality of water meters on the same floor to a water meter collector and then uploading data collected by the water meter collector to a computer management system. However, for most of existing water meter collectors, an M-BUS chip is adopted for power supply and data transmission. It is found in actual use that a water meter communication interface of a water meter collector adopting the M-BUS chip is unstable in power supply and relatively low in signal-to-noise ratio, and the water meter collector with low stability is seriously inconvenient to use.

SUMMARY

The technical problem to be solved by the present invention is to provide an M-BUS receiving circuit capable of greatly increasing the signal-to-noise ratio and an M-BUS-based 4G water meter collector high in data receiving stability.

In order to solve the above-mentioned technical problems, the present invention adopts a technical solution:

an M-BUS receiving circuit is disposed between a control unit and an M-BUS overcurrent protection circuit, and is used for connecting the control unit and the M-BUS overcurrent protection circuit. The M-BUS receiving circuit includes a capacitor C3, a capacitor C2, a voltage-stabilizing chip U1, a diode D1, a resistor R16, a resistor R10, a resistor R8, a resistor R17, a capacitor C9, a resistor R9, a resistor R21, a resistor R22, a triode Q4, a Schmitt trigger U5C, a resistor R124, a resistor R105, a triode Q2, a resistor R12, a resistor R103, a resistor R33, a Schmitt trigger U5B, a voltage comparator U3B, a resistor R32, a resistor R34, a capacitor C75, a resistor R15, a diode D2, a resistor R117, a capacitor C7, a capacitor C5, a capacitor C8, a capacitor C10, a voltage comparator U3A, a resistor R29, a diode D8, a diode D9, a diode D10, a diode D11, a capacitor C15, a capacitor C16, a capacitor C17, a capacitor C81, a capacitor C6, a resistor R18, a resistor R20, a resistor R205, a resistor R203, a resistor R204, a resistor R201, a resistor R202, a resistor R7, a capacitor C202, a capacitor C200, a capacitor C201, a capacitor C203, a capacitor C4, an operational amplifier U15A, a voltage-stabilizing diode ZW10, a voltage-stabilizing diode ZW11, and an operational amplifier U15B;

the capacitor C3 is connected in parallel with the capacitor C2, one end of the parallel capacitor C3 and capacitor C2 is grounded, and the other end of the parallel capacitor C3 and capacitor C2 and a third pin of the voltage-stabilizing chip U1 are both electrically connected with a 32V power source; a cathode of the diode D1 is electrically connected with the third pin of the voltage-stabilizing chip U1, and an anode of the diode D1 is electrically connected with a second pin of the voltage-stabilizing chip U1; the second pin of the voltage-stabilizing chip U1 is electrically connected with one end of the resistor R10 and one end of the resistor R8 respectively; the other end of the resistor R10 is electrically connected with a first pin of the voltage-stabilizing chip U1, one end of the resistor R16, one end of the capacitor C9 and one end of the resistor R17 respectively; the other end of the resistor R16 is electrically connected with a collector of the triode Q4; a base of the triode Q4 is electrically connected with one end of the resistor R22, the other end of the resistor R22 is electrically connected with one end of the resistor R9, an output end of the Schmitt trigger U5C and one end of the resistor R21 respectively; the other end of the resistor R9 is connected with a 3.3V power source; two input ends of the Schmitt trigger U5C are connected with each other and are electrically connected with the control unit, and the other end of the resistor R21 and the emitter of the triode Q4 are electrically connected and are both grounded; and the other end of the capacitor C9, the other end of the resistor R17 and the other end of the resistor R8 are connected with each other and are all grounded;

one end of the resistor R124 is electrically connected with the control unit, the other end of the resistor R124 is electrically connected with one end of the resistor R105 and the base of the triode Q2 respectively, and the other end of the resistor R105 and the emitter of the triode Q2 are connected with each other and are both grounded; the collector of the triode Q2 is electrically connected with one end of the resistor R12, the other end of the resistor R12 is electrically connected with one input end of the Schmitt trigger U5B and one end of the resistor R103 respectively, and the other end of the resistor R103 and one end of the resistor R33 are connected with each other and are both connected with the 3.3V power source; the other end of the resistor R33 is electrically connected with the other input end of the Schmitt trigger U5B and an output end of the voltage comparator U3B respectively, and an output end of the Schmitt trigger U5B is electrically connected with the control unit; a forward input end of the voltage comparator U3B is electrically connected with one end of the resistor R32, one end of the resistor R34 and one end of the capacitor C75 respectively, one end of the resistor R32 is connected with the 3.3V power source, and the other end of the resistor R34 and the other end of the capacitor C75 are connected with each other and are both grounded; and a reverse input end of the voltage comparator U3B is connected with the 3.3V power source via the resistor R15;

the reverse input end of the voltage comparator U3B is electrically connected with one end of the capacitor C8, one end of the capacitor C10 and an output end of the voltage comparator U3A respectively, the other end of the capacitor C10 is grounded, and the other end of the capacitor C8 is electrically connected with a forward input end of the voltage comparator U3A, the anode of the diode D8, the cathode of the diode D10 and one end of the resistor R18 respectively; a reverse input end of the voltage comparator U3A is electrically connected with one end of the resistor R29, the cathode of the diode D8, the anode of the diode D9, one end of the capacitor C15, one end of the capacitor C16, one end of the capacitor C17, one end of the capacitor C81 and one end of the resistor R20 respectively, and the other end of the resistor R29, the other end of the capacitor C15, the other end of the capacitor C16, the other end of the capacitor C17 and the other end of the capacitor C81 are connected with each other and are all grounded; the cathode of the diode D9 is electrically connected with the anode of the diode D10, the other end of the resistor R20 is electrically connected with the cathode of the diode D11 and one end of the capacitor C6 respectively, the other end of the capacitor C6 is grounded, and the anode of the diode D11 and the other end of the resistor R18 are both electrically connected with an output end of the operational amplifier U15B;

a reverse input end of the operational amplifier U15B is electrically connected with the output end of the operational amplifier U15B, and a forward input end of the operational amplifier U15B is electrically connected with an output end of the operational amplifier U15A, one end of the capacitor C202 and one end of the resistor R205 respectively; the other end of the capacitor C202, the other end of the resistor R205, one end of the capacitor C200 and one end of the resistor R203 are all electrically connected with a reverse input end of the operational amplifier U15A, the other end of the capacitor C200 is grounded, the other end of the resistor R203 is electrically connected with one end of the resistor R201 and the anode of the voltage-stabilizing diode ZW10 respectively, the other end of the resistor R201 is grounded, the cathode of the voltage-stabilizing diode ZW10 is electrically connected with the second pin of the voltage-stabilizing chip U1 and one end of the resistor R7 respectively, and the other end of the resistor R7 is electrically connected with the cathode of the voltage-stabilizing diode ZW11, one end of the capacitor C4 and the M-BUS overcurrent protection circuit respectively; the anode of the voltage-stabilizing diode ZW11 is electrically connected with one end of the resistor R202 and one end of the resistor R204 respectively, the other end of the resistor R202 is grounded, the other end of the resistor R204 is electrically connected with one end of the capacitor C201 and a forward input end of the operational amplifier U15A respectively, the other end of the capacitor C201 is grounded, and a power end of the operational amplifier U15A is grounded after passing through the capacitor C203; and the anode of the diode D2 is connected with the 32V power source, the cathode of the diode D2 is electrically connected with one end of the resistor R117 and one end of the capacitor C7 respectively, the other end of the resistor R117 is electrically connected with one end of the capacitor C5, and the other end of the capacitor C7 and the other end of the capacitor C5 are connected with each other and are both grounded.

The present invention adopts the other technical solution:

an M-BUS-based 4G water meter collector includes a power module, a control unit, a 4G communication module, a Bluetooth communication module, an SIM card circuit, a water meter communication interface, an antenna, a lightning protection circuit and the above-mentioned M-BUS receiving circuit;

wherein the power module is electrically connected with the control unit and the 4G communication module respectively, the control unit is electrically connected with the SIM card circuit, the Bluetooth communication module and the M-BUS receiving circuit respectively, the 4G communication module is electrically connected with the antenna, the M-BUS receiving circuit is electrically connected with the water meter communication interface, and the water meter communication interface is eclectically connected with the lightning protection circuit.

The present invention has the following beneficial effects: the M-BUS receiving circuit provided by the present invention is disposed between the control unit and the M-BUS overcurrent protection circuit, and is used for connecting the control unit and the M-BUS overcurrent protection circuit. The M-BUS receiving circuit consists of an adjustable voltage-stabilizing power source LM317, a Schmitt trigger CD4093, a comparator LM393, a triode Q2, a triode Q4, a diode D2, a diode D8, a diode D9, a diode D10, a diode D1, and several resistance-capacitance circuits. A system is boosted from 12 VDC to 32 VDC, the voltage is regulated to ±15 VDC by an adjustable voltage-stabilizing power source U1, and is reduced to 7.5 VDC by a voltage-stabilizing tube, then, 1.5 VDC input to a pin IN− and a pin IN+ of a second comparator by a high level is output by a first pin of a comparator U3, and a low level is output from a seventh pin to trigger the Schmitt trigger to receive MBUS communication data. The base of the triode Q2 is controlled by a single chip microcomputer to enable the Schmitt trigger, when the MBUS data is required to be received, the pin is enabled, a regulating voltage, for regulating a pin ADJ of a voltage stabilizer U1, of the triode Q4 is controlled at about 15 VDC, a 32 VDC voltage is isolated by the diode D2 and a capacitor, that is, if fluctuation is generated when a 12 VDC power source is input, MBUS communication cannot be affected within the mS-level time, and the diode D10 isolates a signal of a second pin of the comparator to form an amplitude limiting circuit together with the diode D8 and the diode D9, so that the comparator is prevented from entering zero-cross comparison; and the diode D1 is connected to an input pin and a grounding pin of the voltage stabilizer U1, so that the phenomenon that a protective voltage signal is connected reversely to destroy the effect of the voltage stabilizer U1 is avoided. Therefore, the M-BUS receiving circuit provided by the present invention can greatly increase the signal-to-noise ratio, and the reliability and stability thereof are significantly improved. Similarly, the M-BUS-based 4G water meter collector further provided by the present invention can effectively improve the stability of water meter data collection.

DETAILED DESCRIPTION

In order to describe the technical content as well as the achieved purpose and effect of the present invention in detail, description is performed below in conjunction with implementation manners and cooperation with the accompanying drawings.

Figure 1:
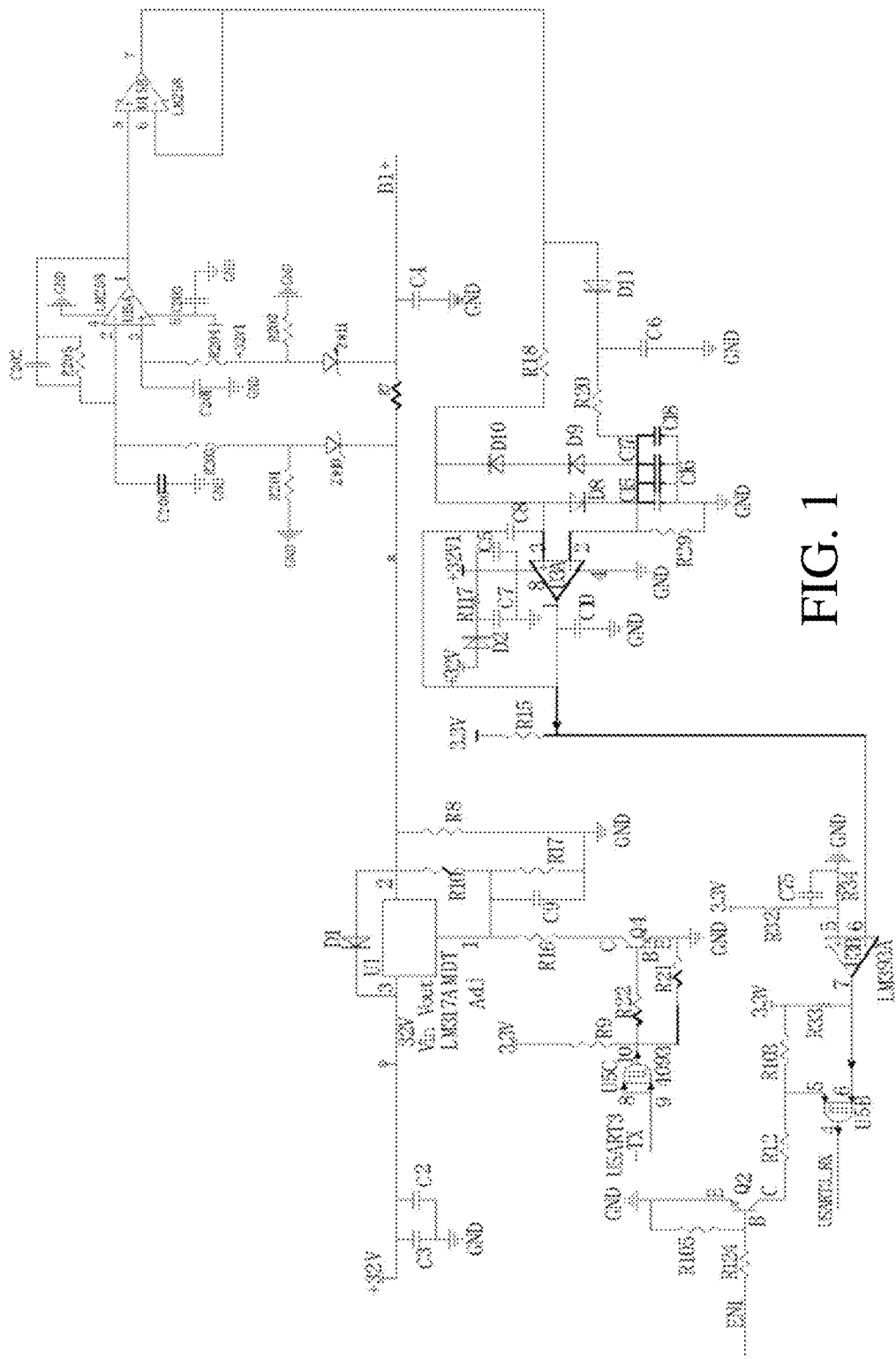
FIG. 1 is a circuit connection diagram of an M-BUS receiving circuit provided by the present invention.

Reference is made to FIG. 1 to FIG. 29, specifically, as shown in FIG. 1, the present invention provides an M-BUS receiving circuit disposed between a control unit and an M-BUS overcurrent protection circuit and used for connecting the control unit and the M-BUS overcurrent protection circuit. The M-BUS receiving circuit includes a capacitor C3, a capacitor C2, a voltage-stabilizing chip U1, a diode D1, a resistor R16, a resistor R10, a resistor R8, a resistor R17, a capacitor C9, a resistor R9, a resistor R21, a resistor R22, a triode Q4, a Schmitt trigger U5C, a resistor R124, a resistor R105, a triode Q2, a resistor R12, a resistor R103, a resistor R33, a Schmitt trigger U5B, a voltage comparator U3B, a resistor R32, a resistor R34, a capacitor C75, a resistor R15, a diode D2, a resistor R117, a capacitor C7, a capacitor C5, a capacitor C8, a capacitor C10, a voltage comparator U3A, a resistor R29, a diode D8, a diode D9, a diode D10, a diode D11, a capacitor C15, a capacitor C16, a capacitor C17, a capacitor C81, a capacitor C6, a resistor R18, a resistor R20, a resistor R205, a resistor R203, a resistor R204, a resistor R201, a resistor R202, a resistor R7, a capacitor C202, a capacitor C200, a capacitor C201, a capacitor C203, a capacitor C4, an operational amplifier U15A, a voltage-stabilizing diode ZW10, a voltage-stabilizing diode ZW11, and an operational amplifier U15B;

wherein the capacitance value of the capacitor C3 is 0.1 µF; the capacitance value of the capacitor C2 is 0.01 µF; the voltage-stabilizing chip U1 is of the type LM317AMDT; the diode D1 is of the type SS16; the resistance value of the resistor R16 is 2.4 KΩ; the resistance value of the resistor R10 is 160Ω; the resistance value of the resistor R8 is 5.1 KΩ; the resistance value of the resistor R17 is 1 MS2; the capacitance value of the capacitor C9 is 0.01 µF; the resistance value of the resistor R9 is 1 MS2; the resistance value of the resistor R21 is 10 KΩ; the resistance value of the resistor R22 is 1 KΩ; the triode Q4 is of the type MMBT5551; the Schmitt trigger U5C is of the type 4093; the resistance value of the resistor R124 is 1 KΩ; the resistance value of the resistor R105 is 1 KΩ; the triode Q2 is of the type MMBT5551; the resistance value of the resistor R12 is 1 KΩ; the resistance value of the resistor R103 is 100Ω; the resistance value of the resistor R33 is 1 KΩ; the Schmitt trigger U5B is of the type 4093; the voltage comparator U3B is of the type LM393A; the resistance value of the resistor R32 is 10 KΩ; the resistance value of the resistor R34 is 10 KΩ; the capacitance value of the capacitor C75 is 0.1 µF; the resistance value of the resistor R15 is 1 KΩ; the diode D2 is of the type 1N4148; the resistance value of the resistor R117 is 100Ω; the capacitance value of the capacitor C7 is 0.1 µF; the capacitance value of the capacitor C5 is 4.7 µF; the capacitance value of the capacitor C8 is 39 pF; the capacitance value of the capacitor C10 is 0.001 µF; the voltage comparator U3A is of the type LM393A; the resistance value of the resistor R29 is 3 MS2; the diode D8, the diode D9 and the diode D10 are of the type 1N4148; the diode D11 is of the type BAT41ZFILM; the capacitance values of the capacitor C15, the capacitor C16, the capacitor C17 and the capacitor C81 are all 4.7 µF; the capacitance value of the capacitor C6 is 1000 pF; the resistance values of the resistor R18 and the resistor R20 are both 4.7 KΩ; the resistance value of the resistor R205 is 33 KΩ; the resistance values of the resistor R203 and the resistor R204 are both 1 KΩ; the resistance values of the resistor R201 and the resistor R202 are both 5.1 KΩ, and the precision is 1%; the resistance value of the resistor R7 is 2Ω, and the wattage is 5W; the capacitance value of the capacitor C202 is 39 pF, and the voltage value thereof is 50 V; the capacitance values of the capacitor C200, the capacitor C201 and the capacitor C203 are all 0.1 the voltage values thereof are all 50 V; the capacitance value of the capacitor C4 is 0.22 µF, and the voltage value thereof is 50 V; the operational amplifier U15A and the operational amplifier U15B are both of the type LM258; and the voltage-stabilizing diode ZW10 and the voltage-stabilizing diode ZW11 are both of the type ZMM2V4;

the capacitor C3 is connected in parallel with the capacitor C2, one end of the parallel capacitor C3 and capacitor C2 is grounded, and the other end of the parallel capacitor C3 and capacitor C2 and a third pin of the voltage-stabilizing chip U1 are both electrically connected with a 32V power source; the cathode of the diode D1 is electrically connected with the third pin of the voltage-stabilizing chip U1, and the anode of the diode D1 is electrically connected with a second pin of the voltage-stabilizing chip U1; the second pin of the voltage-stabilizing chip U1 is electrically connected with one end of the resistor R10 and one end of the resistor R8 respectively, the other end of the resistor R10 is electrically connected with a first pin of the voltage-stabilizing chip U1, one end of the resistor R16, one end of the capacitor C9 and one end of the resistor R17 respectively, the other end of the resistor R16 is electrically connected with the collector of the triode Q4, the base of the triode Q4 is electrically connected with one end of the resistor R22, the other end of the resistor R22 is electrically connected with one end of the resistor R9, an output end of the Schmitt trigger U5C and one end of the resistor R21 respectively, the other end of the resistor R9 is connected with a 3.3V power source, two input ends of the Schmitt trigger U5C are connected with each other and are electrically connected with the control unit, and the other end of the resistor R21 and the emitter of the triode Q4 are electrically connected and are both grounded; and the other end of the capacitor C9, the other end of the resistor R17 and the other end of the resistor R8 are connected with each other and are all grounded;

one end of the resistor R124 is electrically connected with the control unit, the other end of the resistor R124 is electrically connected with one end of the resistor R105 and the base of the triode Q2 respectively, and the other end of the resistor R105 and the emitter of the triode Q2 are connected with each other and are both grounded; the collector of the triode Q2 is electrically connected with one end of the resistor R12, the other end of the resistor R12 is electrically connected with one input end of the Schmitt trigger U5B and one end of the resistor R103 respectively, and the other end of the resistor R103 and one end of the resistor R33 are connected with each other and are both connected with the 3.3V power source; the other end of the resistor R33 is electrically connected with the other input end of the Schmitt trigger U5B and an output end of the voltage comparator U3B respectively, and an output end of the Schmitt trigger U5B is electrically connected with the control unit; a forward input end of the voltage comparator U3B is electrically connected with one end of the resistor R32, one end of the resistor R34 and one end of the capacitor C75 respectively, one end of the resistor R32 is connected with the 3.3V power source, and the other end of the resistor R34 and the other end of the capacitor C75 are connected with each other and are both grounded; and a reverse input end of the voltage comparator U3B is connected with the 3.3V power source via the resistor R15;

the reverse input end of the voltage comparator U3B is electrically connected with one end of the capacitor C8, one end of the capacitor C10 and an output end of the voltage comparator U3A respectively, the other end of the capacitor C10 is grounded, and the other end of the capacitor C8 is electrically connected with a forward input end of the voltage comparator U3A, the anode of the diode D8, the cathode of the diode D10 and one end of the resistor R18 respectively; a reverse input end of the voltage comparator U3A is electrically connected with one end of the resistor R29, the cathode of the diode D8, the anode of the diode D9, one end of the capacitor C15, one end of the capacitor C16, one end of the capacitor C17, one end of the capacitor C81 and one end of the resistor R20 respectively, and the other end of the resistor R29, the other end of the capacitor C15, the other end of the capacitor C16, the other end of the capacitor C17 and the other end of the capacitor C81 are connected with each other and are all grounded; the cathode of the diode D9 is electrically connected with the anode of the diode D10, the other end of the resistor R20 is electrically connected with the cathode of the diode D11 and one end of the capacitor C6 respectively, the other end of the capacitor C6 is grounded, and the anode of the diode D11 and the other end of the resistor R18 are both electrically connected with an output end of the operational amplifier U15B;

a reverse input end of the operational amplifier U15B is electrically connected with the output end of the operational amplifier U15B, and a forward input end of the operational amplifier U15B is electrically connected with an output end of the operational amplifier U15A, one end of the capacitor C202 and one end of the resistor R205 respectively; the other end of the capacitor C202, the other end of the resistor R205, one end of the capacitor C200 and one end of the resistor R203 are all electrically connected with a reverse input end of the operational amplifier U15A, the other end of the capacitor C200 is grounded, the other end of the resistor R203 is electrically connected with one end of the resistor R201 and the anode of the voltage-stabilizing diode ZW10 respectively, the other end of the resistor R201 is grounded, the cathode of the voltage-stabilizing diode ZW10 is electrically connected with the second pin of the voltage-stabilizing chip U1 and one end of the resistor R7 respectively, and the other end of the resistor R7 is electrically connected with the cathode of the voltage-stabilizing diode ZW11, one end of the capacitor C4 and the M-BUS overcurrent protection circuit respectively; the anode of the voltage-stabilizing diode ZW11 is electrically connected with one end of the resistor R202 and one end of the resistor R204 respectively, the other end of the resistor R202 is grounded, the other end of the resistor R204 is electrically connected with one end of the capacitor C201 and a forward input end of the operational amplifier U15A respectively, the other end of the capacitor C201 is grounded, and a power end of the operational amplifier U15A is grounded after passing through the capacitor C203; and the anode of the diode D2 is connected with the 32V power source, the cathode of the diode D2 is electrically connected with one end of the resistor R117 and one end of the capacitor C7 respectively, the other end of the resistor R117 is electrically connected with one end of the capacitor C5, and the other end of the capacitor C7 and the other end of the capacitor C5 are connected with each other and are both grounded.

The present invention has the following beneficial effects:

the M-BUS receiving circuit provided by the present invention is disposed between the control unit and the M-BUS overcurrent protection circuit, and is used for connecting the control unit and the M-BUS overcurrent protection circuit. The M-BUS receiving circuit consists of an adjustable voltage-stabilizing power source LM317, a Schmitt trigger CD4093, a comparator LM393, a triode Q2, a triode Q4, a diode D2, a diode D8, a diode D9, a diode D10, a diode D1, and several resistance-capacitance circuits. A system is boosted from 12 VDC to 32 VDC, the voltage is regulated to ±15 VDC by an adjustable voltage-stabilizing power source U1, and is reduced to 7.5 VDC by a voltage-stabilizing tube, then, 1.5 VDC input to a pin IN− and a pin IN+ of a second comparator by a high level is output by a first pin of a comparator U3, and a low level is output from a seventh pin to trigger the Schmitt trigger to receive MBUS communication data. The base of the triode Q2 is controlled by a single chip microcomputer to enable the Schmitt trigger, when the MBUS data is required to be received, the pin is enabled, a regulating voltage, for regulating a pin ADJ of a voltage stabilizer U1, of the triode Q4 is controlled at about 15 VDC, a 32 VDC voltage is isolated by the diode D2 and a capacitor, that is, if fluctuation is generated when a 12 VDC power source is input, MBUS communication cannot be affected within the mS-level time, and the diode D10 isolates a signal of a second pin of the comparator to form an amplitude limiting circuit together with the diode D8 and the diode D9, so that the comparator is prevented from entering zero-cross comparison; and the diode D1 is connected to an input pin and a grounding pin of the voltage stabilizer U1, so that the phenomenon that a protective voltage signal is connected reversely to destroy the effect of the voltage stabilizer U1 is avoided. Therefore, the M-BUS receiving circuit provided by the present invention can greatly increase the signal-to-noise ratio, and the reliability and stability thereof are significantly improved.

Figure 2:
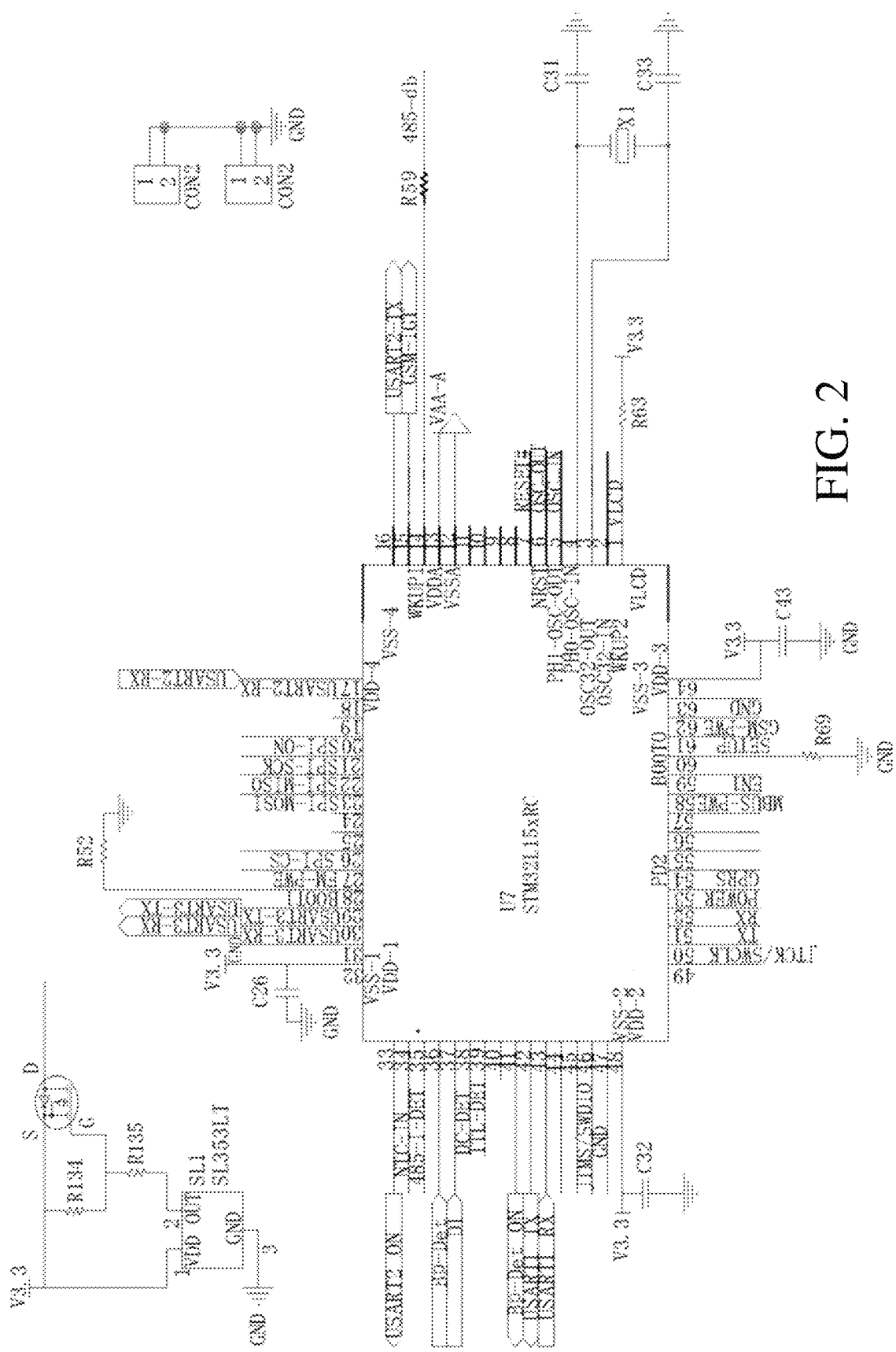
FIG. 2 is a circuit connection diagram of a control unit provided by the present invention.

Reference is made to FIG. 2, the control unit includes a control chip U7 of the type STM32L15xRC, the two input ends of the Schmitt trigger U5C are both electrically connected with a twenty-ninth pin (with the numeral USART3_TX) of the control chip U7, one end of the resistor R124 is electrically connected with a fifty-ninth pin (with the numeral EN1) of the control chip U7, and the output end of the Schmitt trigger U5B is electrically connected with a thirtieth pin (with the numeral USART3_RX) of the control chip U7. Specific parameters of all electronic components in FIG. 2 are shown as follows:

the resistance value of the resistor R134 is 1 MΩ, the resistance values of the resistors R135, R52, R69 and R63 are 10 KΩ, the MOS tube is of the type 2301, and the SL1 is of the type SL353LT. The capacitance values of the capacitors C26, C32 and C43 are 0.1 µF; the resistance value of the resistor R59 is 1 KΩ; the capacitance values of the capacitors C31 and C33 are 12 pF; and the crystal oscillation frequency of a crystal oscillator X1 is 32.768 K.

The above-mentioned control unit consists of a single chip microcomputer chip U7, various bypass capacitors, various control capacitors, various control resistances and crystal oscillators and a communication interface. The capacitor C26 is connected with a power pin VDD_1 of the single chip microcomputer, the capacitor C32 is connected with a second power VDD_2 of the single chip microcomputer, a capacitor C30 and a resistor R61 are connected with a pin RST of the single chip microcomputer chip to form a reset circuit, one end of each of the crystal oscillators is connected with a pin OSC32_OUT of the single chip microcomputer chip and is also connected to a capacitor C31, and the other end thereof is connected with a pin OSC32_IN of the single chip microcomputer chip and is also connected to a capacitor C33 to form an oscillating circuit by which a 32.768 kHz clock frequency is provided.

Figure 3:
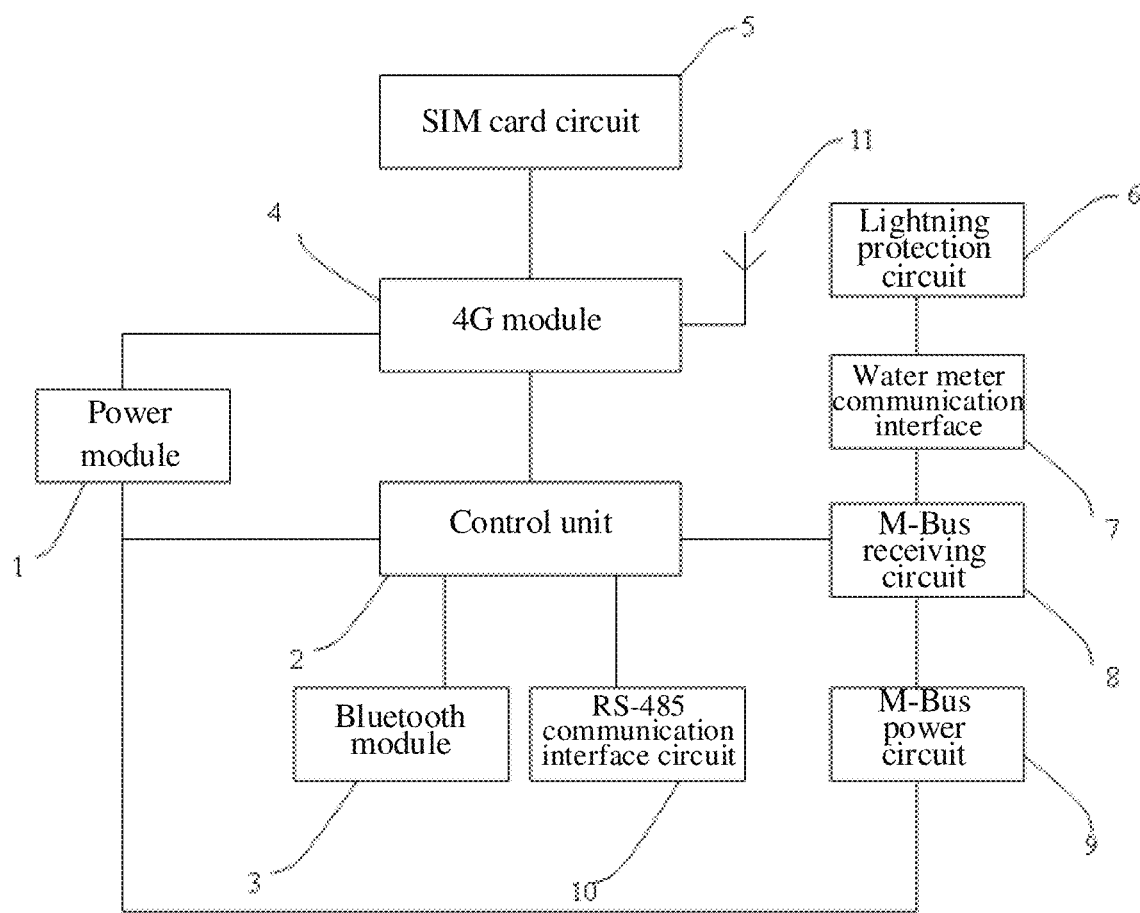
FIG. 3 is a module connection diagram of an M-BUS receiving circuit provided by the present invention.

Reference is made to FIG. 3, the present invention further provides an M-BUS-based 4G water meter collector, including a power module 1, a control unit 2, a 4G communication module 4, a Bluetooth communication module 3, an SIM card circuit 5, a water meter communication interface 7, an antenna 11, a lightning protection circuit 6 and the above-mentioned M-BUS receiving circuit 8;

wherein the power module 1 is electrically connected with the control unit 2 and the 4G communication module 4 respectively, the control unit 2 is electrically connected with the SIM card circuit 5, the Bluetooth communication module 3 the M-BUS receiving circuit 8 respectively, the 4G communication module 4 is electrically connected with the antenna 11, the M-BUS receiving circuit 8 is electrically connected with the water meter communication interface 7, and the water meter communication interface 7 is eclectically connected with the lightning protection circuit 6.

Similarly, the M-BUS-based 4G water meter collector further provided by the present invention can effectively improve the stability of water meter data collection.

Figure 4:
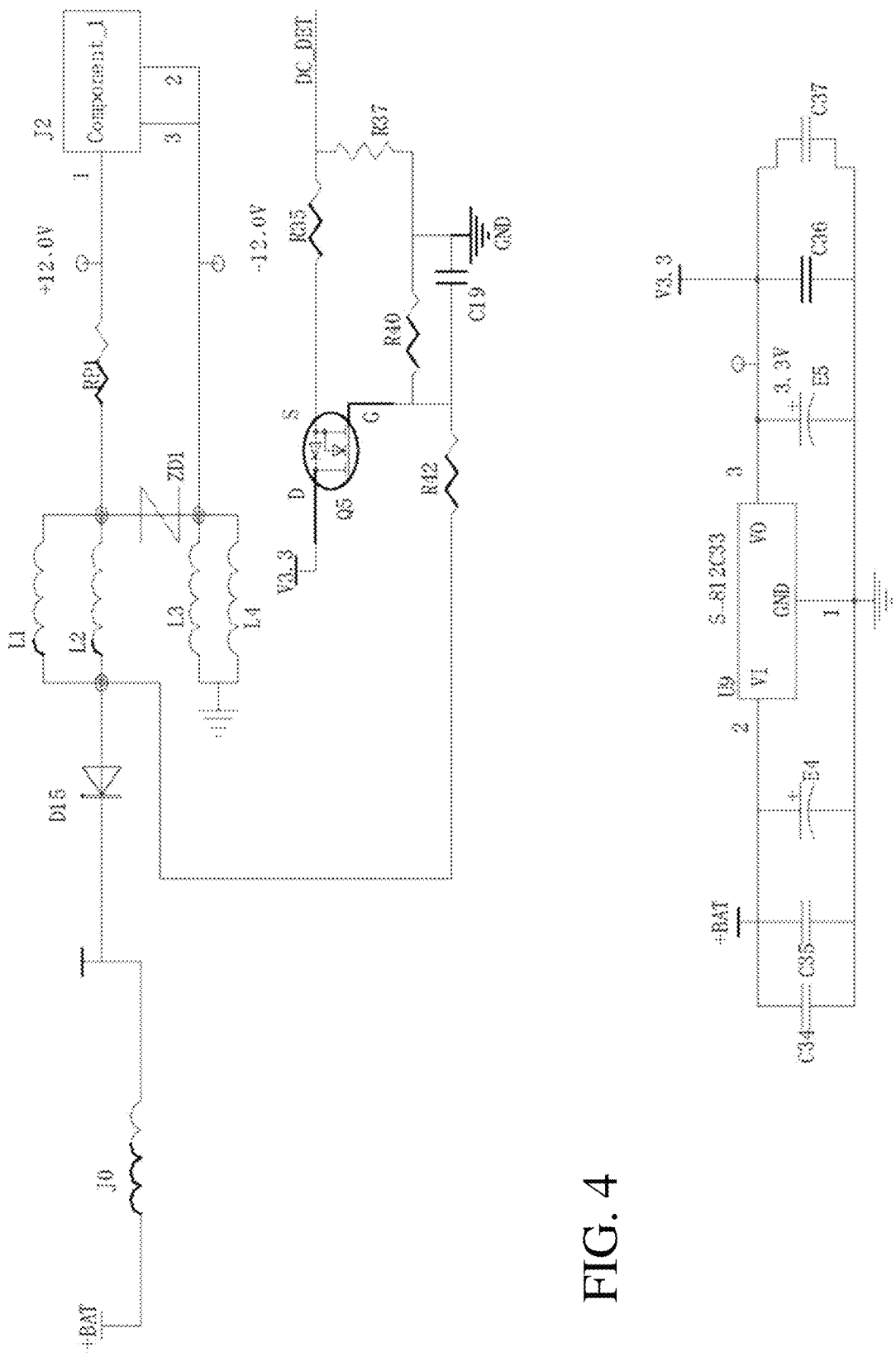
FIG. 4 is a circuit connection diagram of a power module provided by the present invention.

Reference is made to FIG. 4, the power module includes an inductor J0, an inductor L1, an inductor L2, an inductor L3, an inductor L4, a diode D15, a resistor RP1, a voltage-stabilizing tube ZD1, a socket J2, an MOS tube Q5, a resistor R35, a resistor R37, a resistor R40, a resistor R42, a capacitor C19, a voltage-stabilizing chip U9, a capacitor C34, a capacitor C35, a ceramic capacitor E4, a ceramic capacitor E5, a capacitor C36, and a capacitor C37;

wherein the nominal inductance of the inductor J0 is 0 R; the nominal inductance of the inductor L1, the inductor L2, the inductor L3 and the inductor L4 is 220 R/1A; the diode D15 is of the type SS34; the resistor RP1 is of the type PTC GP250-3A; the voltage-stabilizing tube ZD1 is of the type SMBJ15; the socket J2 is of the type Component 1; the MOS tube Q5 is of the type 2302; the resistance value of the resistor R35 is 4.7 KΩ; the resistance value of the resistor R37 is 100 KΩ; the resistance value of the resistor R40 is 1 MΩ; the resistance value of the resistor R42 is 1 MΩ; the capacitance value of the capacitor C19 is 0.1 µF; the voltage-stabilizing chip U9 is of the type S-812C33; the capacitance value of the capacitor C34 is 200 µF, and the voltage value thereof is 25 V; the capacitance value of the capacitor C35 is 100 nF; the capacitance values of the ceramic capacitor E4 and the ceramic capacitor E5 are 22 µF; the capacitance value of the capacitor C36 is 100 nF; and the capacitance value of the capacitor C37 is 0.22 F;

one end of the inductor J0 is electrically connected with a battery+BAT, the other end of the inductor J0 is electrically connected with the cathode of the diode D15, the anode of the diode D15 is electrically connected with one end of the inductor L1, one end of the inductor L2 and one end of the resistor R42 respectively, the other end of the inductor L1 is electrically connected with the other end of the inductor L2, one end of the resistor RP1 and one end of the voltage-stabilizing tube ZD1 respectively, the other end of the resistor RP1 is electrically connected with a first pin of the socket J2, and the other end of the voltage-stabilizing tube ZD1 is electrically connected with a second pin of the socket J2, a third pin of the socket J2, one end of the inductor L3 and one end of the inductor L4 respectively; the other end of the inductor L3 and the other end of the inductor L4 are connected with each other and are both grounded; the other end of the resistor R42 is electrically connected with the gate of the MOS tube Q5, one end of the resistor R40 and one end of the capacitor C19 respectively; the other end of the resistor R40, the other end of the capacitor C19 and one end of the resistor R37 are connected with each other and are all grounded; the other end of the resistor R37 is electrically connected with one end of the resistor R35 and a thirty-eighth pin of the control chip U7 respectively, the other end of the resistor R35 is electrically connected with the source of the MOS tube Q5, and the drain of the MOS tube Q5 is connected with a 3.3V power source; and a second pin of the voltage-stabilizing chip U9, one end of the capacitor C34, one end of the capacitor C35 and one end of the ceramic capacitor E4 are connected with each other and are all electrically connected with the battery+ BAT, a third pin of the voltage-stabilizing chip U9, one end of the ceramic capacitor E5, one end of the capacitor C36 and one end of the capacitor C37 are connected with each other and are all connected with the 3.3V power source, and the other end of the capacitor C34, the other end of the capacitor C35, the other end of the ceramic capacitor E4, a first pin of the voltage-stabilizing chip U9, the other end of the ceramic capacitor E5, the other end of the capacitor C36 and the other end of the capacitor C37 are connected with each other and are all grounded.

The above-mentioned power module consists of an inductor L1, an inductor L2, an inductor L3, an inductor L4, a diode ZD1, a diode D15, a switch tube Q5, a resistor R35, a resistor R37, a resistor R40, a resistor R42, and a socket Component_1, and is used for providing a voltage signal for each control unit, wherein the socket Component_1 is connected with one end of the resistor PR1, is connected with the inductor L3, the inductor L4 and the diode ZD1 and is grounded, the other end of the resistor RP1 is connected with the inductor L1, the inductor L2, the inductor L3, the inductor L4 and the diode ZD1 to form an overvoltage and filter circuit, and the switch tube Q5, the resistor R35, the resistor R37, the resistor R40 and the resistor R42 form a voltage control circuit. By adopting the above-mentioned structure, the problem that it is different for the collector to capture power on site is solved. By adopting a power consumption technology, the standby current of the power source is smaller than 0.3 µA, and the power source can supply power for a long time, so that it is possible to break through the restriction that it is difficult to capture power on site.

Figure 5:
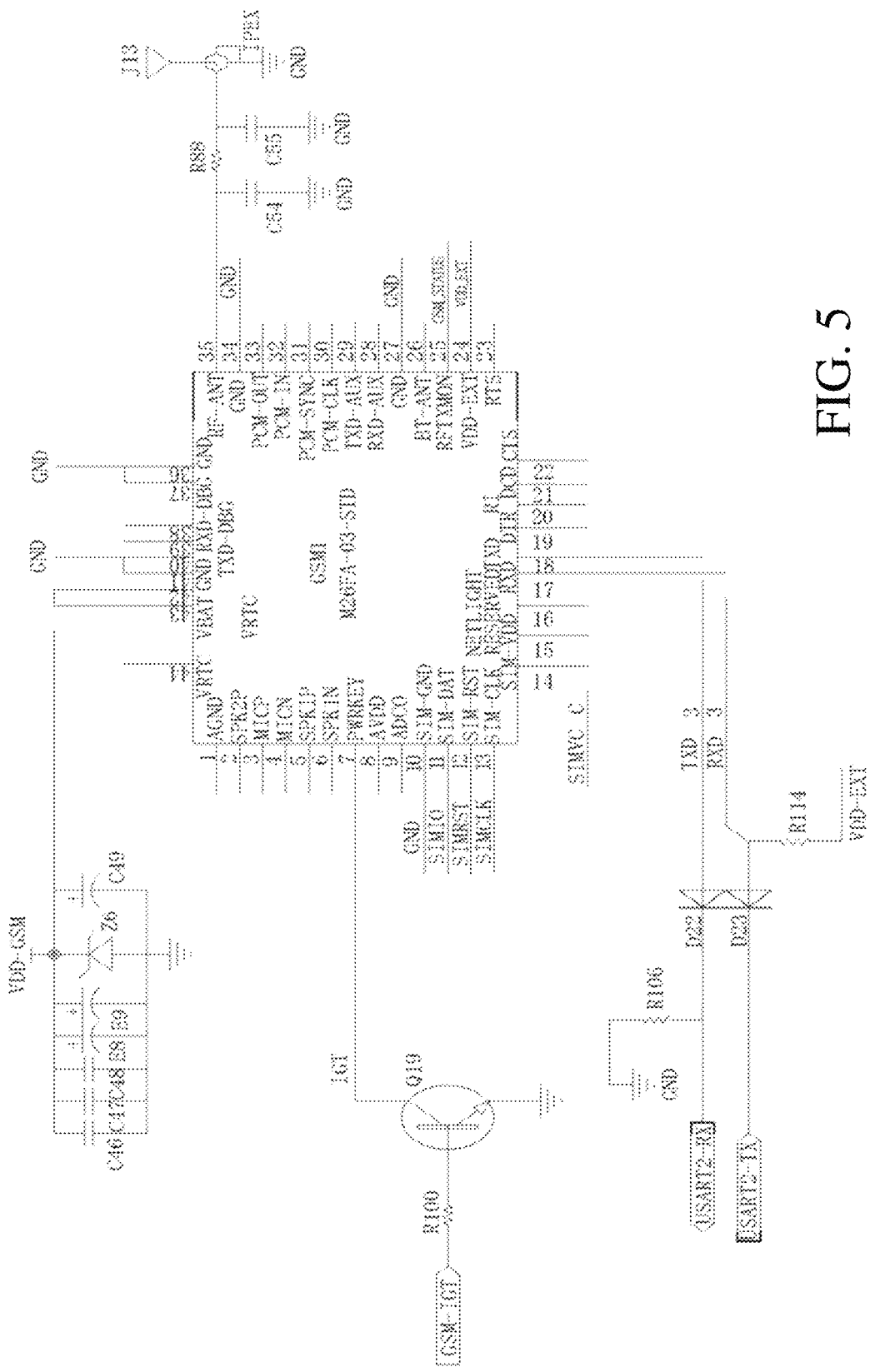
FIG. 5 is a circuit connection diagram of a 4G communication module provided by the present invention.

Reference is made to FIG. 5, the 4G communication module includes an integrated chip GSM1, a capacitor C46, a capacitor C47, a capacitor C48, a capacitor C49, a ceramic capacitor E8, a ceramic capacitor E9, a voltage-stabilizing diode Z6, a resistor R100, a triode Q19, a diode D22, a diode D23, a resistor R106, a resistor R114, a resistor R88, a capacitor C54, and a capacitor C55;

wherein the capacitance value of the capacitor C46 is 10 pF; the capacitance value of the capacitor C47 is 33 pF; the capacitance value of the capacitor C48 is 100 nF; the capacitance value of the capacitor C49 is 0.022 µF; the capacitance value of the ceramic capacitor E8 is 22 µF; the capacitance value of the ceramic capacitor E9 is 220 pF, and the voltage value thereof is 25 V; the voltage-stabilizing diode Z6 is of the type ZMNI5V1ST; the resistance value of the resistor R100 is 1 KΩ; the triode Q19 is of the type 9013; the diode D22 and the diode D23 are of the type 1N4148; the resistance values of the resistor R106 and the resistor R114 are 10 KΩ; and the resistance value of the resistor R88 is 0 R;

the integrated chip GSM1 is of the type M26FA-03-STD; one end of the capacitor C46, one end of the capacitor C47, one end of the capacitor C48, one end of the capacitor C49, one end of the ceramic capacitor E8, one end of the ceramic capacitor E9 and the cathode of the voltage-stabilizing diode Z6 are connected with each other and are all electrically connected with a forty-second pin and a forty-third pin of the integrated chip GSM1; the other end of the capacitor C46, the other end of the capacitor C47, the other end of the capacitor C48, the other end of the capacitor C49, the other end of the ceramic capacitor E8, the other end of the ceramic capacitor E9 and the anode of the voltage-stabilizing diode Z6 are connected with each other and are all grounded;

the base of the triode Q19 is electrically connected with a fifteenth pin of the control chip U7 via the resistor R100, the collector of the triode Q19 is electrically connected with a seventh pin of the integrated chip GSM1, and the emitter of the triode Q19 is grounded;

an eleventh pin, a twelfth pin, a thirteenth pin and a fourteenth pin of the integrated chip GSM1 are electrically connected with SIM card circuit; and a seventeenth pin of the integrated chip GSM1 is electrically connected with the anode of the diode D23 and one end of the resistor R114 respectively, the cathode of the diode D23 is electrically connected with a sixteenth pin of the control chip U7, and the other end of the resistor R114 is electrically connected with a twenty-fourth pin of the integrated chip GSM1; an eighteenth pin of the integrated chip GSM1 is electrically connected with the anode of the diode D22, the cathode of the diode D22 is electrically connected with one end of the resistor R106 and a seventeenth pin of the control chip U7 respectively, and the other end of the resistor R106 is grounded; and a thirty-fifth pin of the integrated chip GSM1 is electrically connected with one end of the resistor R88 and one end of the capacitor C54 respectively, the other end of the capacitor C54 is grounded, the other end of the resistor R88 is electrically connected with one end of the capacitor C55 and an IPEX antenna interface respectively, the IPEX antenna interface is electrically connected with the antenna, and the other end of the capacitor C55 is grounded.

The above-mentioned 4G communication module consists of an integrated chip GSM1, a capacitor C46, a capacitor C47, a capacitor C48, a capacitor E8, a capacitor E9, a capacitor C49, a capacitor C54, a capacitor C55, an antenna J13, a capacitor C68, a capacitor C69, a capacitor C70, a capacitor C71, a diode Z6, a diode D22, a diode D23, a triode Q19, a resistor R106, a resistor R88, a resistor R100, a resistor R114, a resistor R115, a resistor R116, an SIM card, and a card slot SIM CAR0, wherein the capacitor C46, the capacitor C47, the capacitor C48, the capacitor E8, the capacitor E9, the capacitor C49 and the diode Z6 are connected in parallel between VBAT and GND of a Bluetooth chip. The capacitor C54, the capacitor C55 and the resistor R88 form an antenna signal transceiving circuit connected to a pin RF_AIN of a 4G chip so as to complete the reception and transmission of 4G data. The triode Q19 and the resistor R100 form a signal control switch. The diode D22 and the diode D23 are connected with pins RXD and TXD of the 4G chip to form a signal isolation circuit. By adopting the above-mentioned structure, the problem of low network rate of the collector is solved, and the network rate of the collector is 30 to 18000 times as high as network rates of an existing GRPS and CDMA.

Figure 6:
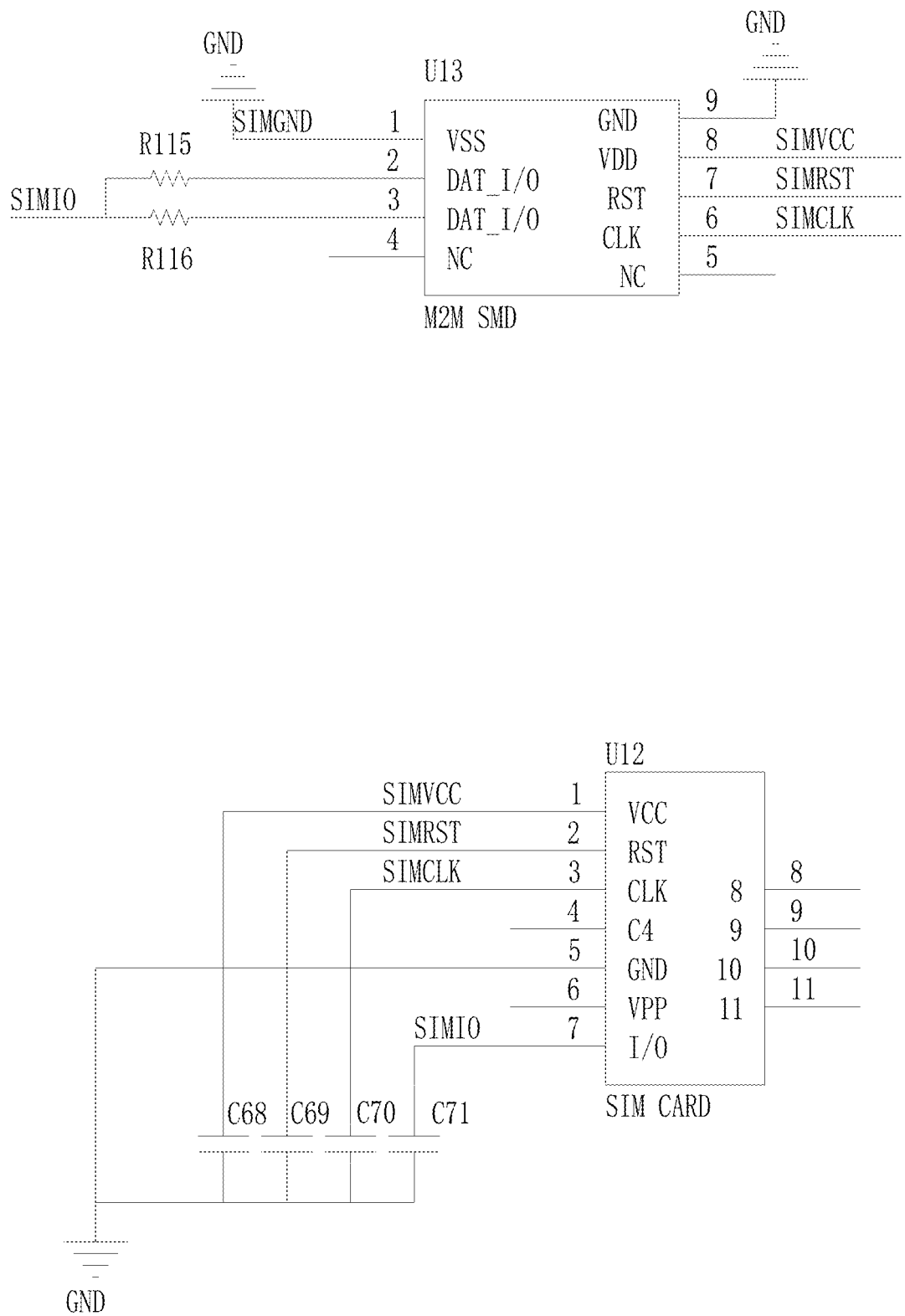
FIG. 6 is a circuit connection diagram of an SIM card circuit provided by the present invention.

Reference is made to FIG. 6, the SIM card circuit includes an integrated chip U13, a resistor R115, a resistor R116, an integrated chip U12, a capacitor C68, a capacitor C69, a capacitor C70, and a capacitor C71;

wherein the resistance value of the resistor R116 is 0 R; the capacitance value of the capacitor C68 is 0.1 pF; and the capacitance values of the capacitor C69, the capacitor C70 and the capacitor C71 are 22 pF;

the integrated chip U13 is an M2M-SMD, and the integrated chip U12 is an SIM-CARD;

a first pin and a ninth pin of the integrated chip U13 are grounded, a second pin of the integrated chip U13 is electrically connected with an eleventh pin of the integrated chip GSM1 via the resistor R115, a third pin of the integrated chip U13 is electrically connected with the eleventh pin of the integrated chip GSM1 via the resistor R116, a sixth pin of the integrated chip U13 is electrically connected with the thirteenth pin of the integrated chip GSM1, a seventh pin of the integrated chip U13 is electrically connected with the twelfth pin of the integrated chip GSM1, and an eighth pin of the integrated chip U13 is electrically connected with the fourteenth pin of the integrated chip GSM1; and a first pin of the integrated chip U12 is electrically connected with the fourteenth pin of the integrated chip GSM1 and one end of the capacitor C68 respectively, a second pin of the integrated chip U12 is electrically connected with the twelfth pin of the integrated chip GSM1 and one end of the capacitor C69 respectively, a third pin of the integrated chip U12 is electrically connected with the thirteenth pin of the integrated chip GSM1 and one end of the capacitor C70 respectively, a seventh pin of the integrated chip U12 is electrically connected with the eleventh pin of the integrated chip GSM1 and one end of the capacitor C71 respectively, and a fifth pin of the integrated chip U12, the other end of the capacitor C68, the other end of the capacitor C69, the other end of the capacitor C70 and the other end of the capacitor C71 are connected with each other and are all grounded.

It can be known from the above-mentioned circuit connection relationship that the antenna J13, the capacitor C68, the capacitor C69, the capacitor C70, the capacitor C71, the SIM card and the card slot SIM CARO are connected to form an SIM card slot module so that communication supporting the SIM card is achieved.

Figure 7:
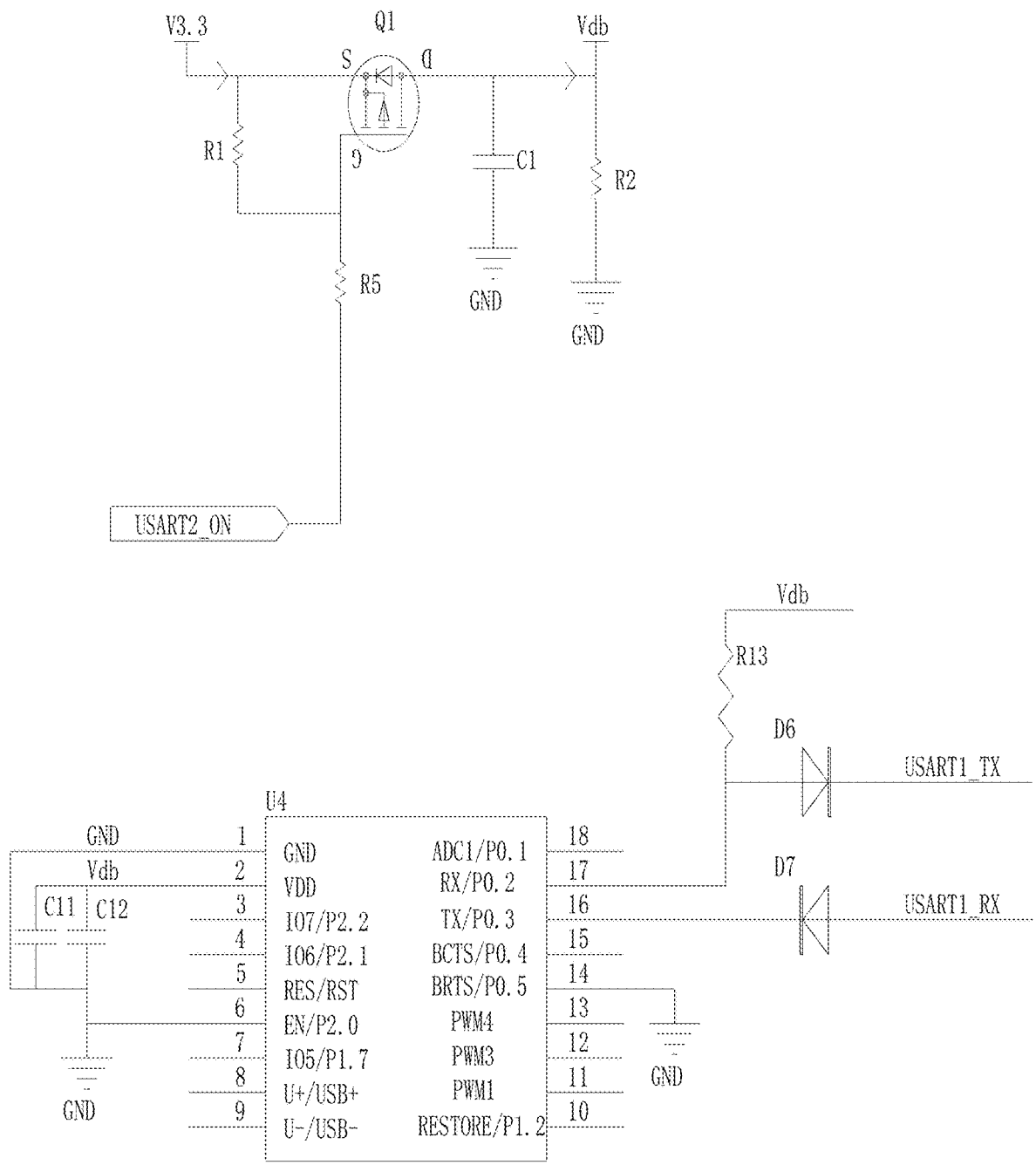
FIG. 7 is a circuit connection diagram of a Bluetooth communication module provided by the present invention.

Reference is made to FIG. 7, the Bluetooth communication module includes a resistor R1, a resistor R2, a resistor R5, a capacitor C1, an MOS tube Q1, an integrated chip U4, a capacitor C11, a capacitor C12, a resistor R13, a diode D6, and a diode D7;

wherein the resistance value of the resistor R1 is 47 KΩ; the resistance value of the resistor R2 is 1 KΩ; the resistance value of the resistor R5 is 4.7 KΩ; the capacitance value of the capacitor C1 is 0.1 µF; the MOS tube Q1 is of the type 2301; the capacitance value of the capacitor C11 is 0.1 µF; the capacitance value of the capacitor C12 is 22 µF; the resistance value of the resistor R13 is 10 KΩ; and the diode D6 and the diode D7 are of the type 1N4148;

one end of the resistor R1 and the source of the MOS tube Q1 are electrically connected and are both connected with the 3.3V power source; the other end of the resistor R1 is electrically connected with the gate of the MOS tube Q1 and one end of the resistor R5 respectively, and the other end of the resistor R5 is electrically connected with a thirty-third pin of the control chip U7; the drain of the MOS tube Q1 is electrically connected with one end of the capacitor C1 and one end of the resistor R2 respectively, and the other end of the capacitor C1 and the other end of the resistor R2 are both grounded; the drain of the MOS tube Q1 is electrically connected with one end of the resistor R13; and the other end of the resistor R13 is electrically connected with a seventeenth pin of the integrated chip U4 and the anode of the diode D6 respectively, and the cathode of the diode D6 is electrically connected with a forty-second pin of the control chip U7; the cathode of the diode D7 is electrically connected with a sixteenth pin of the integrated chip U4; the anode of the diode D7 is electrically connected with a forty-third pin of the control chip U7; a first pin, a sixth pin and a fourteenth pin of the integrated chip U4 are all grounded; and a second pin of the integrated chip U4 is electrically connected with one end of the capacitor C11 and one end of the capacitor C12 respectively, and the other end of the capacitor C11 and the other end of the capacitor C12 are both grounded.

The above-mentioned Bluetooth communication module consists of a Bluetooth control chip U4, a capacitor C11, a capacitor C12, a resistor R13, a diode D6, and a diode D7, wherein one end of the capacitor C11 and one end of the capacitor C12 are connected with the VDD of the Bluetooth control chip U4, the other ends thereof are connected with a pin GND, so that a bypass circuit is formed; and the diode D6 and the diode D7 are connected with pins RX and TX of a Bluetooth chip to form a signal isolation circuit. By adopting the above-mentioned structure, the problem that a near-end communication interface of the collector needs a connecting line and easily generates poor contact is solved, the Bluetooth module is built in the collector, and therefore, operation may be achieved by Bluetooth connection by means of an APP in a mobile phone.

Figure 8:
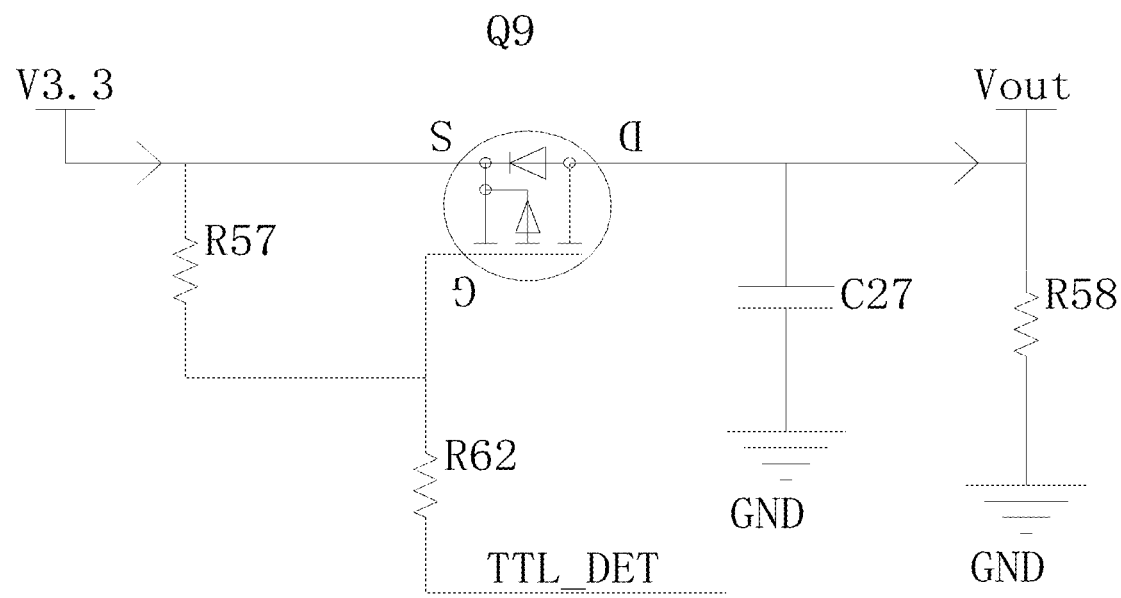
FIG. 8 is a circuit connection diagram of a water meter communication interface provided by the present invention.
Figure 8:
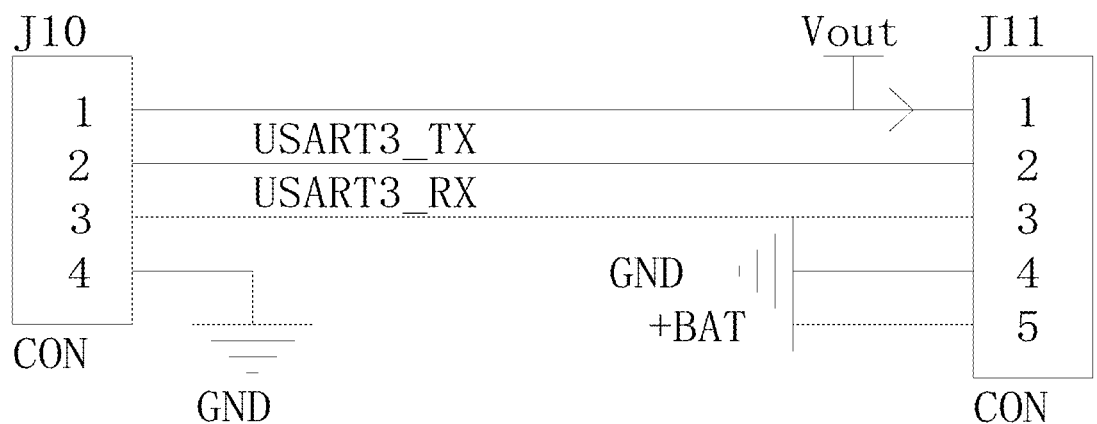

Reference is made to FIG. 8, the water meter communication interface includes a resistor R57, an MOS tube Q9, a resistor R62, a resistor R58, a capacitor C27, an interface J10, and an interface J11;

wherein the resistance value of the resistor R57 is 47 KΩ; the MOS tube Q9 is of the type 2301; the resistance value of the resistor R62 is 4.7 KΩ; the resistance value of the resistor R58 is 1 KΩ; and the capacitance value of the capacitor C27 is 0.1 µF;

one end of the resistor R57 and the source of the MOS tube Q9 are electrically connected and are both connected with the 3.3V power source; the other end of the resistor R57 is electrically connected with the gate of the MOS tube Q9 and one end of the resistor R62 respectively, the other end of the resistor R62 is electrically connected with a thirty-ninth pin of the control chip U7, the drain of the MOS tube Q9 is electrically connected with one end of the capacitor C27 and one end of the resistor R58 respectively, and the other end of the capacitor C27 and the other end of the resistor R58 are both grounded; and a first pin of the interface J10, a first pin of the interface J11 and the drain of the MOS tube Q9 are connected with each other; a second pin of the interface J10, a second pin of the interface J11 and a twenty-ninth pin of the control chip U7 are electrically connected; a third pin of the interface J10, a third pin of the interface J11 and a thirtieth pin of the control chip U7 are electrically connected; and a fourth pin of the interface J10 and a fourth pin of the interface J11 are grounded, and a fifth pin of the interface J11 is connected with the battery+BAT.

It can be known from the above-mentioned circuit connection relationship that the water meter communication module consists of a socket J11, a resistor R57, a resistor R62, a resistor R58, a capacitor C27, and an MOS tube Q9, wherein the resistor R57, the resistor R62, the resistor R58, the capacitor C27 and the MOS tube Q9 form a water meter power control, so that the collector is located on the same level with a water meter.

Reference is made to FIGS. 9 to 13, the lightning protection circuit includes a first branch circuit, a second branch circuit, a third branch circuit, a fourth branch circuit, and a fifth branch circuit.

Figure 9:
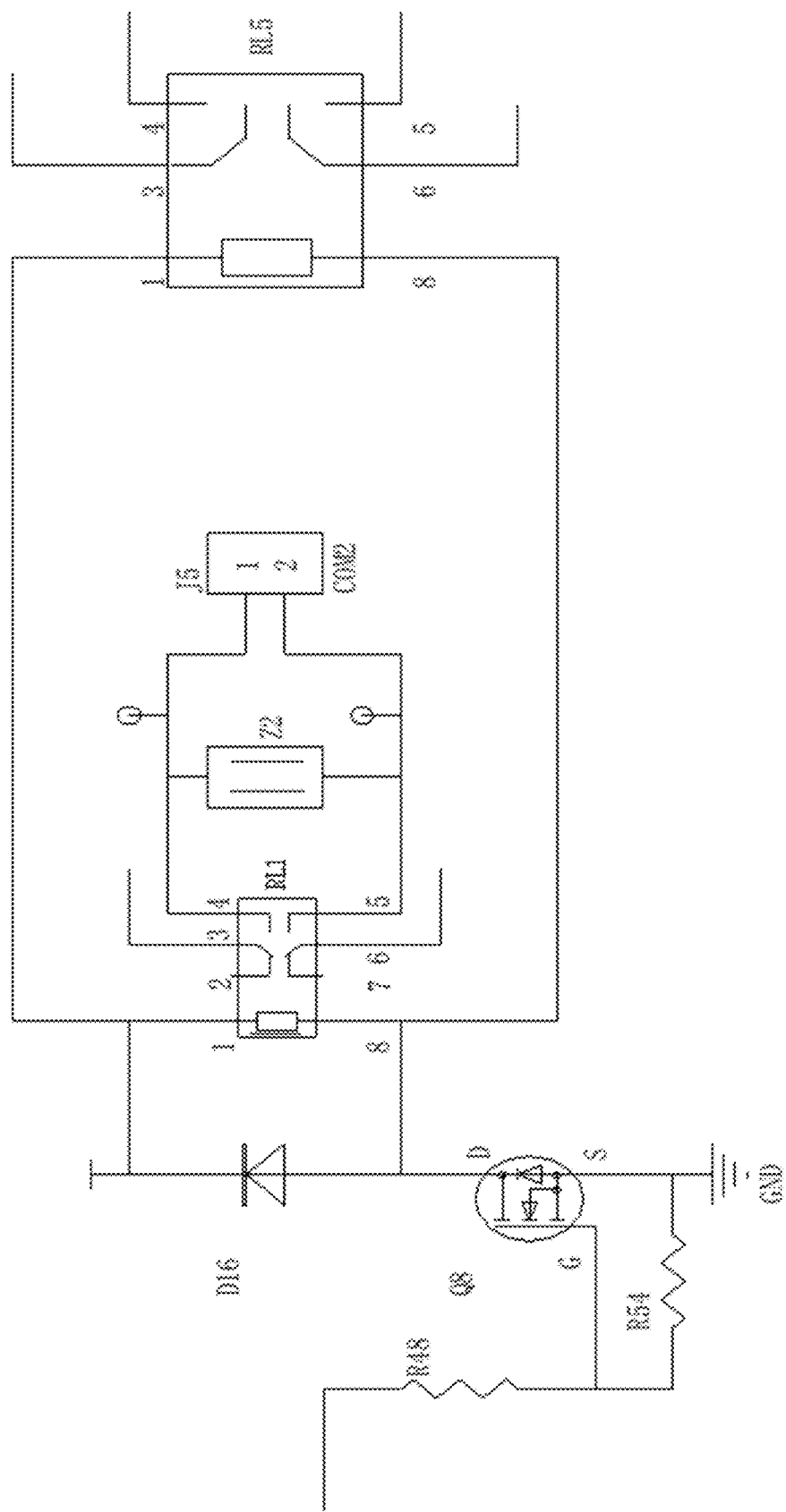
FIG. 9 is a circuit connection diagram of a first branch circuit of a lightning protection circuit provided by the present invention.

Specifically, as shown in FIG. 9, the first branch circuit includes a resistor R48, a resistor R54, an MOS tube Q8, a diode D16, a relay RL1, a diode Z2, an interface J5, and a relay RL5, wherein the resistance value of the resistor R48 is 10 KΩ; the resistance value of the resistor R54 is 1 MΩ; the MOS tube Q8 is of the type 2302; the diode D16 is of the type 1N4148; the relay RL1 is of the type HFD4/5; the diode Z2 is of the type TVS-Z; and the relay RL5 is of the type HF42F/05; and one end of the resistor R48 is electrically connected with a fifty-fourth pin of the control chip U7, the other end of the resistor R48 is electrically connected with the gate of the MOS tube Q8 and one end of the resistor R54 respectively, and the source of the MOS tube Q8 and the other end of the resistor R54 are both grounded; the drain of the MOS tube Q8 is electrically connected with the anode of the diode D16, an eighth pin of the relay RL1 and an eighth pin of the relay RL5 respectively, the cathode of the diode D16 is electrically connected with a first pin of the relay RL1 and a first pin of the relay RL5 respectively, a third pin of the relay RL1 is electrically connected with a sixth pin of the relay RL5, a sixth pin of the relay RL1 is electrically connected with a third pin of the relay RL5, a fourth pin of the relay RL1 is electrically connected with one end of the diode Z2, a first pin of the interface J5 and a fifth pin of the relay RL5 respectively, and a fifth pin of the relay RL1 is electrically connected with the other end of the diode Z2, a second pin of the interface J5 and a fourth pin of the relay RL5 respectively.

Figure 10:
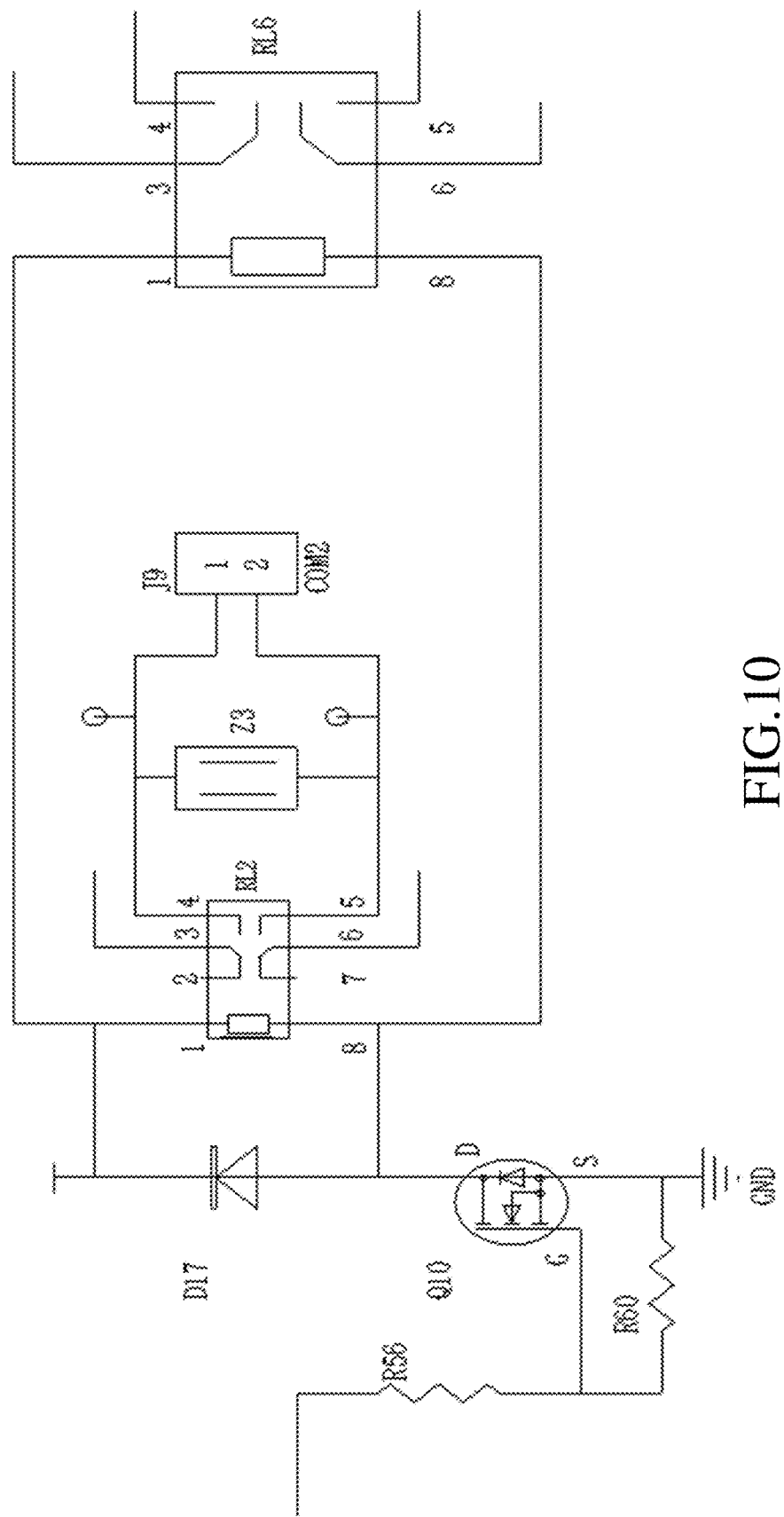
FIG. 10 is a circuit connection diagram of a second branch circuit of the lightning protection circuit provided by the present invention.

Specifically, as shown in FIG. 10, the second branch circuit includes a resistor R56, a resistor R60, an MOS tube Q10, a diode D17, a relay RL2, a diode Z3, an interface J9, and a relay RL6, wherein the resistance value of the resistor R56 is 10 KΩ; the resistance value of the resistor R60 is 1 MΩ; the MOS tube Q10 is of the type 2302; the diode D17 is of the type 1N4148; the relay RL2 is of the type HFD4/5; the diode Z3 is of the type TVS-Z; and the relay RL6 is of the type HF42F/05; and one end of the resistor R56 is electrically connected with a fifty-fifth pin of the control chip U7, the other end of the resistor R56 is electrically connected with the gate of the MOS tube Q10 and one end of the resistor R60 respectively, and the source of the MOS tube Q10 and the other end of the resistor R60 are both grounded; the drain of the MOS tube Q10 is electrically connected with the anode of the diode D17, an eighth pin of the relay RL2 and an eighth pin of the relay RL6 respectively, the cathode of the diode D17 is electrically connected with a first pin of the relay RL2 and a first pin of the relay RL6 respectively, a third pin of the relay RL2 is electrically connected with a sixth pin of the relay RL6, a sixth pin of the relay RL2 is electrically connected with a third pin of the relay RL6, a fourth pin of the relay RL2 is electrically connected with one end of the diode Z3, a first pin of the interface J9 and a fifth pin of the relay RL6 respectively, and a fifth pin of the relay RL2 is electrically connected with the other end of the diode Z3, a second pin of the interface J9 and a fourth pin of the relay RL6 respectively.

Figure 11:
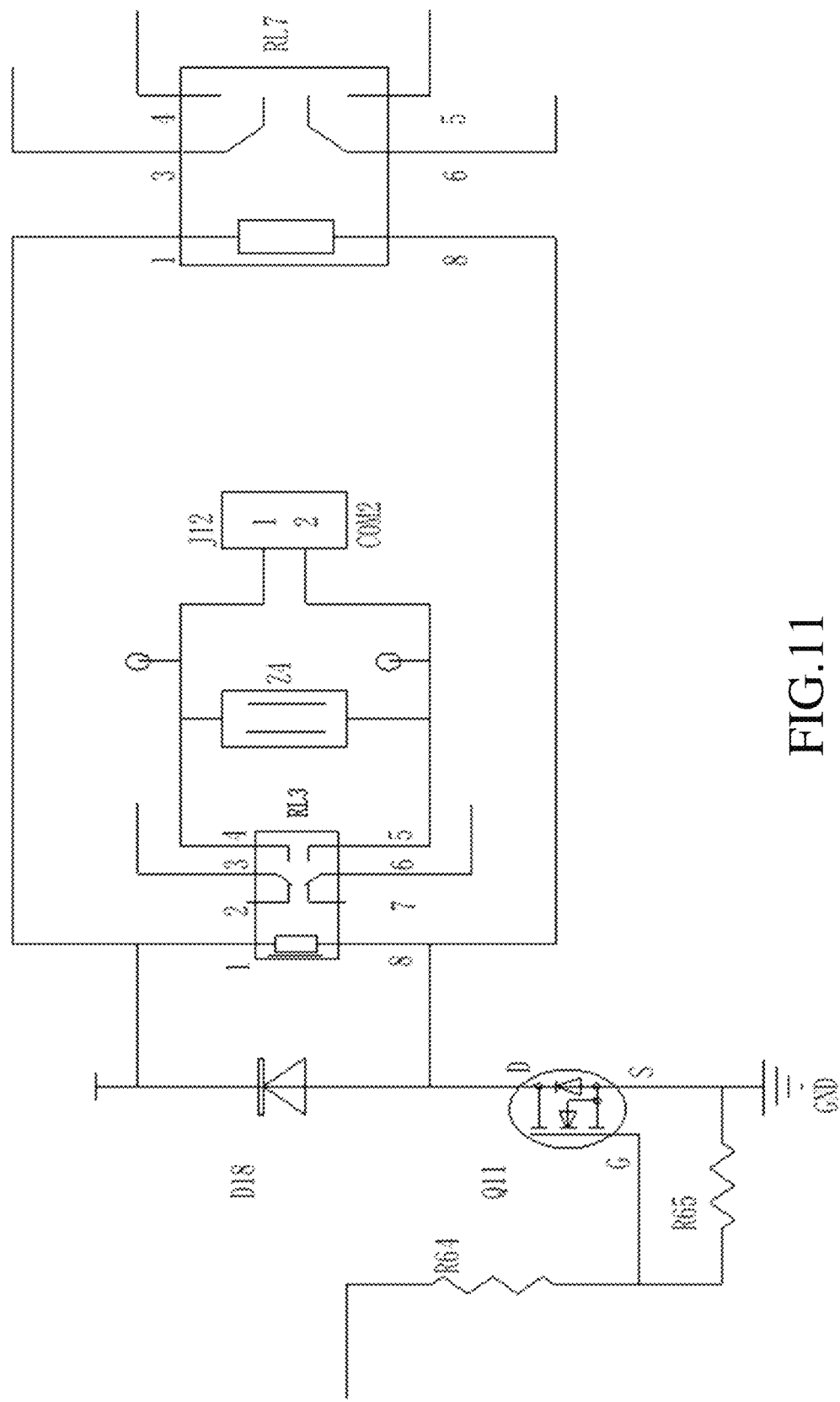
FIG. 11 is a circuit connection diagram of a third branch circuit of the lightning protection circuit provided by the present invention.

Specifically, as shown in FIG. 11, the third branch circuit includes a resistor R64, a resistor R65, an MOS tube Q11, a diode D18, a relay RL3, a diode Z4, an interface J12, and a relay RL7, wherein the resistance value of the resistor R64 is 10 KΩ; the resistance value of the resistor R65 is 1 MΩ; the MOS tube Q11 is of the type 2302; the diode D18 is of the type 1N4148; the relay RL3 is of the type HFD4/5; the diode Z4 is of the type TVS-Z; and the relay RL7 is of the type HF42F/05; and one end of the resistor R64 is electrically connected with a fifty-sixth pin of the control chip U7, the other end of the resistor R64 is electrically connected with the gate of the MOS tube Q11 and one end of the resistor R65 respectively, and the source of the MOS tube Q11 and the other end of the resistor R65 are both grounded; the drain of the MOS tube Q11 is electrically connected with the anode of the diode D18, an eighth pin of the relay RL3 and an eighth pin of the relay RL7 respectively, the cathode of the diode D18 is electrically connected with a first pin of the relay RL3 and a first pin of the relay RL7 respectively, a third pin of the relay RL3 is electrically connected with a sixth pin of the relay RL7, a sixth pin of the relay RL3 is electrically connected with a third pin of the relay RL7, a fourth pin of the relay RL3 is electrically connected with one end of the diode Z4, a first pin of the interface J12 and a fifth pin of the relay RL7 respectively, and a fifth pin of the relay RL3 is electrically connected with the other end of the diode Z4, a second pin of the interface J12 and a fourth pin of the relay RL7 respectively.

Figure 12:
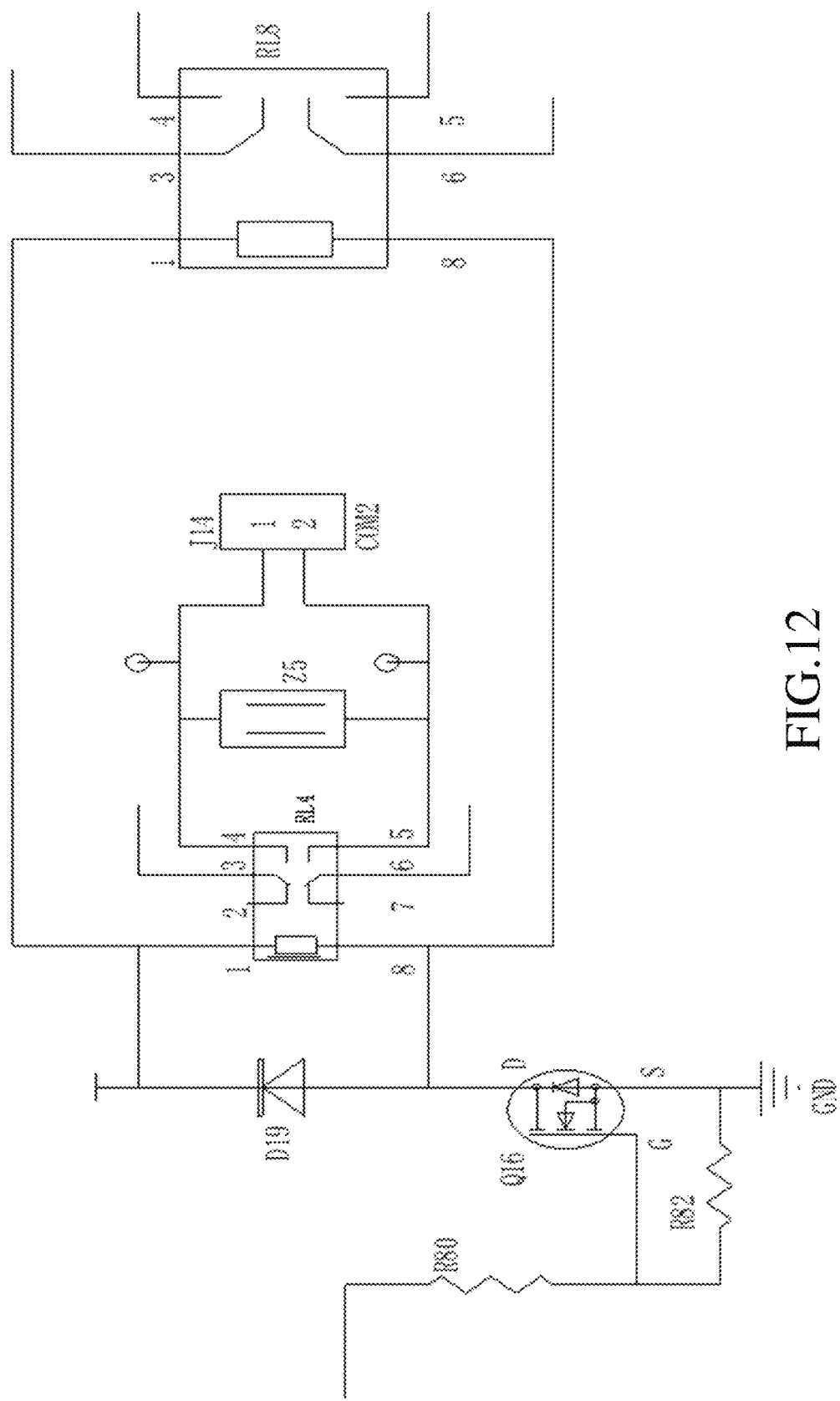
FIG. 12 is a circuit connection diagram of a fourth branch circuit of the lightning protection circuit provided by the present invention.

Specifically, as shown in FIG. 12, the fourth branch circuit includes a resistor R80, a resistor R82, an MOS tube Q16, a diode D19, a relay RL4, a diode Z5, an interface J14, and a relay RL8, wherein the resistance value of the resistor R80 is 10 KΩ; the resistance value of the resistor R82 is 1 MΩ; the MOS tube Q16 is of the type 2302; the diode D19 is of the type 1N4148; the relay RL4 is of the type HFD4/5; the diode Z5 is of the type TVS-Z; and the relay RL8 is of the type HF42F/05; and one end of the resistor R80 is electrically connected with a fifty-seventh pin of the control chip U7, the other end of the resistor R80 is electrically connected with the gate of the MOS tube Q16 and one end of the resistor R82 respectively, and the source of the MOS tube Q16 and the other end of the resistor R82 are both grounded; the drain of the MOS tube Q16 is electrically connected with the anode of the diode D19, an eighth pin of the relay RL4 and an eighth pin of the relay RL8 respectively, the cathode of the diode D19 is electrically connected with a first pin of the relay RL4 and a first pin of the relay RL8 respectively, a third pin of the relay RL4 is electrically connected with a sixth pin of the relay RL8, a sixth pin of the relay RL4 is electrically connected with a third pin of the relay RL8, a fourth pin of the relay RL4 is electrically connected with one end of the diode Z5, a first pin of the interface J14 and a fifth pin of the relay RL8 respectively, and a fifth pin of the relay RL4 is electrically connected with the other end of the diode Z5, a second pin of the interface J14 and a fourth pin of the relay RL8 respectively.

Figure 13:
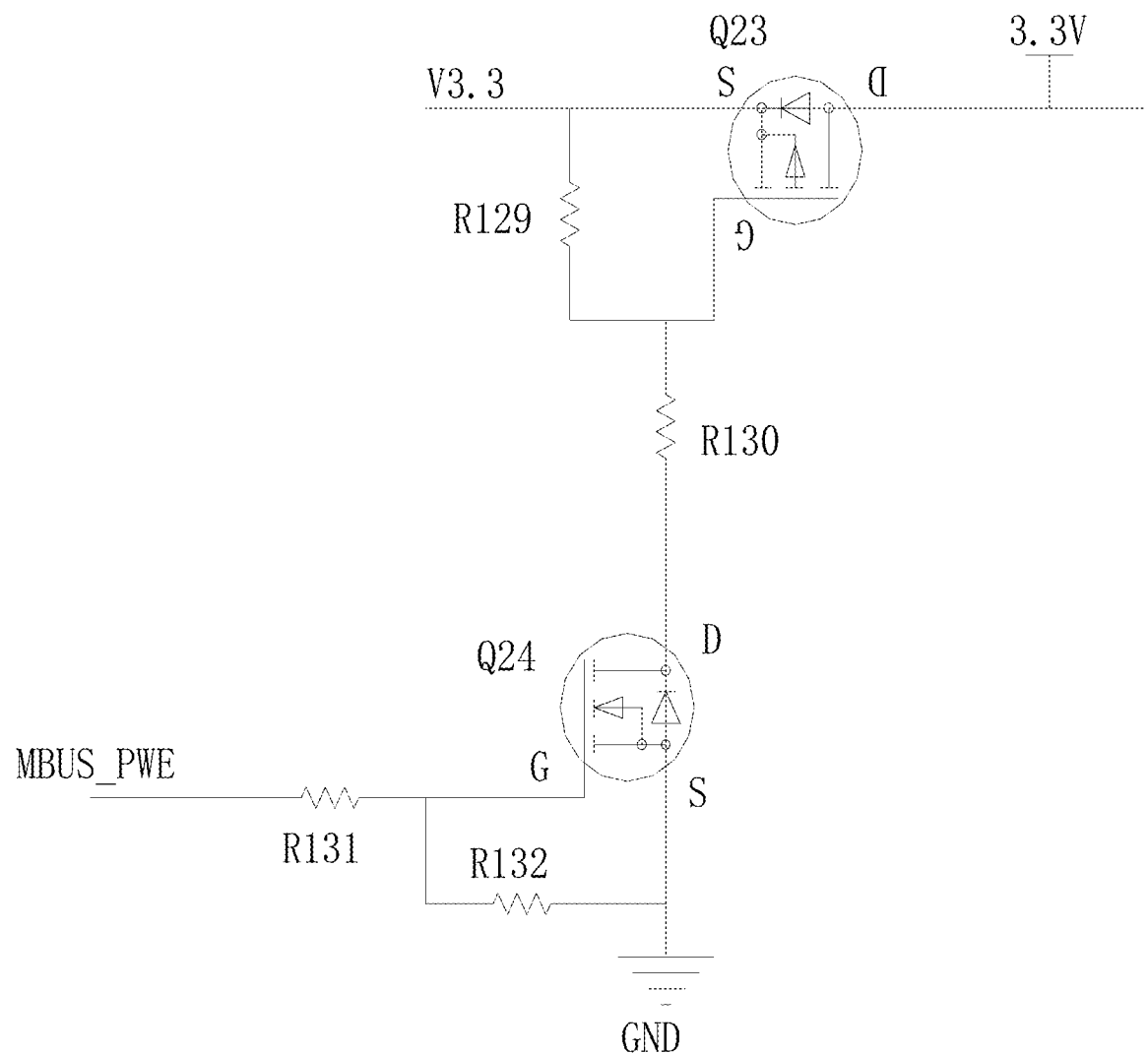
FIG. 13 is a circuit connection diagram of a fifth branch circuit of the lightning protection circuit provided by the present invention.

Specifically, as shown in FIG. 13, the fifth branch circuit includes a resistor R131, a resistor R132, a resistor R129, a resistor R130, an MOS tube Q24, and an MOS tube Q23, wherein the resistance value of the resistor R131 is 10 KΩ; the resistance values of the resistor R132 and the resistor R129 are 1 MΩ; the resistance value of the resistor R130 is 1 KΩ; the MOS tube Q24 is of the type 2302; and the MOS tube Q23 is of the type 2301; and one end of the resistor R131 is electrically connected with a fifty-eighth pin of the control chip U7, the other end of the resistor R131 is electrically connected with the gate of the MOS tube Q24 and one end of the resistor R132 respectively, and the source of the MOS tube Q24 and the other end of the resistor R132 are both grounded; the drain of the MOS tube Q24 is electrically connected with one end of the resistor R130, the other end of the resistor R130 is electrically connected with one end of the resistor R129 and the gate of the MOS tube Q23 respectively, the other end of the resistor R129 is electrically connected with the source of the MOS tube Q23, and the drain of the MOS tube Q23 is connected with the 3.3V power source.

It can be known from the above descriptions that the lightning protection circuit consists of a TVS (Transient Voltage Suppressor) ZD2, a TVS ZD3, a TVS ZD4, a TVS ZD5, a communication socket J5, a communication socket J9, a communication socket J12, and a communication socket J14, wherein the TVS ZD2 is connected with the communication socket J5 to form a first path of lightning protection circuit; the TVS ZD3 is connected with the communication socket J9 to form a second path of lightning protection circuit; the TVS ZD4 is connected with the communication socket J12 to form a third path of lightning protection circuit; and the TVS ZD5 is connected with the communication socket J14 to form a fourth path of lightning protection circuit.

Figure 14:
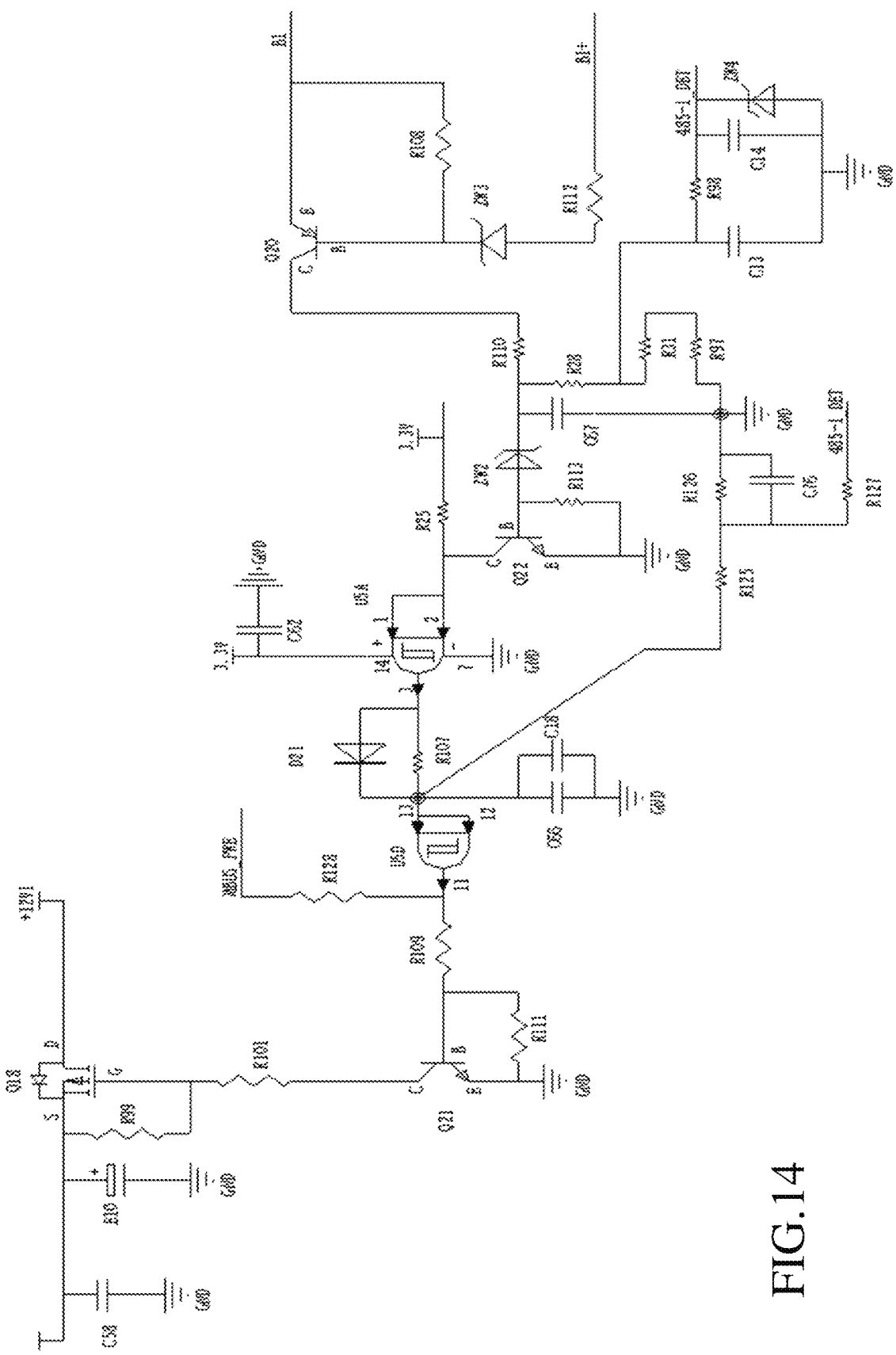
FIG. 14 is a circuit connection diagram of an overcurrent protection circuit provided by the present invention.

As shown in FIG. 14, the M-BUS-based 4G water meter collector provided by the present invention further includes an overcurrent protection circuit. The overcurrent protection circuit includes a capacitor C58, a ceramic capacitor E10, a resistor R99, an MOS tube Q18, a resistor R101, a triode Q21, a resistor R109, a resistor R111, a Schmitt trigger U5D, a resistor R128, a resistor R107, a capacitor C66, a capacitor C18, a diode D21, a capacitor C62, a Schmitt trigger U5A, a resistor R25, a triode Q22, a resistor R113, a resistor R110, a voltage-stabilizing diode ZW2, a capacitor C67, a resistor R28, a resistor R31, a resistor R97, a resistor R125, a resistor R126, a resistor R127, a capacitor C76, a triode Q20, a resistor R108, a voltage-stabilizing diode ZW3, a resistor R112, a resistor R98, a capacitor C13, a capacitor C14, and a voltage-stabilizing diode ZW4;

wherein the capacitance value of the capacitor C58 is 0.1 µF; the capacitance value of the ceramic capacitor E10 is 220 µF, and the voltage thereof is 50 V; the resistance value of the resistor R99 is 100 KΩ; the MOS tube Q18 is of the type IRFR9024N; the resistance value of the resistor R101 is 1 KΩ; the triode Q21 is of the type MMBT5551; the resistance value of the resistor R109 is 1 KΩ; the resistance value of the resistor R111 is 1 MΩ; the Schmitt trigger U5D is of the type 4093; the resistance value of the resistor R128 is 10 KΩ; the resistance value of the resistor R107 is 1.5 MΩ; the capacitance value of the capacitor C66 is 10 µF; the capacitance value of the capacitor C18 is 0.1 µF; the diode D21 is of the type 1N4148; the capacitance value of the capacitor C62 is 0.1 µF; the Schmitt trigger U5A is of the type 4093; the resistance value of the resistor R25 is 10 KΩ; the diode D22 is of the type MMBT5551; the resistance value of the resistor R113 is 10 KΩ; the resistance value of the resistor R110 is 51 KΩ; the voltage-stabilizing diode ZW2 is of the type ZMM15; the capacitance value of the capacitor C67 is 0.1 µF; the resistance value of the resistor R28 is 1 MΩ; the resistance value of the resistor R31 is 30 KΩ; the resistance value of the resistor R97 is 100 KΩ; the resistance value of the resistor R125 is 1 MΩ; the resistance value of the resistor R126 is 1 MΩ; the resistance value of the resistor R127 is 0 R; the capacitance value of the capacitor C76 is 0.1 µF; the triode Q20 is of the type 5401; the resistance value of the resistor R108 is 10 KΩ; the voltage-stabilizing diode ZW3 is of the type ZMM15; the resistance value of the resistor R112 is 10 KΩ; the resistance value of the resistor R98 is 30 KΩ; the capacitance value of the capacitor C13 is 0.1 pF; the capacitance value of the capacitor C14 is 0.1 pF; and the voltage-stabilizing diode ZW4 is of the type ZMM3V6; and one end of the capacitor C58, one end of the ceramic capacitor E10, one end of the resistor R99 and the source of the MOS tube Q18 are connected with each other, the other end of the capacitor C58 and the other end of the ceramic capacitor E10 are both grounded, the gate of the MOS tube Q18 is electrically connected with the other end of the resistor R99 and one end of the resistor R101 respectively, the other end of the resistor R101 is electrically connected with the collector of the triode Q21, the emitter of the triode Q21 is grounded, the base of the triode Q21 is electrically connected with one end of the resistor R109 and one end of the resistor R111 respectively, the other end of the resistor R111 is grounded, the other end of the resistor R109 is electrically connected with an output end of the Schmitt trigger U5D and one end of the resistor R128 respectively, the other end of the resistor R128 is electrically connected with the fifty-eighth pin of the control chip U7, and two input ends of the Schmitt trigger U5D are connected with each other and are electrically connected with the cathode of the diode D21, one end of the resistor R107, one end of the capacitor C66, one end of the capacitor C18 and one end of the resistor R125 respectively; the other end of the capacitor C66 and the other end of the capacitor C18 are both grounded, the anode of the diode D21 is electrically connected with the other end of the resistor R107 and an output end of the Schmitt trigger U5A respectively, a power end of the Schmitt trigger U5A is connected with the 3.3V power source and is grounded via the capacitor C62, two input ends of the Schmitt trigger U5A are connected with each other and are electrically connected with one end of the resistor R25 and the collector of the triode Q22 respectively, the other end of the resistor R25 is connected with the 3.3V power source, the base of the triode Q22 is electrically connected with one end of the resistor R113 and the anode of the voltage-stabilizing diode ZW2 respectively, the other end of the resistor R113 and the emitter of the triode Q22 are both grounded, the cathode of the voltage-stabilizing diode ZW2 is electrically connected with one end of the capacitor C67, one end of the resistor R28 and one end of the resistor R110 respectively, and the other end of the capacitor C67, one end of the resistor R126, one end of the capacitor C76 and one end of the resistor R97 are electrically connected and are all grounded; the other end of the resistor R126 is electrically connected with the other end of the resistor R125, the other end of the capacitor C76 and one end of the resistor R127 respectively, the other end of the resistor R127 is electrically connected with a thirty-fifth pin of the control chip U7, the other end of the resistor R97 is electrically connected with one end of the resistor R31, the other end of the resistor R31 is electrically connected with the other end of the resistor R28, one end of the capacitor C13 and one end of the resistor R98 respectively, and the other end of the resistor R98, one end of the capacitor C14 and the cathode of the voltage-stabilizing diode ZW4 are electrically connected and are all electrically connected with a thirty-fifth pin of the control chip U7; the other end of the capacitor C13, the other end of the capacitor C14 and the anode of the voltage-stabilizing diode ZW4 are all grounded; the other end of the resistor R110 is electrically connected with the collector of the triode Q20, the base of the triode Q20 is electrically connected with the cathode of the voltage-stabilizing diode ZW3 and one end of the resistor R108 respectively, and the other end of the resistor R108 is electrically connected with the emitter of the triode Q20; and the anode of the voltage-stabilizing diode ZW3 is electrically connected with the cathode of the voltage-stabilizing diode ZW11 in the M-BUS receiving circuit via the resistor R112.

It can be known from the above-mentioned circuit connection relationship that the above-mentioned overcurrent protection circuit consists of semiconductor devices such as a Schmitt trigger U5, a switching regulator tube Q18, a switching regulator tube Q20, a switching regulator tube Q22, a switching regulator tube Q23, a switching regulator tube Q24, a voltage-stabilizing tube ZW2, a voltage-stabilizing tube ZW3, a voltage-stabilizing tube ZW4, and a diode D21 as well as few resistance-capacitance devices, and if the energy consumption is over high in a system, a single chip microcomputer controls and triggers a Schmitt trigger U5 by means of a pin 485-I_DET to turn on/off the switching regulator tube Q18, so that the purpose of overcurrent protection is achieved.

Figure 15:
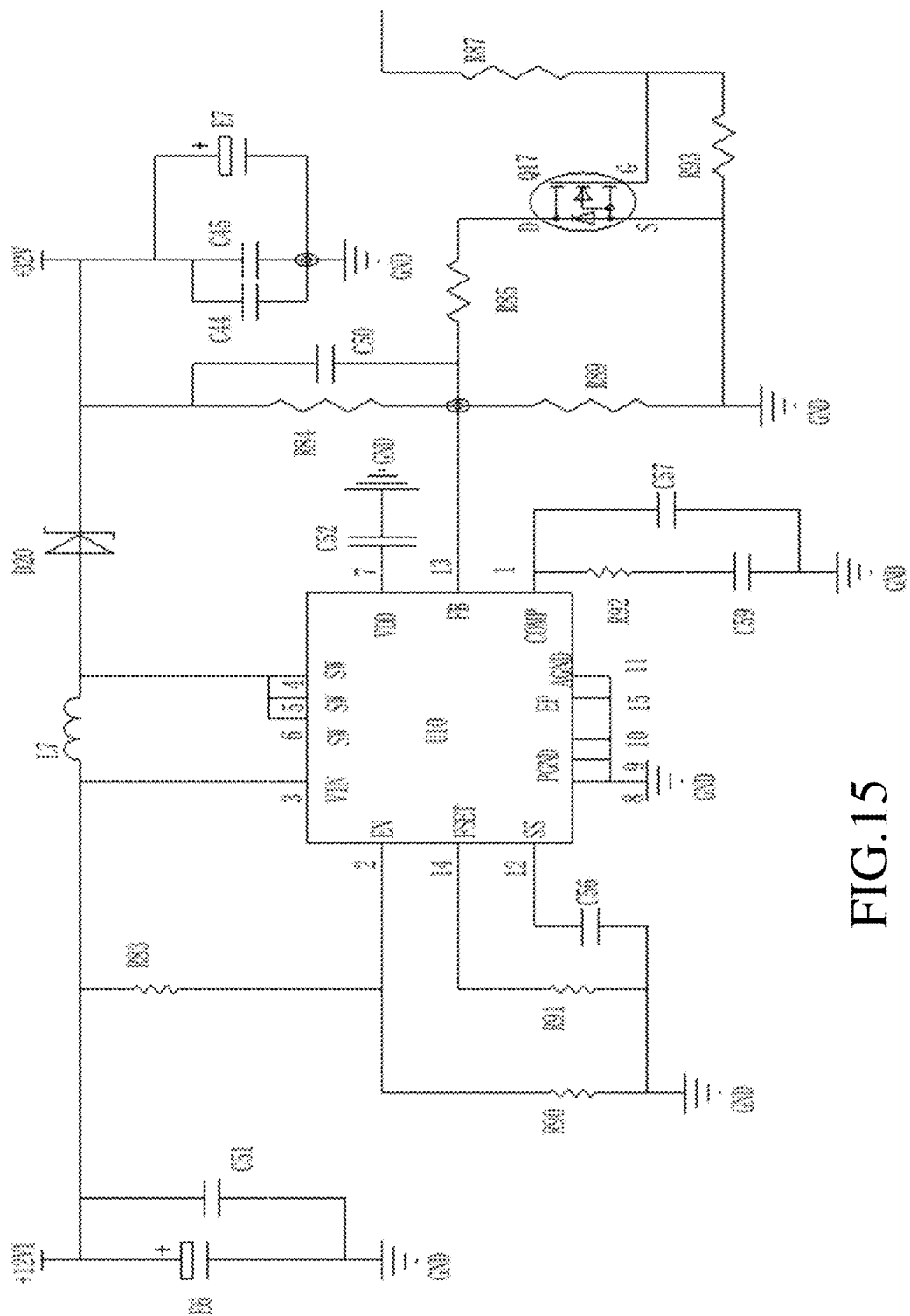
FIG. 15 is a circuit connection diagram of 12 VDC to 32 VDC of an M-BUS power circuit provided by the present invention.

As shown in FIG. 15, the M-BUS-based 4G water meter collector provided by the present invention further includes an M-BUS power circuit 9. The M-BUS power circuit includes a ceramic capacitor E6, a capacitor C51, a resistor R83, an inductor L7, a resistor R90, a resistor R91, a capacitor C56, an integrated chip U10, a diode D20, a capacitor C52, a resistor R92, a capacitor C59, a capacitor C57, a resistor R84, a resistor R89, a resistor R85, a resistor R93, a resistor R87, a capacitor C50, a capacitor C44, a capacitor C45, a ceramic capacitor E7, and an MOS tube Q17;

wherein the capacitance value of the ceramic capacitor E6 is 22 µF; the capacitance value of the capacitor C51 is 0.1 µF; the resistance value of the resistor R83 is 100 KΩ; the inductance value of the inductor L7 is 22 µH; the resistance value of the resistor R90 is 33 KΩ; the resistance value of the resistor R91 is 100 KΩ; the capacitance value of the capacitor C56 is 0.1 µF; the diode D20 is of the type SS36; the capacitance value of the capacitor C52 is 0.1 µF; the resistance value of the resistor R92 is 12 KΩ; the capacitance value of the capacitor C59 is 4700 pF; the capacitance value of the capacitor C57 is 100 pF; the resistance value of the resistor R84 is 510 KΩ; the resistance value of the resistor R89 is 20 KΩ; the resistance value of the resistor R85 is 82 KΩ; the resistance value of the resistor R93 is 10 KΩ; the resistance value of the resistor R87 is 10 R; the capacitance value of the capacitor C50 is 18 pF; the capacitance value of the capacitor C44 is 0.1 µF; the capacitance value of the capacitor C45 is 4.7 µF; the capacitance value of the ceramic capacitor E7 is 220 µF, and the voltage value thereof is 50 V; and the MOS tube Q17 is of the type 2302;

the integrated chip U10 is of the type MPQ3426; and one end of the ceramic capacitor E6, one end of the capacitor C51, one end of the resistor R83 and one end of the inductor L7 are all electrically connected with a third pin of the integrated chip U10, the other end of the ceramic capacitor E6 and the other end of the capacitor C51 are both grounded, the other end of the resistor R83 is electrically connected with a second pin of the integrated chip U10 and one end of the resistor R90 respectively, one end of the resistor R91 is electrically connected with a fourteenth pin of the integrated chip U10, one end of the capacitor C56 is electrically connected with a twelfth pin of the integrated chip U10, the other end of the resistor R90, the other end of the resistor R91 and the other end of the capacitor C56 are all grounded, an eighth pin, a ninth pin, a tenth pin, an eleventh pin and a fifteenth pin of the integrated chip U10 are all grounded, a fourth pin, a fifth pin and a sixth pin of the integrated chip U10 are connected with each other and are electrically connected with the other end of the inductor L7 and the anode of the diode D20 respectively, and the cathode of the diode D20, one end of the resistor R84, one end of the capacitor C50, one end of the capacitor C44, one end of the capacitor C45 and one end of the ceramic capacitor E7 are electrically connected and are all connected with a 32V power source; the other end of the capacitor C44, the other end of the capacitor C45 and the other end of the ceramic capacitor E7 are all grounded; a thirteenth pin of the integrated pin U10 is electrically connected with the other end of the resistor R84, the other end of the capacitor C50, one end of the resistor R89 and one end of the resistor R85 respectively, the other end of the resistor R89 and the source of the MOS tube Q17 are electrically connected and are both grounded, the other end of the resistor R85 is electrically connected with the drain of the MOS tube Q17, the source of the MOS tube Q17 is electrically connected with one end of the resistor R93, the gate of the MOS tube Q17 is electrically connected with the other end of the resistor R93 and one end of the resistor R87 respectively, and the other end of the resistor R87 is electrically connected with a tenth pin of the Schmitt trigger U5C; a first pin of the integrated chip U10 is electrically connected with one end of the resistor R92 and one end of the capacitor C57 respectively, the other end of the resistor R92 is electrically connected with one end of the capacitor C59, AND the other end of the capacitor C57 and the other end of the capacitor C59 are both grounded; and a seventh pin of the integrated chip U10 is grounded via the capacitor C52.

It can be known from the above-mentioned circuit connection relationship that a boosting circuit converted from 12 VDC to 32 VDC consists of a PWM switching regulator U10, an energy storage inductor L7, a regulator tube Q17, and peripheral resistance-capacitance devices, and the voltage is increased from 12 VDC to 32 VDC by means of a topological structure of a boost switching power source, so that an MBUS communication bus completes an MBUS communication function.

Figure 16:
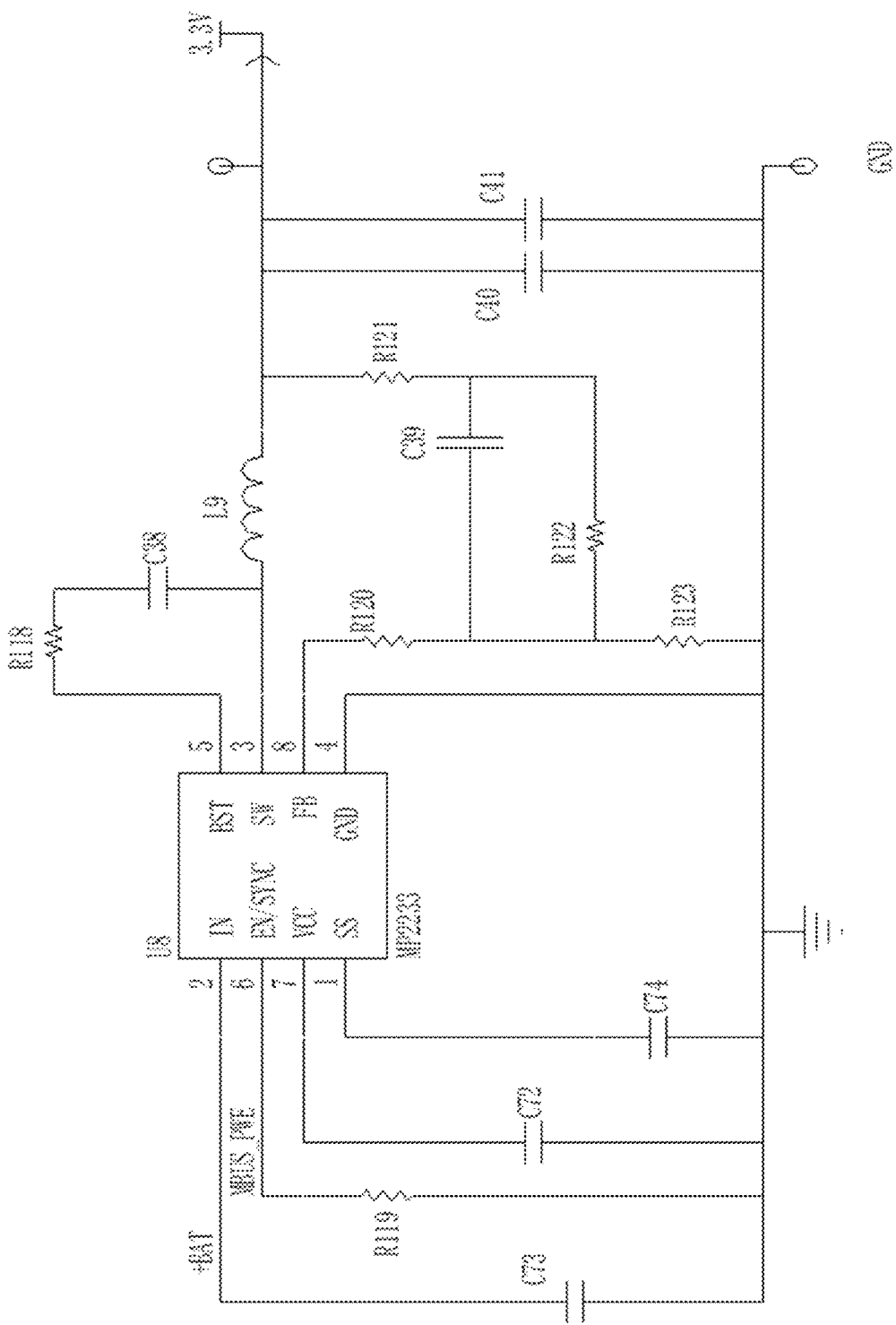
FIG. 16 is a circuit connection diagram of 4.2 VDC to 7.2 VDC of the M-BUS power circuit provided by the present invention.

As shown in FIG. 16, the M-BUS-based 4G water meter collector further includes a capacitor C73, a capacitor C72, a capacitor C74, a resistor R119, an integrated chip U8, a resistor R118, a resistor R120, a resistor R121, a resistor R122, a resistor R123, a capacitor C38, a capacitor C39, a capacitor C40, a capacitor C41, and an inductor L9, wherein the capacitance value of the capacitor C73 is 22 µF; the capacitance value of the capacitor C72 is 0.1 µF; the capacitance value of the capacitor C74 is 0.022 µF; the resistance value of the resistor R119 is 1 MΩ; the resistance value of the resistor R118 is 20 R; the resistance value of the resistor R120 is 24 KΩ; the resistance value of the resistor R121 is 10 R; the resistance value of the resistor R122 is 3.3 KΩ; the resistance value of the resistor R123 is 1 KΩ; the capacitance value of the capacitor C38 is 0.1 µF; the capacitance value of the capacitor C39 is 15 pF; the capacitance value of the capacitor C40 is 1 µF; the capacitance value of the capacitor C41 is 22 µF; and the inductance value of the inductor L9 is 1.5 µH;

the integrated chip U8 is of the type MP2233; and a first pin of the integrated chip U8 is grounded via the capacitor C74; a second pin of the integrated chip U8 is grounded via the capacitor C73 and is connected with the battery+BAT: a fourth pin of the integrated chip U8 is grounded; a sixth pin of the integrated chip U8 is grounded via the resistor R119 and is electrically connected with the fifty-eighth pin of the control chip U7; a seventh pin of the integrated chip U8 is grounded via the capacitor C72; a fifth pin of the integrated chip U8 is electrically connected with one end of the capacitor C38 via the resistor R118, a third pin of the integrated chip U8 is electrically connected with the other end of the capacitor C38 and one end of the inductor L9 respectively, and the other end of the inductor L9, one end of the resistor R121, one end of the capacitor C40 and one end of the capacitor C41 are connected with each other and are all connected with the 3.3V power source; the other end of the capacitor C40 and the other end of the capacitor C41 are both grounded; and an eighth pin of the integrated chip U8 is electrically connected with one end of the resistor R120, the other end of the resistor R120 is electrically connected with one end of the capacitor C39, one end of the resistor R122 and one end of the resistor R123 respectively, the other end of the capacitor C39 is electrically connected with the other end of the resistor R121 and the other end of the resistor R122 respectively, and the other end of the resistor R123 is grounded.

It can be known from the above-mentioned circuit connection relationship that a step-down circuit converted from 4.2 VDC to 7.2 VDC consists of an adjustable step-down switching regulator U8, an energy storage inductor L9 and peripheral resistance-capacitance devices, and the battery voltage ranging from 4.2 VDC to 7.2 VDC may be reduced to a stable 3.3 VDC voltage by the adjustable step-down switching regulator U8 at a variable PWM frequency so as to be used by a system.

Figure 17:
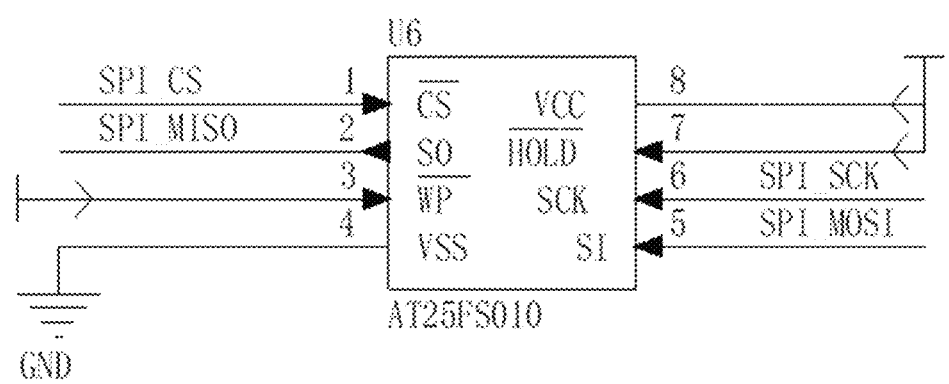
FIG. 17 is a circuit connection diagram of a storage module provided by the present invention.

As shown in FIG. 17, the M-BUS-based 4G water meter collector provided by the present invention further includes a storage module. The storage medium includes an integrated chip U6;

the integrated chip U6 is of the type AT25F S010; a first pin of the integrated chip U6 is electrically connected with a twenty-sixth pin of the control chip U7; a second pin of the integrated chip U6 is electrically connected with a twenty-second pin of the control chip U7; a third pin, a seventh pin and an eighth pin of the integrated chip U6 are connected with each other; a fourth pin of the integrated chip U6 is grounded; a fifth pin of the integrated chip U6 is electrically connected with a twenty-third pin of the control chip U7; and a sixth pin of the integrated chip U6 is electrically connected with a twenty-first pin of the control chip U7.

It can be known from the above-mentioned circuit connection relationship that the collected data is stored by the integrated chip U6 of the type AT25FS010, so that the subsequent inquiry demand is met.

Figure 18:
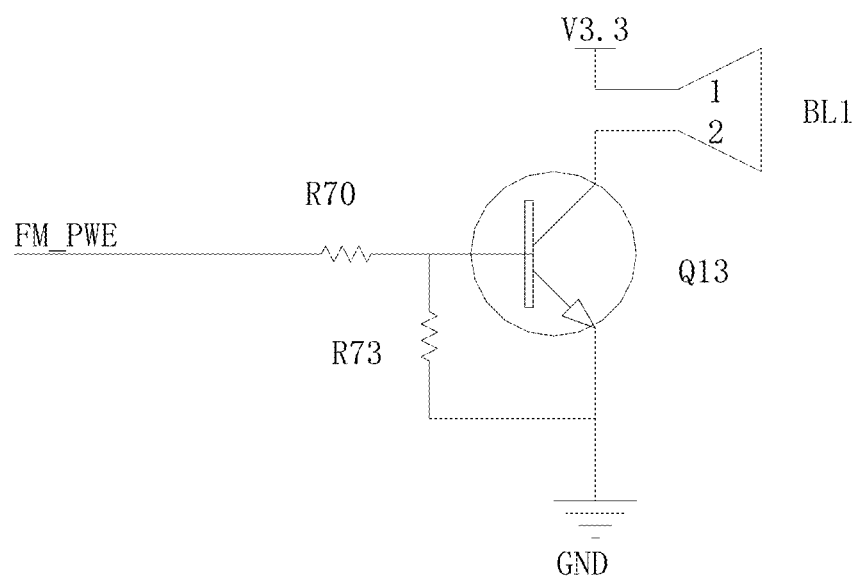
FIG. 18 is a circuit connection diagram of a buzzer module provided by the present invention.

As shown in FIG. 18, the M-BUS-based 4G water meter collector provided by the present invention further includes a buzzer module. The buzzer module includes a resistor R70, a resistor R73, a triode Q13, and a buzzer BL1;

wherein the resistance value of the resistor R70 is 1 KΩ; the resistance value of the resistor R73 is 10 KΩ; the triode Q13 is of the type 9013; and the buzzer BL1 is of the type TMB9.5A (3V); and one end of the resistor R70 is electrically connected with a twenty-seventh pin of the control chip U7; the other end of the resistor R70 is electrically connected with one end of the resistor R73 and the base of the triode Q13 respectively, the other end of the resistor R73 and the emitter of the triode Q13 are electrically connected and are both grounded, the collector of the triode Q13 is electrically connected with one end of the buzzer BL1, and the other end of the buzzer BL1 is connected with the 3.3V power source.

It can be known from the above-mentioned circuit connection relationship that the buzzer BL1 achieves a reminding function when abnormal conditions occur.

Figure 19:
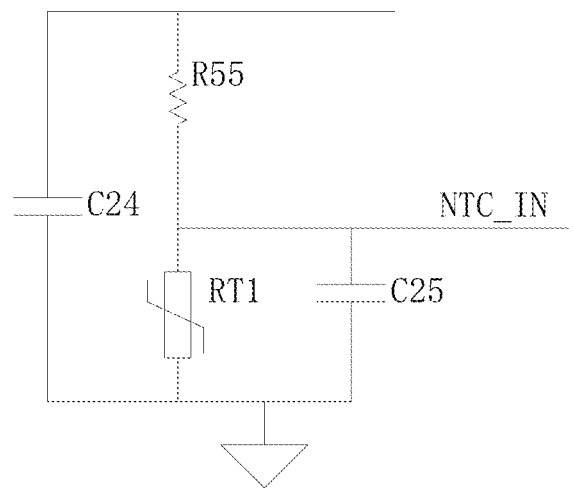
FIG. 19 is a circuit connection diagram of a temperature induction module provided by the present invention.

As shown in FIG. 19, the M-BUS-based 4G water meter collector provided by the present invention further includes a temperature induction module. The temperature induction module includes a capacitor C24, a capacitor C25, a resistor R55, and a thermistor RT1;

wherein the capacitance values of the capacitor C24 and the capacitor C25 are 0.1 μF; the resistance value of the resistor R55 is 10 KΩ; and the resistance value of the thermistor RT1 is 10 KΩ; and one end of the capacitor C24 is electrically connected with one end of the resistor R55 and the third pin of the integrated chip U6 respectively, and the other end of the capacitor C24, one end of the thermistor RT1 and one end of the capacitor C25 are all grounded; and the other end of the resistor R55, the other end of the thermistor RT1 and the other end of the capacitor C25 are connected with each other and are all electrically connected with a thirty-fourth pin of the control chip U7.

It can be known from the above-mentioned circuit connection relationship that a temperature is sampled by means of the thermistor RT1, so that it is convenient to monitor the ambient temperature of the water meter collector, the water meter collector is better protected, and the stability in a data collection process is ensured.

Figure 20:
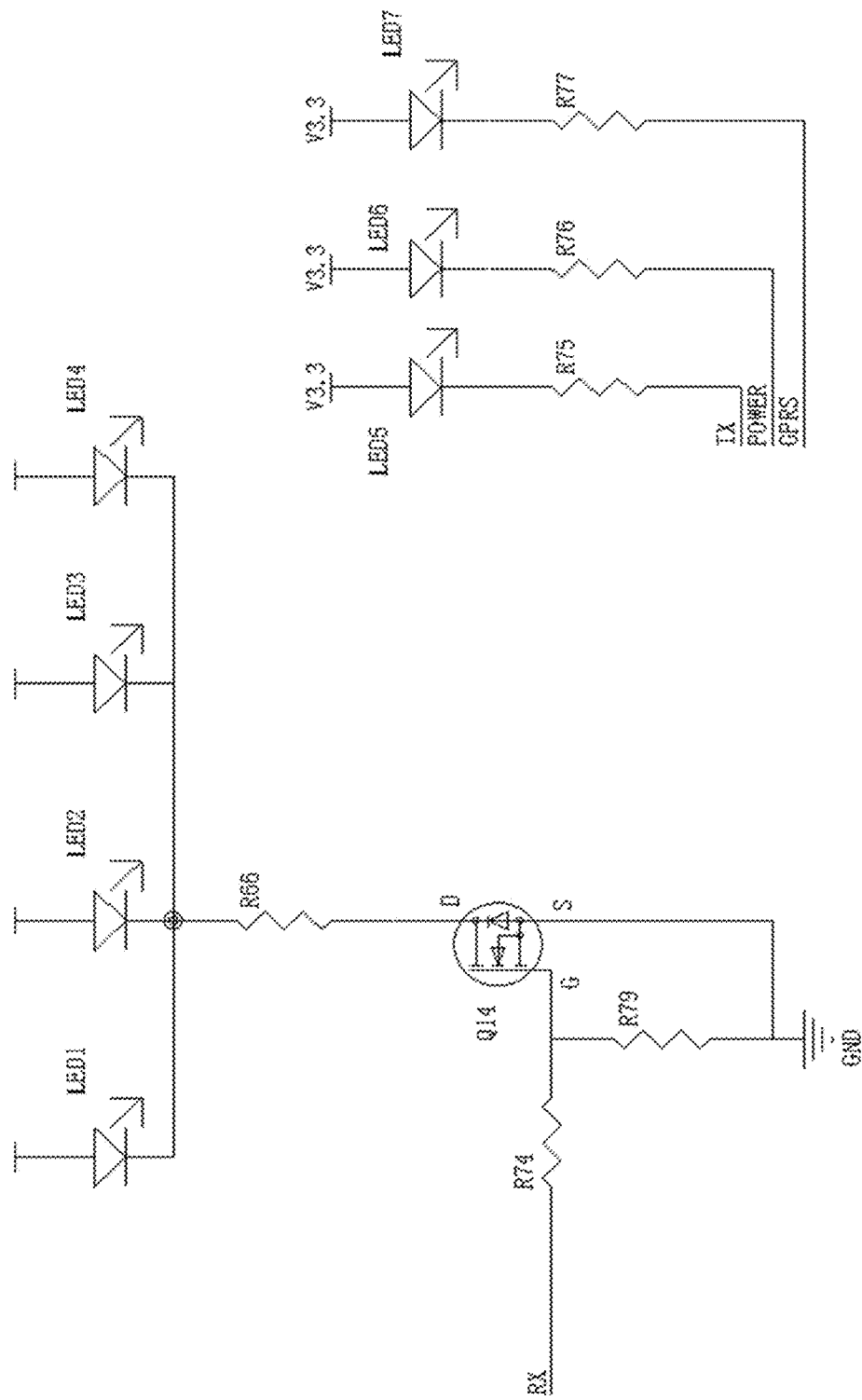
FIG. 20 is a circuit connection diagram of an indication lamp module provided by the present invention.

As shown in FIG. 20, the M-BUS-based 4G water meter collector provided by the present invention further includes an indication lamp module. The indication lamp module includes a light emitting diode LED1, a light emitting diode LED2, a light emitting diode LED3, a light emitting diode LED4, a light emitting diode LED5, a light emitting diode LED6, a light emitting diode LED7, a resistor R66, a resistor R74, a resistor R79, an MOS tube Q14, a resistor R75, a resistor R76, and a resistor R77;

wherein the light emitting diode LED1, the light emitting diode LED2, the light emitting diode LED3, the light emitting diode LED4, the light emitting diode LED5, the light emitting diode LED6 and the light emitting diode LED7 are all of the type LED-0805; the resistance value of the resistor R66 is 330 R; the resistance value of the resistor R74 is 10 KΩ; the resistance value of the resistor R79 is 1 MΩ; the MOS tube Q14 is of the type 2302; and the resistance values of the resistor R75, the resistor R76 and the resistor R77 are all 330 R; and the anode of the light emitting diode LED1 is electrically connected with the fifty-fourth pin of the control chip U7; the anode of the light emitting diode LED2 is electrically connected with the fifty-fifth pin of the control chip U7; the anode of the light emitting diode LED3 is electrically connected with the fifty-sixth pin of the control chip U7; the anode of the light emitting diode LED4 is electrically connected with the fifty-seventh pin of the control chip U7; the cathode of the light emitting diode LED1, the cathode of the light emitting diode LED2, the cathode of the light emitting diode LED3 and the cathode of the light emitting diode LED4 are connected with each other and are electrically connected with one end of the resistor R66, the other end of the resistor R66 is electrically connected with the drain of the MOS tube Q14, the gate of the MOS tube Q14 is electrically connected with one end of the resistor R74 and one end of the resistor R79 respectively, the other end of the resistor R74 is electrically connected with a fifty-first pin of the control chip U7, and the other end of the resistor R79 and the source of the MOS tube Q14 are electrically connected and are both grounded; and the anode of the light emitting diode LED5, the anode of the light emitting diode LED6 and the anode of the light emitting diode LED7 are all connected with the 3.3V power source, the cathode of the light emitting diode LED5 is electrically connected with a fiftieth pin of the control chip U7 via the resistor R75, the cathode of the light emitting diode LED6 is electrically connected with a fifty-second pin of the control chip U7 via the resistor R76, and the cathode of the light emitting diode LED7 is electrically connected with a fifty-third pin of the control chip U7 via the resistor R77.

It can be known from the above-mentioned circuit connection relationship that the plurality of diodes are capable of indicating various use states such as a charging state, an under-voltage state, a normal state, an abnormal state, and a data collection state so as to be convenient for an operator to rapidly know the current state of the water meter collector.

Figure 21:
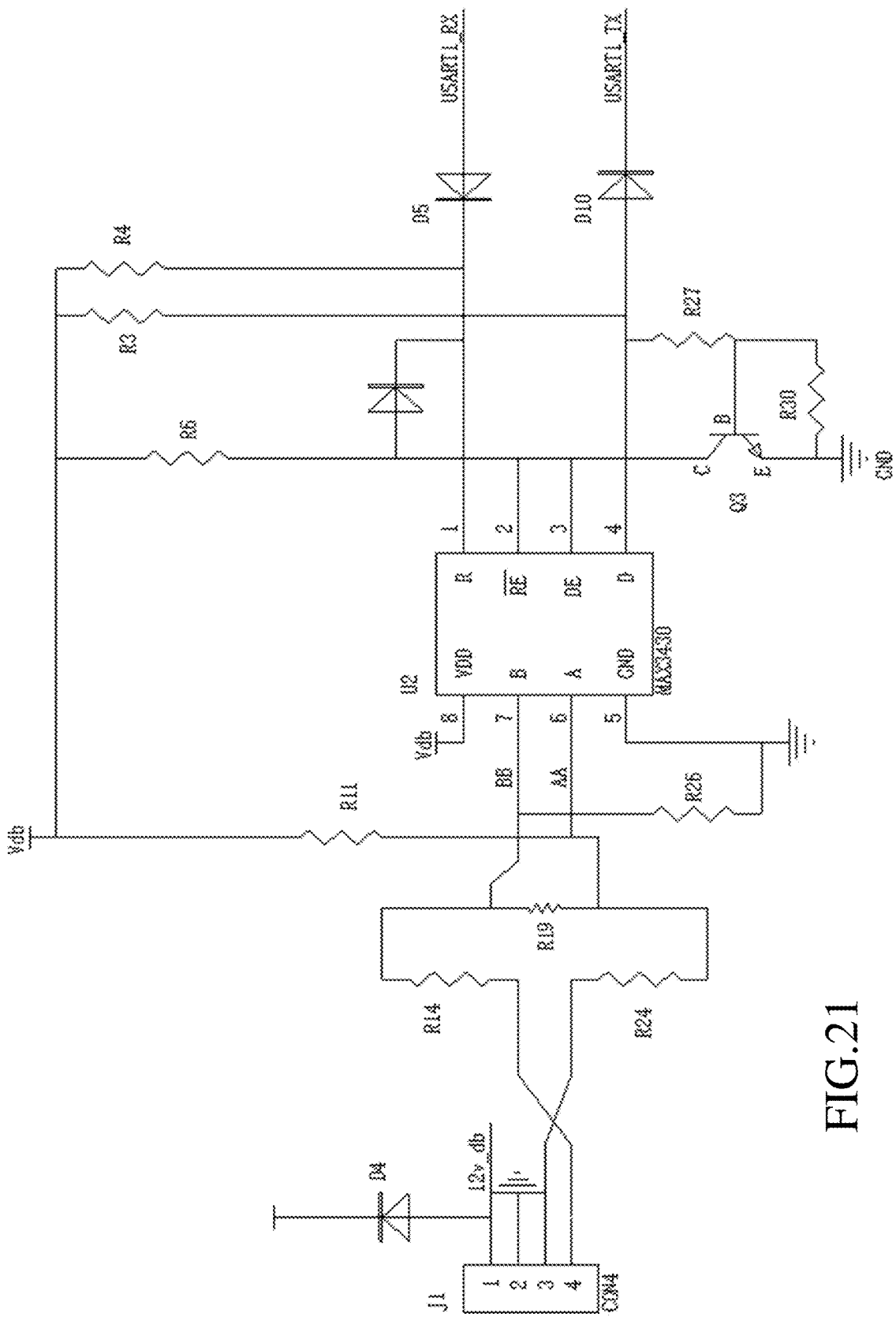
FIG. 21 is a circuit connection diagram of a transceiver provided by the present invention.

In addition, as shown in FIGS. 21 to 29, the present invention further provides peripheral circuit design for the M-BUS-based 4G water meter collector provided by the present invention. For example, FIG. 21 is a circuit connection diagram of a transceiver, and specific parameters of all electronic components in the figure are shown as follows:

a diode D4 is of the type SMB-SS34, the resistance values of a resistor R14 and a resistor R24 are 100Ω, the resistance value of a resistor R19 is 2.2 KΩ, the resistance values of a resistor R11 and a resistor R26 are 4.7 KΩ, an integrated chip U2 is of the type MAX3430, the resistance values of a resistor R6 and a resistor R3 are 10 KΩ, the resistance values of resistors R4 and R27 are 100 KΩ, a triode Q3 is of the type 9013, the resistance value of a resistor R30 is 33 KΩ, and diodes D5 and D10 are of the type 1N4148. A transceiving function is achieved by means of the circuit connection in FIG. 21 and the cooperation of parameters of all the electronic components.

Figure 22:
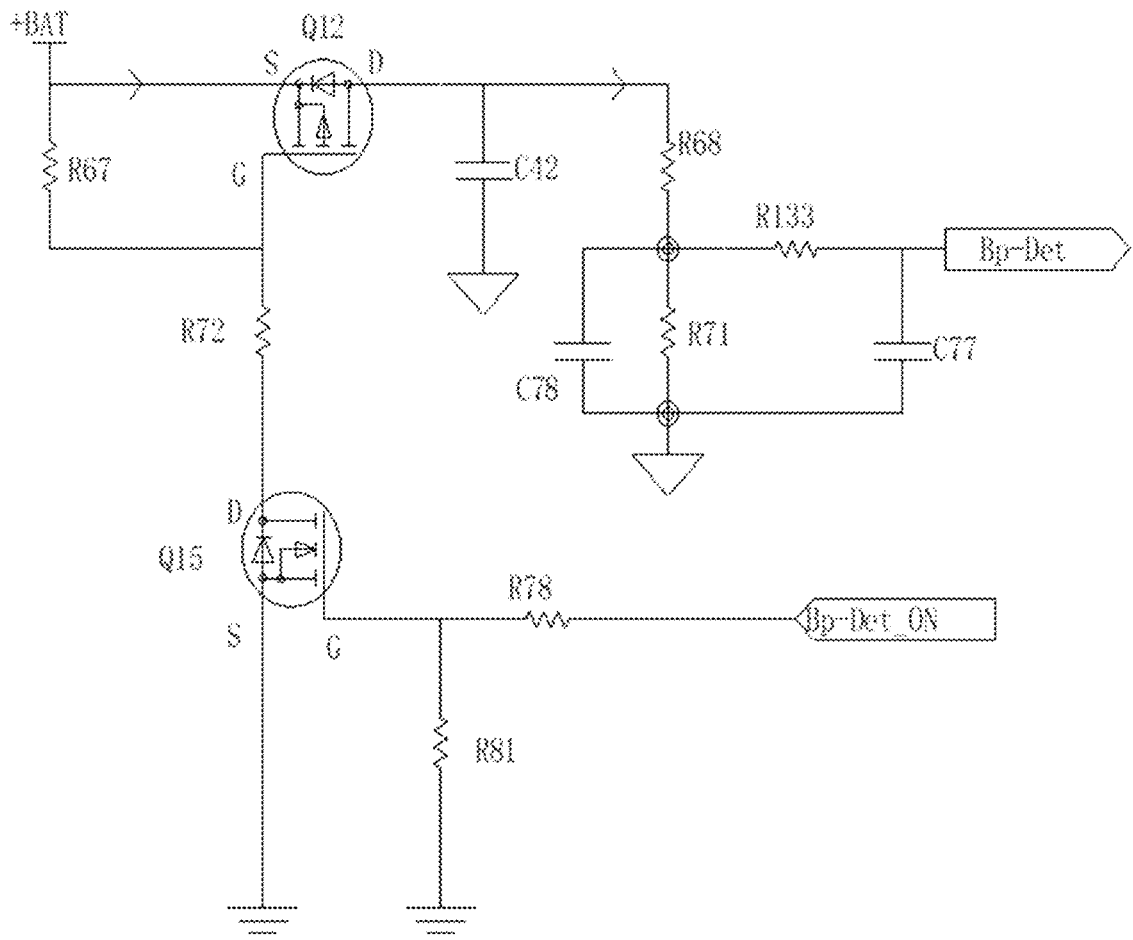
FIG. 22 is a circuit connection diagram of a 7.2 V battery level detection circuit provided by the present invention.

FIG. 22 is a circuit connection diagram of a 7.2 V battery level detection circuit provided by the present invention; and specific parameters of all the electronic components in the figure are shown as follows:

the resistance values of a resistor R67 and a resistor R81 are 1 MΩ, the resistance value of a resistor R72 is 1 KΩ, the resistance value of a resistor R68 is 680 KΩ, the resistance value of a resistor R71 is 100 KΩ, the resistance values of a resistor R78 and a resistor R133 are 10 KΩ, a triode Q12 is of the type 2301, a triode Q15 is of the type 2302, and the capacitance values of capacitors C42, C78 and C77 are 0.1 µF. A 7.2 V battery level detection function is achieved by means of the circuit connection in FIG. 22 and the cooperation of parameters of all the electronic components.

Figure 23:
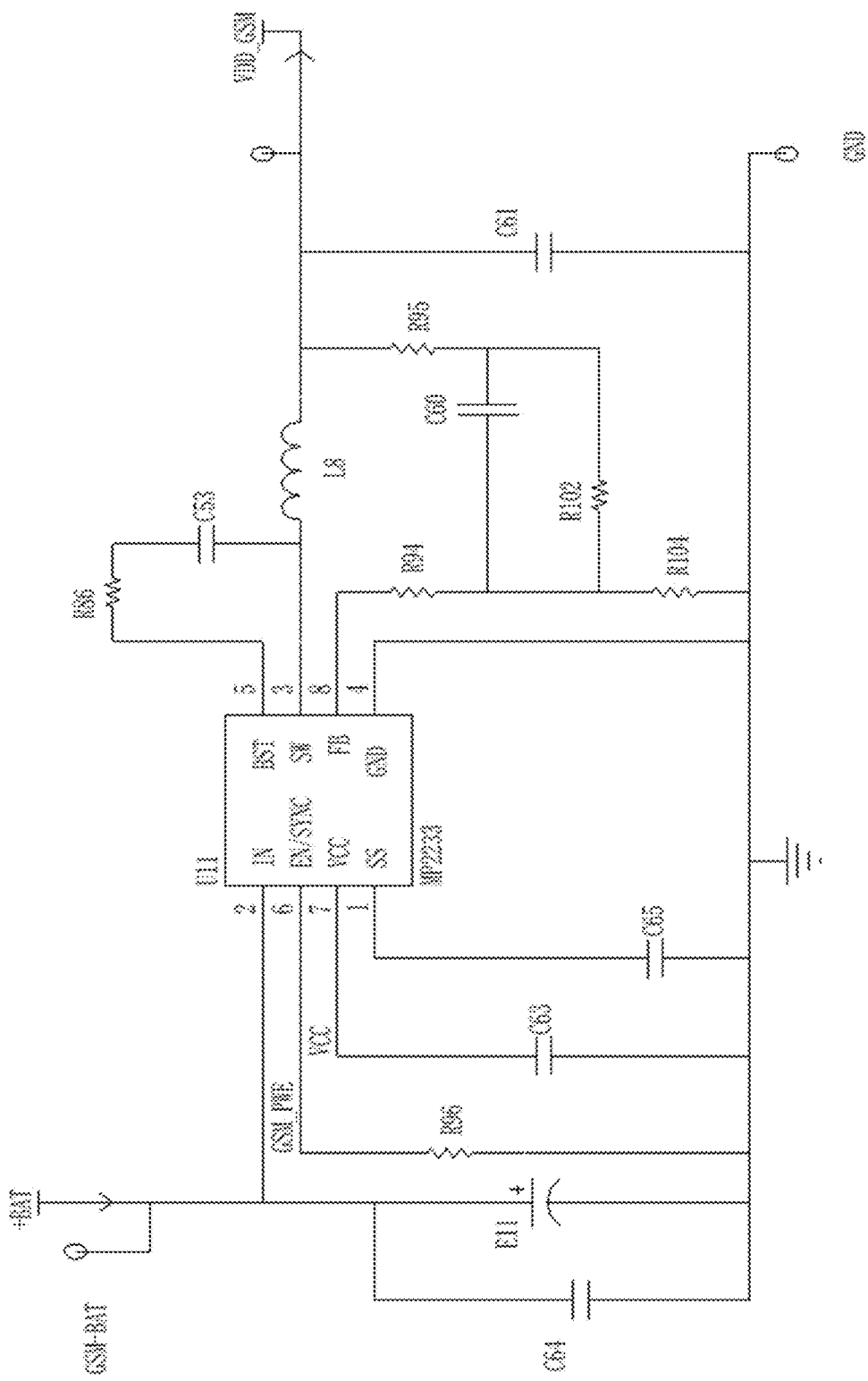
FIG. 23 is a circuit connection diagram of a switching voltage-stabilizing circuit provided by the present invention.

FIG. 23 is a circuit connection diagram of a switching voltage-stabilizing circuit provided by the present invention; and specific parameters of all the electronic components in the figure are shown as follows:

the capacitance values of capacitors C64, C63, C65 and C53 are 0.1 µF; the capacitance value of a ceramic capacitor E11 is 22 µF, and the voltage value thereof is 20 V; and the resistance value of a resistor R96 is 1 MΩ, an integrated chip U11 is of the type MP2233, the resistance value of a resistor R86 is 20 R, the resistance value of a resistor R94 is 24 KΩ, the resistance value of a resistor R104 is 1 KΩ, the resistance value of a resistor R102 is 4.02 KΩ, the capacitance value of a capacitor C60 is 15 pF, the inductance value of an inductor L8 is 1.5 pH, the resistance value of a resistor R95 is 10 R, and the capacitance value of a capacitor C61 is 1 µF. A voltage-stabilizing function is achieved by means of the circuit connection in FIG. 23 and the cooperation of parameters of all the electronic components.

Figure 24:
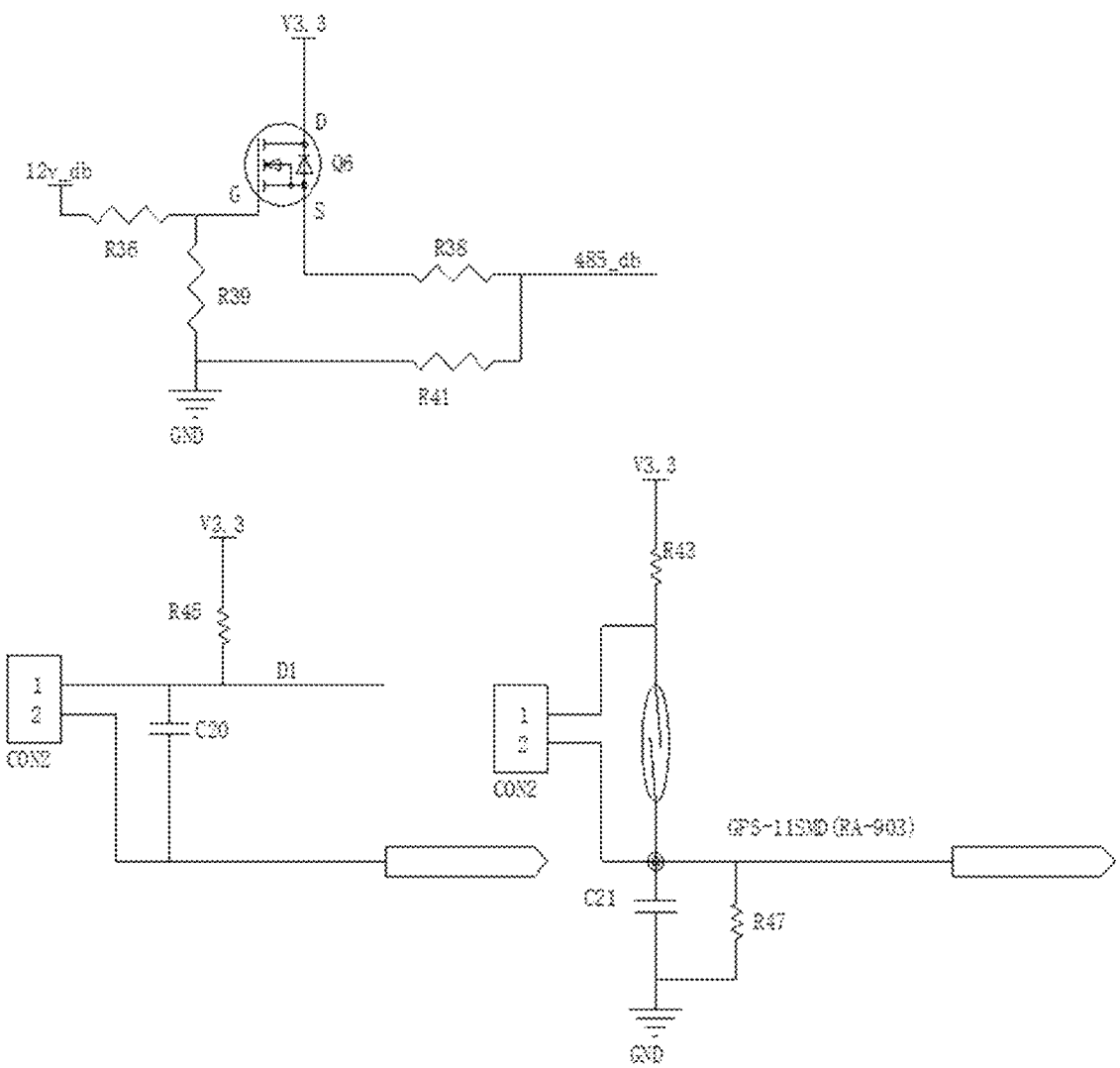
FIG. 24 is a circuit connection diagram of a 485 communication circuit provided by the present invention.

FIG. 24 is a circuit connection diagram of a 485 communication circuit provided by the present invention; and specific parameters of all the electronic components in the figure are shown as follows:

the resistance values of resistors R36 and R39 are 1 MΩ, the resistance value of a resistor R38 is 4.7 KΩ, the resistance value of a resistor R41 is 100 KΩ, and a triode Q6 is of the type 2302; and the resistance values of resistors R45 and R47 are 10 KΩ, the capacitance values of capacitors C20 and C21 are 0.1 µF, and the resistance value of a resistor R43 is 1 KΩ. A 485 communication function is achieved by means of the circuit connection in FIG. 24 and the cooperation of parameters of all the electronic components.

Figure 25:
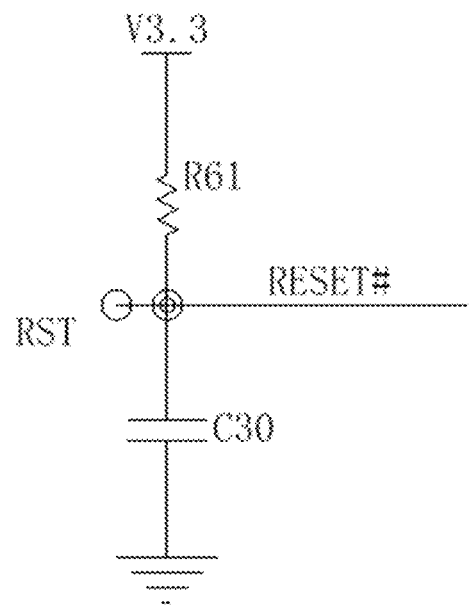
FIG. 25 is a circuit connection diagram of a reset circuit provided by the present invention.

FIG. 25 is a circuit connection diagram of a reset circuit provided by the present invention; and specific parameters of all the electronic components in the figure are shown as follows: the resistance value of a resistor R61 is 10 KΩ, and the capacitance value of a capacitor C30 is 0.1 µF. A reset function is achieved by means of the circuit connection in FIG. 25 and the cooperation of parameters of all the electronic components.

Figure 26:
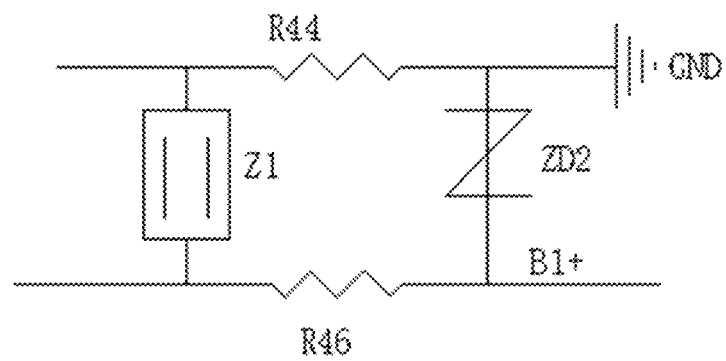
FIG. 26 is a circuit connection diagram of a battery charge overvoltage protection circuit provided by the present invention.

FIG. 26 is a circuit connection diagram of a battery charge overvoltage protection circuit provided by the present invention, and specific parameters of all the electronic components in the figure are shown as follows:

the current values of resistor R44 and R46 are 2A, Z1 is of the type BA201N, and ZD2 is of the type SMBJ36.

Figure 27:
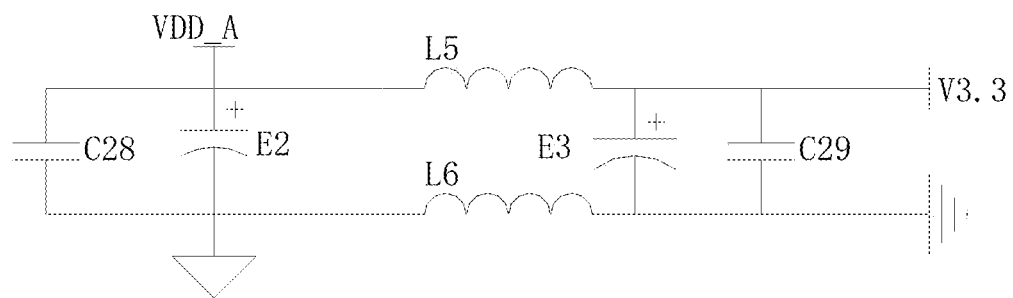
FIG. 27 is a circuit connection diagram of a π-type low-pass filter circuit at an MCU power supply end provided by the present invention.

FIG. 27 is a circuit connection diagram of a π-type low-pass filter circuit at an MCU power supply end provided by the present invention, and specific parameters of all the electronic components in the figure are shown as follows:

the capacitance values of capacitors C28 and C29 are 100 nF; the capacitance value of a ceramic capacitor E2 is 10 µF, the voltage value thereof is 16 V; the capacitance value of a ceramic capacitor E3 is 100 µF, the voltage value thereof is 10 V; and the inductance values of inductors L5 and L6 are 120 R.

Figure 28:
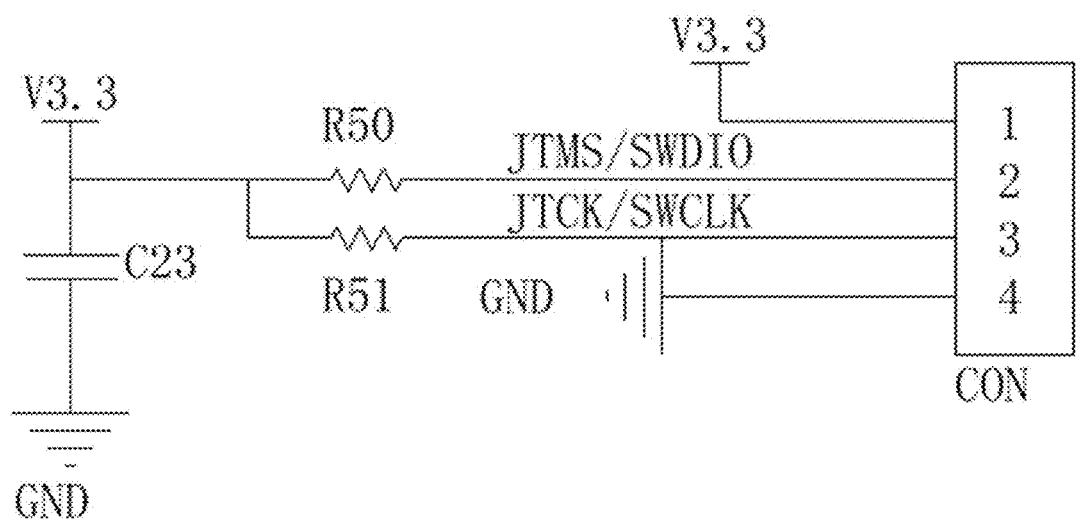
FIG. 28 is a circuit connection diagram of a program download interface circuit provided by the present invention.

FIG. 28 is a circuit connection diagram of a program download interface circuit provided by the present invention; and specific parameters of all the electronic components in the figure are shown as follows: the capacitance value of a capacitor C23 are 100 nF, and the resistance values of resistors R50 and R51 are both 10 KΩ. A program download function is achieved by means of the circuit connection in FIG. 28 and the cooperation of parameters of all the electronic components.

Figure 29:
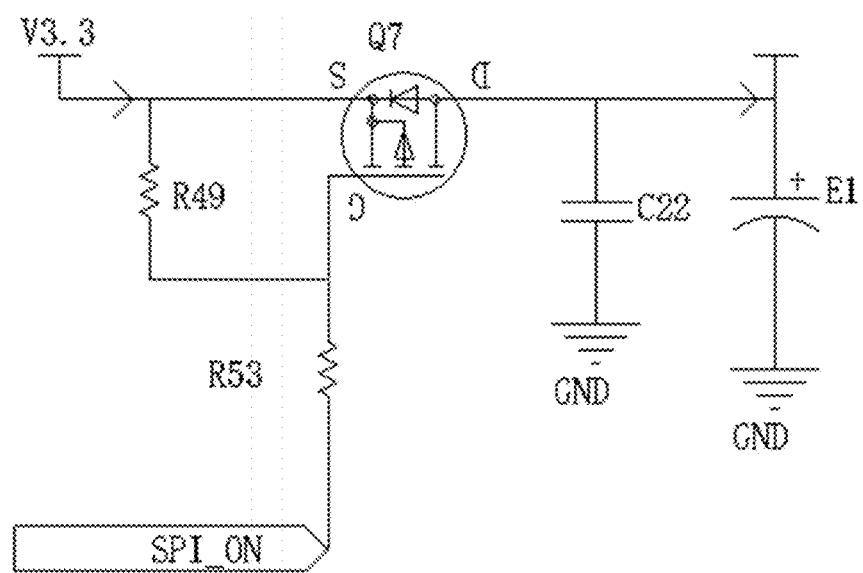
FIG. 29 is a circuit connection diagram of a memory power control output circuit provided by the present invention.

FIG. 29 is a circuit connection diagram of a memory power control output circuit provided by the present invention; and specific parameters of all the electronic components in the figure are shown as follows:

the resistance value of a resistor R49 is 47 KΩ, the resistance value of a resistor R53 is 4.7 KΩ, the capacitance value of a capacitor C22 is 100 nF, the capacitance value of a ceramic capacitor E1 is 22 µF, and an MOS tube Q7 is of the type 2301. A memory power control function is achieved by means of the circuit connection in FIG. 29 and the cooperation of parameters of all the electronic components.

In summary, the M-BUS receiving circuit provided by the present invention is disposed between the control unit and the M-BUS overcurrent protection circuit, and is used for connecting the control unit and the M-BUS overcurrent protection circuit. The M-BUS receiving circuit consists of an adjustable voltage-stabilizing power source LM317, a Schmitt trigger CD4093, a comparator LM393, a triode Q2, a triode Q4, a diode D2, a diode D8, a diode D9, a diode D10, a diode D1, and several resistance-capacitance circuits. A system is boosted from 12 VDC to 32 VDC, the voltage is regulated to ±15 VDC by an adjustable voltage-stabilizing power source U1, and is reduced to 7.5 VDC by a voltage-stabilizing tube, then, 1.5 VDC input to a pin IN– and a pin IN+ of a second comparator by a high level is output by a first pin of a comparator U3, and a low level is output from a seventh pin to trigger the Schmitt trigger to receive MBUS communication data. The base of the triode Q2 is controlled by a single chip microcomputer to enable the Schmitt trigger, when the MBUS data is required to be received, the pin is enabled, a regulating voltage, for regulating a pin ADJ of a voltage stabilizer U1, of the triode Q4 is controlled at about 15 VDC, a 32 VDC voltage is isolated by the diode D2 and a capacitor, that is, if fluctuation is generated when a 12 VDC power source is input, MBUS communication cannot be affected within the mS-level time, and the diode D10 isolates a signal of a second pin of the comparator to form an amplitude limiting circuit together with the diode D8 and the diode D9, so that the comparator is prevented from entering zero-cross comparison; and the diode D1 is connected to an input pin and a grounding pin of the voltage stabilizer U1, so that the phenomenon that a protective voltage signal is connected reversely to destroy the effect of the voltage stabilizer U1 is avoided. Therefore, the M-BUS receiving circuit provided by the present invention can greatly increase the signal-to-noise ratio, and the reliability and stability thereof are significantly improved. Similarly, the M-BUS-based 4G water meter collector further provided by the present invention can effectively improve the stability of water meter data collection. By adopting the above-mentioned power module structure, the problem that it is different for the collector to capture power on site is solved. By adopting a power consumption technology, the standby current of the power source is smaller than 0.3 μA, and the power source can supply power for a long time, so that it is possible to break through the restriction that it is difficult to capture power on site. By adopting the above-mentioned 4G communication module structure, the problem of low network rate of the collector is solved, and the network rate of the collector is 30 to 18000 times as high as network rates of an existing GRPS and CDMA. By adopting the above-mentioned Bluetooth module structure, the problem that a near-end communication interface of the collector needs a connecting line and easily generates poor contact is solved, the Bluetooth module is built in the collector, and therefore, operation may be achieved by Bluetooth connection by means of an APP in a mobile phone.

The above descriptions are not intended to limit the patent scope of the present invention, but merely used as embodiments thereof. All equivalent transformations made according to the contents of the description and the accompanying drawings in the present invention no matter whether they are directly or indirectly used in related technical fields should fall within the protection scope of the present invention.

LIST OF REFERENCE SIGNS 1, power module; 2, control unit; 3 Bluetooth communication module; 4, 4G communication module; 5, SIM card circuit; 6, lightening protection circuit; 7, water meter communication interface; 8, M-BUS receiving module; 9, M-BUS power circuit; 10, RS-485 communication interface circuit; and 11, antenna.

What is claimed is:

1. An M-BUS receiving circuit, wherein the M-BUS receiving circuit is disposed between a control unit and an M-BUS overcurrent protection circuit for connecting the control unit and the M-BUS overcurrent protection circuit, the M-BUS receiving circuit comprises: a third capacitor (C3), a second capacitor (C2), a first voltage-stabilizing chip (U1), a first diode (D1), a tenth resistor (R16), an eighth resistor (R8), a seventeenth resistor (R17), a ninth capacitor (C9), a ninth resistor (R9), a twenty-first resistor (R21), a twenty-second resistor (R22), a fourth triode (Q4), a third Schmitt trigger (U5C), a 124th resistor (R124), a 105th resistor (R105), a second triode (Q2), a twelfth resistor (R12), a 103th resistor (R103), a thirty-third resistor (R33), a second Schmitt trigger (USB), a second voltage comparator (U3B), a thirty-second resistor (R32), a thirty-fourth resistor (R34), a seventy-fifth capacitor (C75), a fifteenth resistor (R15), a second diode (D2), a 117th resistor (R117), a seventh capacitor (C7), a fifth capacitor (C5), an eighth capacitor (C8), a tenth capacitor (C10), a first voltage comparator (U3A), a twenty-ninth resistor (R29), an eighth diode (D8), a ninth diode (D9), a tenth diode (D10), an eleventh diode (D11), a fifteenth capacitor (C15), a sixteenth capacitor (C16), a seventeenth capacitor (C17), an eighty-first capacitor (C81), a sixth capacitor (C6), an eighteenth resistor (R18), a twentieth resistor (R20), a 205th resistor (R205), a 203th resistor (R203), a 204th resistor (R204), a 201th resistor (R201), a 202th resistor (R202), a seventeenth resistor (R7), a 202th capacitor (C202), a 200th capacitor (C200), a 201th capacitor (C201), a 203th capacitor (C203), a fourth capacitor (C4), a first operational amplifier (U15A), a tenth voltage-stabilizing diode (ZW10), an eleventh voltage-stabilizing diode (ZW11), and an second operational amplifier (U15B);

the third capacitor (C3) is connected in parallel with the second capacitor (C2), one end of the parallel third capacitor (C3) and second capacitor (C2) is grounded, and the other end of the parallel third capacitor (C3) and second capacitor (C2) and a third pin of the first voltage-stabilizing chip (U1) are both electrically connected with a 32V power source; a cathode of the first diode (D1) is electrically connected with the third pin of the first voltage-stabilizing chip (U1), and an anode of the first diode (D1) is electrically connected with a second pin of the first voltage-stabilizing chip (U1); the second pin of the first voltage-stabilizing chip (U1) is electrically connected with one end of the tenth resistor (R16) and one end of the eighth resistor (R8) respectively; the other end of the tenth resistor (R16) is electrically connected with a first pin of the first voltage-stabilizing chip (U1), one end of the sixteenth resistor (R16), one end of the ninth capacitor (C9) and one end of the seventeenth resistor (R17) respectively; the other end of the sixteenth resistor (R16) is electrically connected with a collector of the fourth triode (Q4); a base of the fourth triode (Q4) is electrically connected with one end of the twenty-second resistor (R22), the other end of the twenty-second resistor (R22) is electrically connected with one end of the ninth resistor (R9), an output end of the third Schmitt trigger (U5C) and one end of the twenty-first resistor (R21) respectively; the other end of the ninth resistor (R9) is connected with a 3.3V power source; two input ends of the third Schmitt trigger (U5C) are connected with each other and are electrically connected with the control unit; the other end of the twenty-first resistor (R21) and the emitter of the fourth triode (Q4) are electrically connected with each other and are both grounded; and the other end of the ninth capacitor (C9), the other end of the seventeenth resistor (R17) and the other end of the eighth resistor (R8) are connected with each other and are grounded;

one end of the 124th resistor (R124) is electrically connected with the control unit, the other end of the 124th resistor (R124) is electrically connected with one end of the 105th resistor (R105) and a base of the second triode (Q2) respectively, and the other end of the 105th resistor (R105) and an emitter of the second triode (Q2)

are connected with each other and are both grounded; a collector of the second triode (Q2) is electrically connected with one end of the twelfth resistor (R12), the other end of the twelfth resistor (R12) is electrically connected with one input end of the second Schmitt trigger (USB) and one end of the 103th resistor (R103) respectively, and the other end of the 103th resistor (R103) and one end of the thirty-third resistor (R33) are connected with each other and are both connected with the 3.3V power source; the other end of the thirty-third resistor (R33) is electrically connected with the other input end of the second Schmitt trigger (U5B), an output end of the second voltage comparator (U3B) respectively, and an output end of the second Schmitt trigger (U5B) is electrically connected with the control unit; a forward input end of the second voltage comparator (U3B) is electrically connected with one end of the thirty-second resistor (R32), one end of the thirty-fourth resistor (R34) and one end of the seventy-fifth capacitor (C75) respectively, one end of the thirty-second resistor (R32) is connected with the 3.3V power source, and the other end of the thirty-fourth resistor (R34) and the other end of the seventy-fifth capacitor (C75) are connected with each other and are both grounded; and a reverse input end of the second voltage comparator (U3B) is connected with the 3.3V power source via the fifteenth resistor (R15);

the reverse input end of the second voltage comparator (U3B) is electrically connected with one end of the eighth capacitor (C8), one end of the tenth capacitor (C10) and an output end of the first voltage comparator (U3A) respectively; the other end of the tenth capacitor (C10) is grounded, and the other end of the eighth capacitor (C8) is electrically connected with a forward input end of the first voltage comparator (U3A), an anode of the eighth diode (D8), a cathode of the tenth diode (D10) and one end of the eighteenth resistor (R18) respectively; a reverse input end of the first voltage comparator (U3A) is electrically connected with one end of the twenty-ninth resistor (R29), a cathode of the eighth diode (D8), an anode of the ninth diode (D9), one end of the fifteenth capacitor (C15), one end of the sixteenth capacitor (C16), one end of the seventeenth capacitor (C17), one end of the eighty-first capacitor (C81) and one end of the twentieth resistor (R20) respectively; the other end of the twenty-ninth resistor (R29), the other end of the fifteenth capacitor (C15), the other end of the sixteenth capacitor (C16), the other end of the seventeenth capacitor (C17) and the other end of the eighty-first capacitor (C81) are connected with each other and are all grounded; a cathode of the ninth diode (D9) is electrically connected with a anode of the tenth diode (D10), the other end of the twentieth resistor (R20) is electrically connected with a cathode of the eleventh diode (D11) and one end of the sixth capacitor (C6) respectively; the other end of the sixth capacitor (C6) is grounded, and an anode of the eleventh diode (D11) and the other end of the eighteenth resistor (R18) are both electrically connected with an output end of the second operational amplifier (U15B);

a reverse input end of the second operational amplifier (U15B) is electrically connected with the output end of the second operational amplifier (U15B), and a forward input end of the second operational amplifier (U15B) is electrically connected with an output end of the first operational amplifier (U15A), one end of the 202th capacitor (C202) and one end of the 205th resistor (R205) respectively; the other end of the 202th capacitor (C202), the other end of the 205th resistor (R205), one end of the 200th capacitor (C200) and one end of the 203th resistor (R203) are all electrically connected with a reverse input end of the first operational amplifier (U15A); the other end of the 200th capacitor (C200) is grounded; the other end of the 203th resistor (R203) is electrically connected with one end of the 201th resistor (R201) and an anode of the tenth voltage-stabilizing diode (ZW10) respectively; the other end of the 201th resistor (R201) is grounded; a cathode of the tenth voltage-stabilizing diode (ZW10) is electrically connected with a second pin of the first voltage-stabilizing chip (U1) and one end of the seventeenth resistor (R7) respectively; the other end of the seventeenth resistor (R7) is electrically connected with a cathode of the eleventh voltage-stabilizing diode (ZW11), one end of the fourth capacitor (C4) and the M-BUS overcurrent protection circuit respectively; an anode of the eleventh voltage-stabilizing diode (ZW11) is electrically connected with one end of the 202th resistor (R202) and one end of the 204th resistor (R204) respectively; the other end of the 202th resistor (R202) is grounded; the other end of the 204th resistor (R204) is electrically connected with one end of the 201th capacitor (C201) and a forward input end of the first operational amplifier (U15A) respectively; the other end of the 201th capacitor (C201) is grounded, and a power end of the first operational amplifier (U15A) is grounded after passing through the 203th capacitor (C203); and an anode of the second diode (D2) is connected with the 32V power source, a cathode of the second diode (D2) is electrically connected with one end of the 117th resistor (R117) and one end of the seventh capacitor (C7) respectively; the other end of the 117th resistor (R117) is electrically connected with one end of the fifth capacitor (C5); and the other end of the seventh capacitor (C7) and the other end of the fifth capacitor (C5) are connected with each other and are both grounded.

2. The M-BUS receiving circuit according to claim 1, wherein the control unit comprises a STM32L15xRC control chip (U7), the two input ends of the third Schmitt trigger (U5C) are both electrically connected with a twenty-ninth pin of the control chip (U7), one end of the 124th resistor (R124) is electrically connected with a fifty-ninth pin of the control chip (U7), and the output end of the second Schmitt trigger (U5B) is electrically connected with a thirtieth pin of the control chip (U7).

3. An M-BUS-based 4G water meter collector, comprising: a power module, a control unit, a 4G communication module, a Bluetooth communication module, an SIM card circuit, a water meter communication interface, an antenna, a lightning protection circuit and the M-BUS receiving circuit according to claim 2;

wherein the power module is electrically connected with the control unit and the 4G communication module respectively, the control unit is electrically connected with the SIM card circuit, the Bluetooth communication module and the M-BUS receiving circuit respectively; the 4G communication module is electrically connected with the antenna, the M-BUS receiving circuit is electrically connected with the water meter communication interface, and the water meter communication interface is eclectically connected with the lightning protection circuit.

4. The M-BUS-based 4G water meter collector according to claim 3, wherein the power module comprises a sixth inductor (J0), a first inductor (L1), a second inductor (L2), a third inductor (L3), a fourth inductor (L4), a fifteenth diode (D15), a 600th resistor (RP1), a voltage-stabilizing tube (ZD1), a socket (J2), a fifth MOS tube (Q5), a thirty-fifth resistor (R35), a thirty-seventh resistor (R37), a fortieth resistor (R40), a forty-second resistor (R42), a nineteenth capacitor (C19), a ninth voltage-stabilizing chip (U9), a thirty-fourth capacitor (C34), a thirty-fifth capacitor (C35), a fourth ceramic capacitor (E4), a fifth ceramic capacitor (E5), a thirty-sixth capacitor (C36), and a thirty-seventh capacitor (C37);

one end of the sixth inductor (J0) is electrically connected with a battery (+BAT), the other end of the sixth inductor (J0) is electrically connected with a cathode of the fifteenth diode (D15), an anode of the fifteenth diode (D15) is electrically connected with one end of the first inductor (L1), one end of the second inductor (L2) and one end of the forty-second resistor (R42) respectively, the other end of the first inductor (L1) is electrically connected with the other end of the second inductor (L2); one end of the 600th resistor (RP1) and one end of the voltage-stabilizing tube (ZD1) respectively, the other end of the 600th resistor (RP1) is electrically connected with a first pin of the socket (J2), and the other end of the voltage-stabilizing tube (ZD1) is electrically connected with a second pin of the socket (J2), a third pin of the socket (J2), one end of the third inductor (L3) and one end of the fourth inductor (L4) respectively; the other end of the third inductor (L3) and the other end of the fourth inductor (L4) are connected with each other and are both grounded; the other end of the forty-second resistor (R42) is electrically connected with a gate of the fifth MOS tube (Q5), one end of the fortieth resistor (R40) and one end of the nineteenth capacitor (C19) respectively; the other end of the fortieth resistor (R40), the other end of the nineteenth capacitor (C19) and one end of the thirty-seventh resistor (R37) are connected with each other and are all grounded; the other end of the thirty-seventh resistor (R37) is electrically connected with one end of the thirty-fifth resistor (R35) and a thirty-eighth pin of the control chip (U7) respectively, the other end of the thirty-fifth resistor (R35) is electrically connected with a source of the fifth MOS tube (Q5), and a drain of the fifth MOS tube (Q5) is connected with a 3.3V power source; and a second pin of the ninth voltage-stabilizing chip (U9), one end of the thirty-fourth capacitor (C34), one end of the thirty-fifth capacitor (C35) and one end of the fourth ceramic capacitor (E4) are connected with each other and are all electrically connected with the battery (+BAT), a third pin of the ninth voltage-stabilizing chip (U9), one end of the fifth ceramic capacitor (E5), one end of the thirty-sixth capacitor (C36) and one end of the thirty-seventh capacitor (C37) are connected with each other and are all connected with the 3.3V power source, and the other end of the thirty-fourth capacitor (C34), the other end of the thirty-fifth capacitor (C35), the other end of the fourth ceramic capacitor (E4), a first pin of the ninth voltage-stabilizing chip (U9), the other end of the fifth ceramic capacitor (E5), the other end of the thirty-sixth capacitor (C36) and the other end of the thirty-seventh capacitor (C37) are connected with each other and are all grounded.

5. The M-BUS-based 4G water meter collector according to claim 3, wherein the 4G communication module comprises a first integrated chip (GSM1), a forty-sixth capacitor (C46), a forty-seventh capacitor (C47), a forty-eighth capacitor (C48), a forty-ninth capacitor (C49), a eighth ceramic capacitor (E8), a ninth ceramic capacitor (E9), a sixth voltage-stabilizing diode (Z6), a 100th resistor (R100), a nineteenth triode (Q19), a twenty-second diode (D22), a twenty-third diode (D23), a 106th resistor (R106), a 114th resistor (R114), a eighty-eighth resistor (R88), a fifty-fourth capacitor (C54), and a fifty-fifth capacitor (C55);

a model of the first integrated chip (GSM1) is M26FA-03-STD, one end of the forty-sixth capacitor (C46), one end of the forty-seventh capacitor (C47), one end of the forty-eighth capacitor (C48), one end of the forty-ninth capacitor (C49), one end of the eighth ceramic capacitor (E8), one end of the ninth ceramic capacitor (E9) and a cathode of the sixth voltage-stabilizing diode (Z6) are connected with each other and are all electrically connected with a forty-second pin and a forty-third pin of the first integrated chip (GSM1); the other end of the forty-sixth capacitor (C46), the other end of the forty-seventh capacitor (C47), the other end of the forty-eighth capacitor (C48), the other end of the forty-ninth capacitor (C49), the other end of the eighth ceramic capacitor (E8), the other end of the ninth ceramic capacitor (E9) and a anode of the sixth voltage-stabilizing diode (Z6) are connected with each other and are all grounded;

a base of the nineteenth triode (Q19) is electrically connected with a fifteenth pin of the control chip (U7) via the 100th resistor (R100), a collector of the nineteenth triode (Q19) is electrically connected with a seventh pin of the first integrated chip (GSM1), and an emitter of the nineteenth triode (Q19) is grounded;

an eleventh pin, a twelfth pin, a thirteenth pin and a fourteenth pin of the first integrated chip (GSM1) are respectively electrically connected with the SIM card circuit; and a seventeenth pin of the first integrated chip (GSM1) is electrically connected with an anode of the twenty-third diode (D23) and one end of the 114th resistor (R114) respectively; a cathode of the twenty-third diode (D23) is electrically connected with a sixteenth pin of the control chip (U7), and the other end of the 114th resistor (R114) is electrically connected with a twenty-fourth pin of the first integrated chip (GSM1); an eighteenth pin of the first integrated chip (GSM1) is electrically connected with an anode of the twenty-second diode (D22); a cathode of the twenty-second diode (D22) is electrically connected with one end of the 106th resistor (R106) and a seventeenth pin of the control chip (U7) respectively, and the other end of the 106th resistor (R106) is grounded; a thirty-fifth pin of the first integrated chip (GSM1) is electrically connected with one end of the eighty-eighth resistor (R88) and one end of the fifty-fourth capacitor (C54) respectively, the other end of the fifty-fourth capacitor (C54) is grounded, the other end of the eighty-eighth resistor (R88) is electrically connected with one end of the fifty-fifth capacitor (C55) and an IPEX antenna interface respectively; the IPEX antenna interface is electrically connected with the antenna, and the other end of the fifty-fifth capacitor (C55) is grounded.

6. The M-BUS-based 4G water meter collector according to claim 5, wherein the SIM card circuit comprises a thirteenth integrated chip (U13), a 115th resistor (R115), a 116th resistor (R116), a twelfth integrated chip (U12), a sixty-eighth capacitor (C68), a sixty-ninth capacitor (C69), a seventieth capacitor (C70), and a seventy-first capacitor (C71);

the thirteenth integrated chip (U13) is a M2M-SMD, and the twelfth integrated chip (U12) is an SIM-CARD;

a first pin and a ninth pin of the thirteenth integrated chip (U13) are grounded, a second pin of the thirteenth integrated chip (U13) is electrically connected with an eleventh pin of the first integrated chip (GSM1) via the 115th resistor (R115), a third pin of the thirteenth integrated chip (U13) is electrically connected with the eleventh pin of the first integrated chip (GSM1) via the 116th resistor (R116), a sixth pin of the thirteenth integrated chip (U13) is electrically connected with a thirteenth pin of the first integrated chip (GSM1), a seventh pin of the thirteenth integrated chip (U13) is electrically connected with a twelfth pin of the first integrated chip (GSM1), and an eighth pin of the thirteenth integrated chip (U13) is electrically connected with the fourteenth pin of the first integrated chip (GSM1); and a first pin of the twelfth integrated chip (U12) is electrically connected with the fourteenth pin of the first integrated chip (GSM1) and one end of the sixty-eighth capacitor (C68) respectively, a second pin of the twelfth integrated chip (U12) is electrically connected with the twelfth pin of the first integrated chip (GSM1) and one end of the sixty-ninth capacitor (C69) respectively, a third pin of the twelfth integrated chip (U12) is electrically connected with the thirteenth pin of the first integrated chip (GSM1) and one end of the seventieth capacitor (C70) respectively, a seventh pin of the twelfth integrated chip (U12) is electrically connected with the eleventh pin of the first integrated chip (GSM1) and one end of the seventy-first capacitor (C71) respectively, and a fifth pin of the twelfth integrated chip (U12), the other end of the sixty-eighth capacitor (C68), the other end of the sixty-ninth capacitor (C69), the other end of the seventieth capacitor (C70) and the other end of the seventy-first capacitor (C71) are connected with each other and are all grounded.

7. The M-BUS-based 4G water meter collector according to claim 3, wherein the Bluetooth communication module comprises a first resistor (R1), a second resistor (R2), a fifth resistor (R5), a first capacitor (C1), a first MOS tube (Q1), a fourth integrated chip (U4), an eleventh capacitor (C11), a twelfth capacitor (C12), a thirteenth resistor (R13), a sixth diode (D6), and a seventh diode (D7);

one end of the first resistor (R1) and a source of the first MOS tube (Q1) are electrically connected and are both connected with the 3.3V power source; the other end of the first resistor (R1) is electrically connected with a gate of the first MOS tube (Q1) and one end of the fifth resistor (R5) respectively, and the other end of the fifth resistor (R5) is electrically connected with a thirty-third pin of the control chip (U7); a drain of the first MOS tube (Q1) is electrically connected with one end of the first capacitor (C1) and one end of the second resistor (R2) respectively, and the other end of the first capacitor (C1) and the other end of the second resistor (R2) are both grounded; the drain of the first MOS tube (Q1) is electrically connected with one end of the thirteenth resistor (R13); and the other end of the thirteenth resistor (R13) is electrically connected with a seventeenth pin of the fourth integrated chip (U4) and an anode of the sixth diode (D6) respectively, and a cathode of the sixth diode (D6) is electrically connected with a forty-second pin of the control chip (U7); a cathode of the seventh diode (D7) is electrically connected with a sixteenth pin of the fourth integrated chip (U4); an anode of the seventh diode (D7) is electrically connected with a forty-third pin of the control chip (U7); a first pin, a sixth pin and a fourteenth pin of the fourth integrated chip (U4) are all grounded; and a second pin of the fourth integrated chip (U4) is electrically connected with one end of the eleventh capacitor (C11) and one end of the twelfth capacitor (C12) respectively, and the other end of the eleventh capacitor (C11) and the other end of the twelfth capacitor (C12) are both grounded.

8. The M-BUS-based 4G water meter collector according to claim 3, wherein the water meter communication interface comprises a fifty-seventh resistor (R57), a ninth MOS tube (Q9), a sixty-second resistor (R62), a fifty-eighth resistor (R58), a twenty-seventh capacitor (C27), a tenth interface (J10), and an eleventh interface (J11);

one end of the fifty-seventh resistor (R57) and a source of the ninth MOS tube (Q9) are electrically connected and are both connected with the 3.3V power source; the other end of the fifty-seventh resistor (R57) is electrically connected with a gate of the ninth MOS tube (Q9) and one end of the sixty-second resistor (R62) respectively, the other end of the sixty-second resistor (R62) is electrically connected with a thirty-ninth pin of the control chip (U7), a drain of the ninth MOS tube (Q9) is electrically connected with one end of the twenty-seventh capacitor (C27) and one end of the fifty-eighth resistor (R58) respectively, and the other end of the twenty-seventh capacitor (C27) and the other end of the fifty-eighth resistor (R58) are both grounded; and a first pin of the tenth interface (J10), a first pin of the eleventh interface (J11) and the drain of the ninth MOS tube (Q9) are connected with each other; a second pin of the tenth interface (J10), a second pin of the eleventh interface (J11) and a twenty-ninth pin of the control chip (U7) are electrically connected; a third pin of the tenth interface (J10), a third pin of the eleventh interface (J11) and a thirtieth pin of the control chip (U7) are electrically connected; and a fourth pin of the tenth interface (J10) and a fourth pin of the eleventh interface (J11) are grounded, and a fifth pin of the eleventh interface (J11) is connected with the battery (+BAT).

9. The M-BUS-based 4G water meter collector according to claim 3, wherein the lightning protection circuit comprises a first branch circuit, a second branch circuit, a third branch circuit, a fourth branch circuit, and a fifth branch circuit;

the first branch circuit comprises a forty-eighth resistor (R48), a fifty-fourth resistor (R54), an eighth MOS tube (Q8), a sixteenth diode (D16), a first relay (RL1), a 200th diode (Z2), a fifth interface (J5), and a fifth relay (RL5); one end of the forty-eighth resistor (R48) is electrically connected with a fifty-fourth pin of the control chip (U7), the other end of the forty-eighth resistor (R48) is electrically connected with a gate of the eighth MOS tube (Q8) and one end of the fifty-fourth resistor (R54) respectively, and a source of the eighth MOS tube (Q8) and the other end of the fifty-fourth resistor (R54) are both grounded; a drain of the eighth MOS tube (Q8) is electrically connected with an anode of the sixteenth diode (D16), an eighth pin of the first relay (RL1) and an eighth pin of the fifth relay (RL5) respectively, a cathode of the sixteenth diode (D16) is electrically connected with a first pin of the first relay (RL1) and a first pin of the fifth relay (RL5) respectively; a third pin of the first relay (RL1) is electrically connected with a sixth pin of the fifth relay (RL5), a sixth pin of the first relay (RL1) is electrically connected with a third pin of the fifth relay (RL5), a fourth pin of the first relay (RL1) is electrically connected with one end of the 200th diode (Z2), a first pin of the fifth interface (J5) and a fifth pin of the fifth relay (RL5) respectively; and a fifth pin of the first relay (RL1) is electrically connected with the other end of the 200th diode (Z2), a second pin of the fifth interface (J5) and a fourth pin of the fifth relay (RL5) respectively;

the second branch circuit comprises a fifty-sixth resistor (R56), a sixtieth resistor (R60), a tenth MOS tube (Q10), a seventeenth diode (D17), a second relay (RL2), a 300th diode (Z3), a ninth interface (J9), and a sixth relay (RL6); one end of the fifty-sixth resistor (R56) is electrically connected with a fifty-fifth pin of the control chip (U7), the other end of the fifty-sixth resistor (R56) is electrically connected with a gate of the tenth MOS tube (Q10) and one end of the sixtieth resistor (R60) respectively, and a source of the tenth MOS tube (Q10) and the other end of the sixtieth resistor (R60) are both grounded; a drain of the tenth MOS tube (Q10) is electrically connected with an anode of the seventeenth diode (D17), an eighth pin of the second relay (RL2) and an eighth pin of the sixth relay (RL6) respectively, a cathode of the seventeenth diode (D17) is electrically connected with a first pin of the second relay (RL2) and a first pin of the sixth relay (RL6) respectively, a third pin of the second relay (RL2) is electrically connected with a sixth pin of the sixth relay (RL6), a sixth pin of the second relay (RL2) is electrically connected with a third pin of the sixth relay (RL6), a fourth pin of the second relay (RL2) is electrically connected with one end of the 300th diode (Z3), a first pin of the ninth interface (J9) and a fifth pin of the sixth relay (RL6) respectively, and a fifth pin of the second relay (RL2) is electrically connected with the other end of the 300th diode (Z3), a second pin of the ninth interface (J9) and a fourth pin of the sixth relay (RL6) respectively;

the third branch circuit comprises a sixty-fourth resistor (R64), a sixty-fifth resistor (R65), an eleventh MOS tube (Q11), an eighteenth diode (D18), a third relay (RL3), a 400th diode (Z4), a twelfth interface (J12), and a seventh relay (RL7); one end of the sixty-fourth resistor (R64) is electrically connected with a fifty-sixth pin of the control chip (U7), the other end of the sixty-fourth resistor (R64) is electrically connected with a gate of the eleventh MOS tube (Q11) and one end of the sixty-fifth resistor (R65) respectively, and a source of the eleventh MOS tube (Q11) and the other end of the sixty-fifth resistor (R65) are both grounded; a drain of the eleventh MOS tube (Q11) is electrically connected with an anode of the eighteenth diode (D18), an eighth pin of the third relay (RL3) and an eighth pin of the seventh relay (RL7) respectively, a cathode of the eighteenth diode (D18) is electrically connected with a first pin of the third relay (RL3) and a first pin of the seventh relay (RL7) respectively, a third pin of the third relay (RL3) is electrically connected with a sixth pin of the seventh relay (RL7), a sixth pin of the third relay (RL3) is electrically connected with a third pin of the seventh relay (RL7), a fourth pin of the third relay (RL3) is electrically connected with one end of the 400th diode (Z4), a first pin of the twelfth interface (J12) and a fifth pin of the seventh relay (RL7) respectively, and a fifth pin of the third relay (RL3) is electrically connected with the other end of the 400th diode (Z4), a second pin of the twelfth interface (J12) and a fourth pin of the seventh relay (RL7) respectively;

the fourth branch circuit comprises an eightieth resistor (R80), an eighty-second resistor (R82), a sixteenth MOS tube (Q16), a nineteenth diode (D19), a fourth relay (RL4), a 500th diode (Z5), a fourteenth interface (J14), and an eighth relay (RL8); one end of the eightieth resistor (R80) is electrically connected with a fifty-seventh pin of the control chip (U7), the other end of the eightieth resistor (R80) is electrically connected with a gate of the sixteenth MOS tube (Q16) and one end of the eighty-second resistor (R82) respectively, and a source of the sixteenth MOS tube (Q16) and the other end of the eighty-second resistor (R82) are both grounded; a drain of the sixteenth MOS tube (Q16) is electrically connected with an anode of the nineteenth diode (D19), an eighth pin of the fourth relay (RL4) and an eighth pin of the eighth relay (RL8) respectively; a cathode of the nineteenth diode (D19) is electrically connected with a first pin of the fourth relay (RL4) and a first pin of the eighth relay (RL8) respectively, a third pin of the fourth relay (RL4) is electrically connected with a sixth pin of the eighth relay (RL8), a sixth pin of the fourth relay (RL4) is electrically connected with a third pin of the eighth relay (RL8), a fourth pin of the fourth relay (RL4) is electrically connected with one end of the 500th diode (Z5), a first pin of the fourteenth interface (J14) and a fifth pin of the eighth relay (RL8) respectively, and a fifth pin of the fourth relay (RL4) is electrically connected with the other end of the 500th diode (Z5), a second pin of the fourteenth interface (J14) and a fourth pin of the eighth relay (RL8) respectively; and the fifth branch circuit comprises a 131th resistor (R131), a 132th resistor (R132), a 129th resistor (R129), a 130th resistor (R130), a twenty-fourth MOS tube (Q24), and a twenty-third MOS tube (Q23); one end of the 131th resistor (R131) is electrically connected with a fifty-eighth pin of the control chip (U7), the other end of the 131th resistor (R131) is electrically connected with a gate of the twenty-fourth MOS tube (Q24) and one end of the 132th resistor (R132) respectively, and a source of the twenty-fourth MOS tube (Q24) and the other end of the 132th resistor (R132) are both grounded; a drain of the twenty-fourth MOS tube (Q24) is electrically connected with one end of the 130th resistor (R130), the other end of the 130th resistor (R130) is electrically connected with one end of the 129th resistor (R129) and a gate of the twenty-third MOS tube (Q23) respectively, the other end of the 129th resistor (R129) is electrically connected with a source of the twenty-third MOS tube (Q23), and the drain of the twenty-third MOS tube (Q23) is connected with the 3.3V power source.

10. The M-BUS-based 4G water meter collector according to claim 3, further comprising an overcurrent protection circuit, wherein the overcurrent protection circuit comprises a fifty-eighth capacitor (C58), a tenth ceramic capacitor (E10), a ninety-ninth resistor (R99), an eighteenth MOS tube (Q18), a 101th resistor (R101), a twenty-first triode (Q21), a 109th resistor (R109), a 111th resistor (R111), a fourth Schmitt trigger (U5D), a 128th resistor (R128), a 107th resistor (R107), a sixty-sixth capacitor (C66), an eighteenth capacitor (C18), a twenty-first diode (D21), a sixty-second capacitor (C62), a first Schmitt trigger (USA), a twenty-fifth resistor (R25), a twenty-second triode (Q22), a 113th resistor (R113), a 110th resistor (R110), a second voltage-stabilizing diode (ZW2), a sixty-seventh capacitor (C67), a twenty-eighth resistor (R28), a thirty-first resistor (R31), a ninety-seventh resistor (R97), a 125th resistor (R125), a 126th resistor (R126), a 127th resistor (R127), a seventy-sixth capacitor (C76), a twentieth triode (Q20), a 108th resistor (R108), a third voltage-stabilizing diode (ZW3), a 112th resistor (R112), a ninety-eighth resistor (R98), a thirteenth capacitor (C13), a fourteenth capacitor (C14), and a fourth voltage-stabilizing diode (ZW4); and one end of the fifty-eighth capacitor (C58), one end of the tenth ceramic capacitor (E10), one end of the ninety-ninth resistor (R99) and a source of the eighteenth MOS tube (Q18) are connected with each other, the other end of the fifty-eighth capacitor (C58) and the other end of the tenth ceramic capacitor (E10) are both grounded, a gate of the eighteenth MOS tube (Q18) is electrically connected with the other end of the ninety-ninth resistor (R99) and one end of the 101th resistor (R101) respectively, the other end of the 101th resistor (R101) is electrically connected with a collector of the twenty-first triode (Q21), an emitter of the twenty-first triode (Q21) is grounded, a base of the twenty-first triode (Q21) is electrically connected with one end of the 109th resistor (R109) and one end of the 111th resistor (R111) respectively, the other end of the 111th resistor (R111) is grounded, the other end of the 109th resistor (R109) is electrically connected with an output end of the fourth Schmitt trigger (U5D) and one end of the 128th resistor (R128) respectively, the other end of the 128th resistor (R128) is electrically connected with the fifty-eighth pin of the control chip (U7), and two input ends of the fourth Schmitt trigger (U5D) are connected with each other and are electrically connected with a cathode of the twenty-first diode (D21), one end of the 107th resistor (R107), one end of the sixty-sixth capacitor (C66), one end of the eighteenth capacitor (C18) and one end of the 125th resistor (R125) respectively; the other end of the sixty-sixth capacitor (C66) and the other end of the eighteenth capacitor (C18) are both grounded, an anode of the twenty-first diode (D21) is electrically connected with the other end of the 107th resistor (R107) and an output end of the first Schmitt trigger (USA) respectively, a power end of the first Schmitt trigger (USA) is connected with the 3.3V power source and is grounded via the sixty-second capacitor (C62), two input ends of the first Schmitt trigger (USA) are connected with each other and are electrically connected with one end of the twenty-fifth resistor (R25) and a collector of the twenty-second triode (Q22) respectively, the other end of the twenty-fifth resistor (R25) is connected with the 3.3V power source, a base of the twenty-second triode (Q22) is electrically connected with one end of the 113th resistor (R113) and an anode of the second voltage-stabilizing diode (ZW2) respectively, the other end of the 113th resistor (R113) and the emitter of the twenty-second triode (Q22) are both grounded, a cathode of the second voltage-stabilizing diode (ZW2) is electrically connected with one end of the sixty-seventh capacitor (C67), one end of the twenty-eighth resistor (R28) and one end of the 110th resistor (R110) respectively, and the other end of the sixty-seventh capacitor (C67), one end of the 126th resistor (R126), one end of the seventy-sixth capacitor (C76) and one end of the ninety-seventh resistor (R97) are electrically connected and are all grounded; the other end of the 126th resistor (R126) is electrically connected with the other end of the 125th resistor (R125), the other end of the seventy-sixth capacitor (C76) and one end of the 127th resistor (R127) respectively, the other end of the 127th resistor (R127) is electrically connected with a thirty-fifth pin of the control chip (U7), the other end of the ninety-seventh resistor (R97) is electrically connected with one end of the thirty-first resistor (R31), the other end of the thirty-first resistor (R31) is electrically connected with the other end of the twenty-eighth resistor (R28), one end of the thirteenth capacitor (C13) and one end of the ninety-eighth resistor (R98) respectively, and the other end of the ninety-eighth resistor (R98), one end of the fourteenth capacitor (C14) and a cathode of the fourth voltage-stabilizing diode (ZW4) are electrically connected and are all electrically connected with a thirty-fifth pin of the control chip (U7); the other end of the thirteenth capacitor (C13), the other end of the fourteenth capacitor (C14) and the anode of the fourth voltage-stabilizing diode (ZW4) are all grounded; the other end of the 110th resistor (R110) is electrically connected with the collector of the twentieth triode (Q20), a base of the twentieth triode (Q20) is electrically connected with a cathode of the third voltage-stabilizing diode (ZW3) and one end of the 108th resistor (R108) respectively, and the other end of the 108th resistor (R108) is electrically connected with an emitter of the twentieth triode (Q20); and a anode of the third voltage-stabilizing diode (ZW3) is electrically connected with a cathode of the eleventh voltage-stabilizing diode (ZW11) in the M-BUS receiving circuit via the 112th resistor (R112).

11. The M-BUS-based 4G water meter collector according to claim 3, further comprising an M-BUS power circuit, wherein the M-BUS power circuit comprises a sixth ceramic capacitor (E6), a fifty-first capacitor (C51), a eighty-third resistor (R83), a seventh inductor (L7), a ninetieth resistor (R90), a ninety-first resistor (R91), a fifty-sixth capacitor (C56), a tenth integrated chip (U10), a twentieth diode (D20), a fifty-second capacitor (C52), a ninety-second resistor (R92), a fifty-ninth capacitor (C59), a fifty-seventh capacitor (C57), an eighty-fourth resistor (R84), an eighty-ninth resistor (R89), an eighty-fifth resistor (R85), a ninety-third resistor (R93), an eighty-seventh resistor (R87), a fiftieth capacitor (C50), a forty-fourth capacitor (C44), a forty-fifth capacitor (C45), a seventh ceramic capacitor (E7), and a seventeenth MOS tube (Q17);

a model of the tenth integrated chip (U10) is MPQ3426; and one end of the sixth ceramic capacitor (E6), one end of the fifty-first capacitor (C51), one end of the eighty-third resistor (R83) and one end of the seventh inductor (L7) are all electrically connected with a third pin of the tenth integrated chip (U10), the other end of the sixth ceramic capacitor (E6) and the other end of the fifty-first capacitor (C51) are both grounded, the other end of the eighty-third resistor (R83) is electrically connected with a second pin of the tenth integrated chip (U10) and one end of the ninetieth resistor (R90) respectively, one end of the ninety-first resistor (R91) is electrically connected with a fourteenth pin of the tenth integrated chip (U10), one end of the fifty-sixth capacitor (C56) is electrically connected with a twelfth pin of the tenth integrated chip (U10), the other end of the ninetieth resistor (R90), the other end of the ninety-first resistor (R91) and the other end of the fifty-sixth capacitor (C56) are all grounded, an eighth pin, a ninth pin, a tenth pin, an eleventh pin and a fifteenth pin of the tenth integrated chip (U10) are all grounded, a fourth pin, a fifth pin and a sixth pin of the tenth integrated chip (U10) are connected with each other and are electrically connected with the other end of the seventh inductor (L7) and an anode of the twentieth diode (D20) respectively, and a cathode of the twentieth diode (D20), one end of the eighty-fourth resistor (R84), one end of the fiftieth capacitor (C50), one end of the forty-fourth capacitor (C44), one end of the forty-fifth capacitor (C45) and one end of the seventh ceramic capacitor (E7) are electrically connected and are all connected with a 32V power source; the other end of the forty-fourth capacitor (C44), the other end of the forty-fifth capacitor (C45) and the other end of the seventh ceramic capacitor (E7) are all grounded; a thirteenth pin of the integrated pin (U10) is electrically connected with the other end of the eighty-fourth resistor (R84), the other end of the fiftieth capacitor (C50), one end of the eighty-ninth resistor (R89) and one end of the eighty-fifth resistor (R85) respectively, the other end of the eighty-ninth resistor (R89) and the source of the seventeenth MOS tube (Q17) are electrically connected and are both grounded, the other end of the eighty-fifth resistor (R85) is electrically connected with a drain of the seventeenth MOS tube (Q17), a source of the seventeenth MOS tube (Q17) is electrically connected with one end of the ninety-third resistor (R93), a gate of the seventeenth MOS tube (Q17) is electrically connected with the other end of the ninety-third resistor (R93) and one end of the eighty-seventh resistor (R87) respectively, and the other end of the eighty-seventh resistor (R87) is electrically connected with a tenth pin of the third Schmitt trigger (U5C); a first pin of the tenth integrated chip (U10) is electrically connected with one end of the ninety-second resistor (R92) and one end of the fifty-seventh capacitor (C57) respectively, the other end of the ninety-second resistor (R92) is electrically connected with one end of the fifty-ninth capacitor (C59), AND the other end of the fifty-seventh capacitor (C57) and the other end of the fifty-ninth capacitor (C59) are both grounded; and a seventh pin of the tenth integrated chip (U10) is grounded via the fifty-second capacitor (C52).

12. The M-BUS-based 4G water meter collector according to claim 11, wherein the M-BUS power circuit further comprises a seventy-third capacitor (C73), a seventy-second capacitor (C72), a seventy-fourth capacitor (C74), a 119th resistor (R119), an eighth integrated chip (U8), a 118th resistor (R118), a 120th resistor (R120), a 121th resistor (R121), a 122th resistor (R122), a 123th resistor (R123), a thirty-eighth capacitor (C38), a thirty-ninth capacitor (C39), a fortieth capacitor (C40), a forty-first capacitor (C41), and a ninth inductor (L9);
a model of the eighth integrated chip (U8) is MP2233; and
a first pin of the eighth integrated chip (U8) is grounded via the seventy-fourth capacitor (C74); a second pin of the eighth integrated chip (U8) is grounded via the seventy-third capacitor (C73) and is connected with the battery (+BAT): a fourth pin of the eighth integrated chip (U8) is grounded; a sixth pin of the eighth integrated chip (U8) is grounded via the 119th resistor (R119) and is electrically connected with the fifty-eighth pin of the control chip (U7); a seventh pin of the eighth integrated chip (U8) is grounded via the seventy-second capacitor (C72); a fifth pin of the eighth integrated chip (U8) is electrically connected with one end of the thirty-eighth capacitor (C38) via the 118th resistor (R118), a third pin of the eighth integrated chip (U8) is electrically connected with the other end of the thirty-eighth capacitor (C38) and one end of the ninth inductor (L9) respectively, and the other end of the ninth inductor (L9), one end of the 121th resistor (R121), one end of the fortieth capacitor (C40) and one end of the forty-first capacitor (C41) are connected with each other and are all connected with the 3.3V power source; the other end of the fortieth capacitor (C40) and the other end of the forty-first capacitor (C41) are both grounded; and an eighth pin of the eighth integrated chip (U8) is electrically connected with one end of the 120th resistor (R120), the other end of the 120th resistor (R120) is electrically connected with one end of the thirty-ninth capacitor (C39), one end of the 122th resistor (R122) and one end of the 123th resistor (R123) respectively, the other end of the thirty-ninth capacitor (C39) is electrically connected with the other end of the 121th resistor (R121) and the other end of the 122th resistor (R122) respectively, and the other end of the 123th resistor (R123) is grounded.

13. The M-BUS-based 4G water meter collector according to claim 3, further comprising a storage module, wherein the storage medium comprises a sixth integrated chip (U6);
a model of the sixth integrated chip (U6) is AT25FS010;
a first pin of the sixth integrated chip (U6) is electrically connected with a twenty-sixth pin of the control chip (U7);
a second pin of the sixth integrated chip (U6) is electrically connected with a twenty-second pin of the control chip (U7);
a third pin, a seventh pin and an eighth pin of the sixth integrated chip (U6) are connected with each other;
a fourth pin of the sixth integrated chip (U6) is grounded;
a fifth pin of the sixth integrated chip (U6) is electrically connected with a twenty-third pin of the control chip (U7); and
a sixth pin of the sixth integrated chip (U6) is electrically connected with a twenty-first pin of the control chip (U7).

14. The M-BUS-based 4G water meter collector according to claim 13, further comprising a buzzer module, wherein the buzzer module comprises a seventieth resistor (R70), a seventy-third resistor (R73), a thirteenth triode (Q13), and a first buzzer (BL1); and
one end of the seventieth resistor (R70) is electrically connected with a twenty-seventh pin of the control chip (U7); the other end of the seventieth resistor (R70) is electrically connected with one end of the seventy-third resistor (R73) and a base of the thirteenth triode (Q13) respectively, the other end of the seventy-third resistor (R73) and an emitter of the thirteenth triode (Q13) are electrically connected and are both grounded, a collector of the thirteenth triode (Q13) is electrically connected with one end of the first buzzer (BL1), and the other end of the first buzzer (BL1) is connected with the 3.3V power source.

15. The M-BUS-based 4G water meter collector according to claim 3, further comprising a temperature induction module, wherein the temperature induction module comprises a twenty-fourth capacitor (C24), a twenty-fifth capacitor (C25), a fifty-fifth resistor (R55), and a first thermistor (RT1); and one end of the twenty-fourth capacitor (C24) is electrically connected with one end of the fifty-fifth resistor (R55) and the third pin of the sixth integrated chip (U6) respectively, and the other end of the twenty-fourth capacitor (C24), one end of the first thermistor (RT1) and one end of the twenty-fifth capacitor (C25) are all grounded; and the other end of the fifty-fifth resistor (R55), the other end of the first thermistor (RT1) and the other end of the twenty-fifth capacitor (C25) are connected with each other and are all electrically connected with a thirty-fourth pin of the control chip (U7).

16. The M-BUS-based 4G water meter collector according to claim 3, further comprising an indication lamp module, wherein the indication lamp module comprises a first light emitting diode (LED1), a second light emitting diode (LED2), a third light emitting diode (LED3), a fourth light emitting diode (LED4), a fifth light emitting diode (LED5), a sixth light emitting diode (LED6), a seventh light emitting diode (LED7), a sixty-sixth resistor (R66), a seventy-fourth resistor (R74), a seventy-ninth resistor (R79), a fourteenth MOS tube (Q14), a seventy-fifth resistor (R75), a seventy-sixth resistor (R76), and a seventy-seventh resistor (R77); and an anode of the first light emitting diode (LED1) is electrically connected with the fifty-fourth pin of the control chip (U7); an anode of the second light emitting diode (LED2) is electrically connected with a fifty-fifth pin of the control chip (U7); an anode of the third light emitting diode (LED3) is electrically connected with a fifty-sixth pin of the control chip (U7); an anode of the fourth light emitting diode (LED4) is electrically connected with a fifty-seventh pin of the control chip (U7); a cathode of the first light emitting diode (LED1), a cathode of the second light emitting diode (LED2), a cathode of the third light emitting diode (LED3) and a cathode of the fourth light emitting diode (LED4) are connected with each other and are electrically connected with one end of the sixty-sixth resistor (R66), the other end of the sixty-sixth resistor (R66) is electrically connected with a drain of the fourteenth MOS tube (Q14), a gate of the fourteenth MOS tube (Q14) is electrically connected with one end of the seventy-fourth resistor (R74) and one end of the seventy-ninth resistor (R79) respectively, the other end of the seventy-fourth resistor (R74) is electrically connected with a fifty-first pin of the control chip (U7), and the other end of the seventy-ninth resistor (R79) and a source of the fourteenth MOS tube (Q14) are electrically connected and are both grounded; and an anode of the fifth light emitting diode (LED5), an anode of the sixth light emitting diode (LED6) and an anode of the seventh light emitting diode (LED7) are all connected with the 3.3V power source, a cathode of the fifth light emitting diode (LED5) is electrically connected with a fiftieth pin of the control chip (U7) via the seventy-fifth resistor (R75), a cathode of the sixth light emitting diode (LED6) is electrically connected with a fifty-second pin of the control chip (U7) via the seventy-sixth resistor (R76), and a cathode of the seventh light emitting diode (LED7) is electrically connected with a fifty-third pin of the control chip (U7) via the seventy-seventh resistor (R77).

* * * * *